(12) United States Patent
Kagawa et al.

(10) Patent No.: US 6,677,113 B2
(45) Date of Patent: *Jan. 13, 2004

(54) SENSITIZING DYE AND SILVER HALIDE PHOTOGRAPHIC MATERIAL

(75) Inventors: Nobuaki Kagawa, Hino (JP); Noriyasu Kita, Hino (JP); Tatsuo Tanaka, Hino (JP); Hiroshi Kashiwagi, Hino (JP)

(73) Assignee: Konica Corporation (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/119,822

(22) Filed: Apr. 10, 2002

(65) Prior Publication Data

US 2003/0143499 A1 Jul. 31, 2003

Related U.S. Application Data

(62) Division of application No. 09/514,891, filed on Feb. 28, 2000, now abandoned.

(30) Foreign Application Priority Data

Mar. 5, 1999 (JP) ............................ 11-058686
Jul. 9, 1999 (JP) ............................ 11-196659

(51) Int. Cl.[7] ................................ G03C 1/08
(52) U.S. Cl. .................................... 430/570
(58) Field of Search .......................... 430/570

(56) References Cited

U.S. PATENT DOCUMENTS 6,492,102 B1 * 12/2002 Kagawa et al. ............. 430/584

\* cited by examiner

*Primary Examiner*—Hoa Van Le
(74) *Attorney, Agent, or Firm*—Muserlian, Lucas and Mercanti

(57) ABSTRACT

Spectral sensitizing dyes represented by the following formulas (1) to (4) are disclosed; silver halide photographic materials and thermally developable photosensitive materials containing the dyes are also disclosed.

Formula (1)

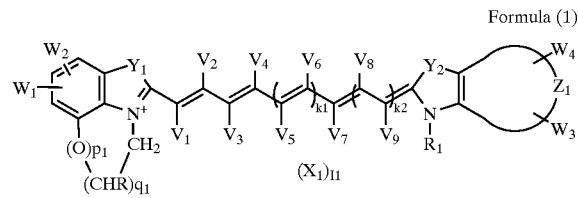

Formula (2)

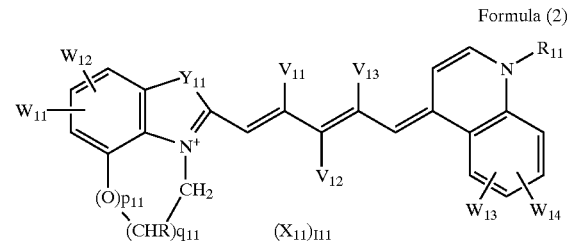

Formula (3)

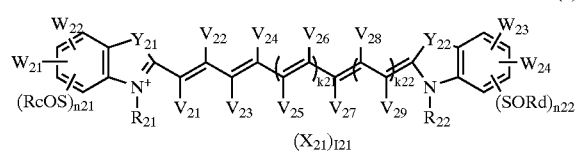

Formula (4)

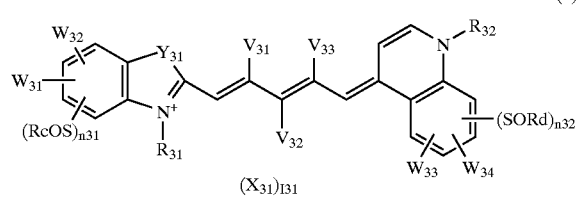

8 Claims, No Drawings

SENSITIZING DYE AND SILVER HALIDE PHOTOGRAPHIC MATERIAL

This Application is a Divisional application of Ser. No. 09/514,891, filed Feb. 28, 2000 now abandoned.

FIELD OF THE INVENTION

The present invention relates to an infrared-sensitizing dye and infrared-sensitive photographic materials by the use thereof and in particular to a photographic material and a thermally developable photothermographic material by the use of an infrared-sensitive silver halide emulsion exhibiting a high sensitivity, a low fog and reduced variation in sensitivity following storage.

BACKGROUND OF THE INVENTION

There are known silver halide photographic light sensitive materials employing silver halide grains and photo-recording materials employing photopolymerization or cleavage reaction. However, the longest photosensitivity edge of the silver halide grains is in the vicinity of 500 nm and the photosensitivity region of photopolymers is in a ultraviolet region so that spectral sensitization by use of dyes is indispensable to provide sensitivity at the loner wavelength side. Particularly with recent progress in light sources, importance of photosensitive materials sensitive to the laser wavelength region increases in the field of recording materials for industrial use. Further in the field of picture-taking photosensitive materials are noted infrared photosensitive materials used for recording environment information and superior in portrayability.

There are known a number of compounds as a sensitizing dye or spectral sensitizing dye, including cyanine dyes and merocyanine dyes described in T. H. James "The Theory of the Photographic Process" Fourth ed. (1977, Macmillan Co. N.Y.) pages 194–234; F. M. Hammer "The Cyanine Dyes and Related Compounds" (1964, John Wiley & Sons, N.Y.); D. M. Sturmer "The Chemistry of Heterocyclic Compounds" vol. 30, page 441 (1977, John Wiley & Sons, N.Y.); JP-A 3-138638, 3-163440, 5-72660, 5-72661, 5-88292, 8-194282, 9-166844, 9-281631, 9-282672, 9-292673 and 10-73900 (hereinafter, the term, JP-A means a unexamined and published Japanese Patent Application); U.S. Pat. Nos. 2,320,439, 2,398,999, 2,734,900, 3,582,344, 4,536,473, 4,740,455, 4,835,096, and 5,393,654; British Patent 774, 779, 625,245, and 895,930; European Patent 420,012 and 821,811.

These sensitizing dyes and spectral sensitizing dyes are required not only to expand spectral sensitivity region but also to satisfy the following conditions:

1) optimum spectral sensitization region,
2) high spectral sensitization efficiency (sensitivity),
3) no unfavorable interaction with other additives such as a stabilizer, antifoggant, coating aid, high boiling solvent and binder,
4) no adverse effect on the characteristic curve such as fogging or contrast variation,
5) no variation in photographic performance such as reduction in a S/N ratio or sensitivity when the dye containing photosensitive material is aged (particularly when aged at a high temperature or high humidity),
6) no diffusion of an added sensitizing dye to a different photosensitivity layer, causing color mixing, and
7) removal or discoloration of the dye after development, fixing and washing, causing no color stain.

However, commonly known spectrally sensitizing dyes have not satisfied these conditions to sufficiently satisfactory levels. Specifically, photosensitive materials to be recorded by using a laser light source are desired to have a high absorption fitted to the bright line wavelengths. However, a dye having an absorption in the region of red to infrared contains a long conjugated chain and is so susceptible to environments that although exhibiting a high molar extinction coefficient in a solution, phenomena easily occur such that the dye discolors during the preparation process or causes a number of conformational changes, forming a broad absorption spectrum exhibiting a low absorption maximum. Further, the energy gap between the lowest unoccupied level and the highest occupied level is so narrow that the lowest unoccupied level and the highest occupied level are close to the conduction band level of silver halide grains, producing problems that fogging easily occur or sensitivity is reduced.

Accordingly, there are desired an infrared-sensitive recording material exhibiting high sensitivity in the region of red to infrared and further an infrared sensitive recording material exhibiting high sensitivity and low fog and reduced variation in performance even when being aged.

Infrared sensitizing dyes generally exhibit a lower adsorption to silver halide grains than dyes sensitizing to the visible region, producing problems such as low sensitivity or marked desensitization during pre-exposure storage during standing in the form of a solution in the process of preparing a coating solution. There have been made various attempts of overcoming these problems by varying the structure of the dye. However, disclosed dyes have not yet reached levels solving the problems.

SUMMARY OF THE INVENTION

Accordingly, an object of the present invention is to provide an image forming composition exhibiting a high sensitivity to infrared laser light exposure and an image forming method by the use thereof, and in particular an infrared sensitive silver halide emulsion exhibiting a high sensitivity and low fog and superior in storage stability, a silver halide photographic light sensitive material and thermally developable photosensitive material containing the emulsion and an image forming method by the use of the materials.

An object of the invention is to provide a thermally developable photosensitive material exhibiting a high sensitivity and reduced desensitization during pre-exposure storage and preparation method thereof.

An object of the invention is to provide a thermally developable photosensitive material exhibiting little variation in photographic performance even when a standing time of a photosensitive solution is extended during the preparation thereof, in particular, a preparation method of the photosensitive solution and a coating method thereof.

An object of the invention is to provide an image recording method and image forming method by use of a thermally developable photosensitive material accomplishing the objects described above.

The above objects of the invention can be accomplished by the following constitution:

1. A spectral sensitizing dye represented by the following formulas (1) to (4):

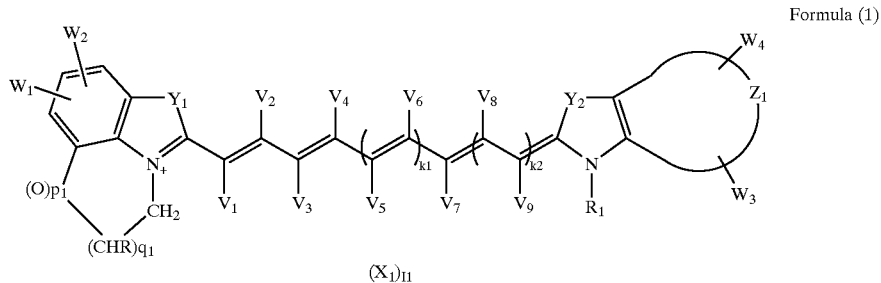

Formula (1)

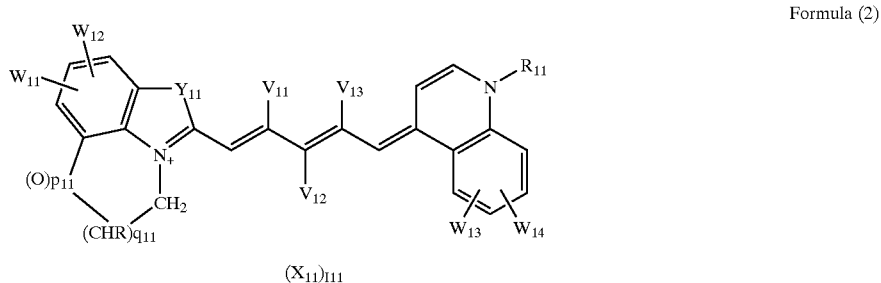

Formula (2)

wherein $Y_1$, $Y_2$ and $Y_{11}$ each are independently an oxygen atom, a sulfur atom, a selenium atom, —C(Ra)(Rb)— group or —CH=CH— group, in which Ra and Rb each are a hydrogen atom, a lower alkyl group or an atomic group necessary to form an aliphatic spiro ring between Ra and Rb; $Z_1$ is an atomic group necessary to form a 5- or 6-membered ring; R is a hydrogen atom, a lower alkyl, a cycloalkyl group, an aralkyl group, a lower alkoxy group, an aryl group, a hydroxy group or a halogen atom; $W_1$, $W_2$, $W_3$, $W_4$, $W_{11}$, $W_{12}$, $W_{13}$ and $W_{14}$ each are independently a hydrogen atom, a substituent or a non-metallic atom group necessary to form a condensed ring by bonding between $W_1$ and $W_2$ or $W_{11}$ and $W_{12}$; $R_1$ and $R_{11}$ are each an aliphatic group or a non-metallic atom group necessary to form a condensed ring by bonding between $R_1$ and $W_3$ or $R_{11}$ and $W_{14}$; $V_1$ to $V_9$, and $V_{11}$ to $V_{13}$ each are independently a hydrogen atom, a halogen atom, an amino group, an alkylthio group, an arylthio group, a lower alkyl group, a lower alkoxy group, an aryl group, an aryloxy group, a heterocyclic group or a non-metallic atom group necessary to form a 5- to 7-membered ring by bonding between $V_1$ and $V_3$, $V_2$ and $V_4$, $V_3$ and $V_5$, $V_2$ and $V_6$, $V_5$ and $V_7$, $V_6$ and $V_8$, $V_7$ and $V_9$, or $V_{11}$ and $V_{13}$, provided that at least one of $V_1$ to $V_9$ and at least one of $V_{11}$ to $V_{13}$ are a group other than a hydrogen atom; $X_1$ and $X_{11}$ each are an ion necessary to compensate for an intramolecular charge; l1 and l11 each an ion necessary to compensate for an intramolecular charge; k1 and k2 each are 0 or 1; p1 and p11 are each 0 or 1; q1 and q11 each are 1 or 2, provided that the sum of p1 and q1 and the sum of p11 and q11 are respectively not more than 2;

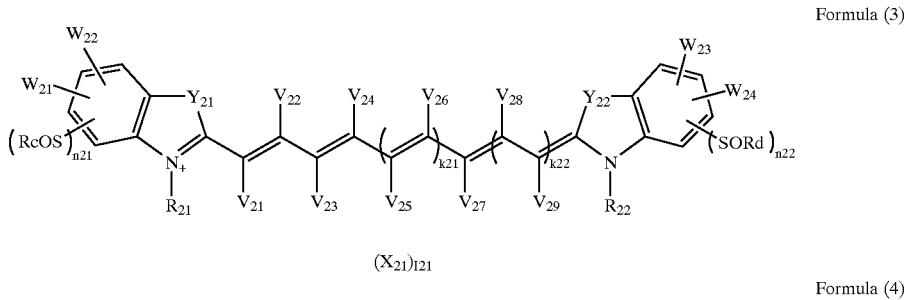

Formula (3)

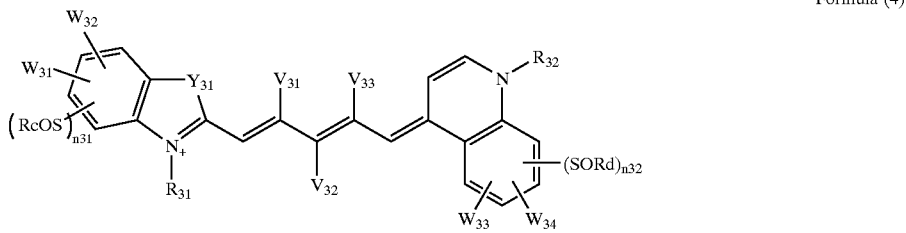

Formula (4)

wherein $Y_{21}$, $Y_{22}$ and $Y_{31}$ each are independently an oxygen atom, a sulfur atom, a selenium atom, —C(Ra)(Rb)— group or —CH=CH— group, in which Ra and Rb each are a hydrogen atom, a lower alkyl group or an atomic group necessary to form an aliphatic spiro ring between Ra and Rb; $R_{21}$, $R_{22}$, $R_{31}$ and $R_{32}$ each are independently an aliphatic group; Rc and Rd each are independently an unsubstituted lower alkyl group, a cycloalkyl group, an aralkyl group, an aryl group or a heterocyclic group; $W_{21}$, $W_{22}$, $W_{23}$, $W_{24}$, $W_{31}$, $W_{32}$, $W_{33}$ and $W_{34}$ each are independently a hydrogen atom, a substituent or a non-metallic atom group necessary to form a condensed ring by bonding between $W_{21}$ and $W_{22}$, $W_{23}$ and $W_{24}$, $W_{31}$ and $W_{32}$, or $W_{33}$ and $W_{34}$; $V_{21}$ to $V_{29}$, and $V_{31}$ to $V_{33}$ each are independently a hydrogen atom, a halogen atom, an amino group, an alkylthio group, an arylthio group, a lower alkyl group, a lower alkoxy group, an aryl group, an aryloxy group, a heterocyclic group or a non-metallic atom group necessary to form a 5- to 7-membered ring by bonding between $V_{21}$ and $V_{23}$, $V_{22}$ and $V_{24}$, $V_{23}$ and $V_{25}$, $V_{24}$ and $V_{26}$, $V_{25}$ and $V_{27}$, $V_{26}$ and $V_{28}$, $V_{27}$ and $V_{29}$, or $V_{31}$ and $V_{33}$; $X_{21}$ and $X_{31}$ each are an ion necessary to compensate for an intramolecular charge; 121 and 131 each an ion necessary to compensate for an intramolecular charge; k21 and k22 each are 0 or 1; n21, n22, n31 and n32 each are 0, 1 or 2, provided that n21 and n22, or n31 and n32 are not 0 at the same time;

2. The spectral sensitizing dye described 1 above, wherein the dye is represented by formula (1) or (2);

3. The spectral sensitizing dye described in 2 above, wherein the dye is represented by the following formula (1-1) or (2-1):

alkyl, a cycloalkyl group, an aralkyl group, a lower alkoxy group, an aryl group, a hydroxy group or a halogen atom; $W_1$, $W_2$, $W_3$, $W_4$, $W_{11}$, $W_{12}$, $W_{13}$ and $W_{14}$ each are independently a hydrogen atom, a substituent or a non-metallic atom group necessary to form a condensed ring by bonding between $W_1$ and $W_2$ or $W_{11}$ and $W_{12}$; $R_1$ and $R_{11}$ are each an aliphatic group or a non-metallic atom group necessary to form a condensed ring by bonding between $R_1$ and $W_3$ or $R_{11}$ and $W_{14}$; $L_1$ to $L_9$, and $L_{11}$ to $L_{15}$ each are independently a methine group; $X_1$ and $X_{11}$ each are an ion necessary to compensate for an intramolecular charge; 11 and l11 each an ion necessary to compensate for an intramolecular charge; m1 to m3 each are 0 or 1; p1 and p11 are each 0 or 1; q1 and q11 each are 1 or 2, provided that the sum of p1 and q1 and the sum of p11 and q11 are respectively not more than 2;

4. The spectral sensitizing dye described in 1 above, wherein the dye is represented by formula (3) or (4);

5. The spectral sensitizing dye described 4 above, wherein the dye is represented by formula (3);

6. A silver halide photographic material comprising a support having thereon at least a photosensitive layer containing a silver halide emulsion layer, wherein said photosensitive layer contains a compound represented by the formulas (1) to (4) described above;

7. The photographic material described in 6 above, wherein the compound is represented by formula (1) or (2);

8. The photographic material described in 7 above, wherein the compound is represented by the formula (1-1) or (2-1) described above;

9. The photographic material described in 6 above wherein the compound is represented by the formula (3) or (4) described above;

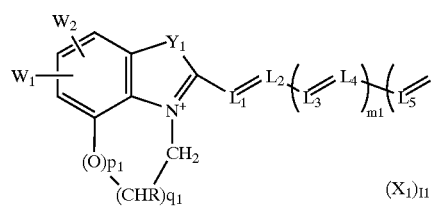

Formula (1-1)

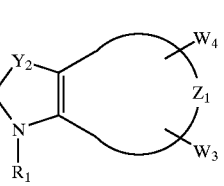

Formula (2-1)

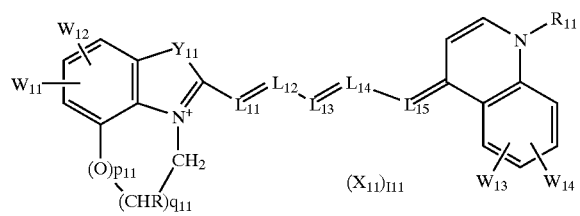

wherein $Y_1$, $Y_2$ and $Y_{11}$ each are independently an oxygen atom, a sulfur atom, a selenium atom, —C(Ra)(Rb)— group or —CH=CH— group, in which Ra and Rb each are a hydrogen atom, a lower alkyl group or an atomic group necessary to form an aliphatic spiro ring when Ra and Rb are linked with each other; $Z_1$ is an atomic group necessary to form a 5- or 6-membered ring; R is a hydrogen atom, a lower 10. The photographic material described in 9 above, wherein the compound is represented by the formula (3) described above;

11. The photographic material described in 10 above, wherein the photosensitive layer further contains a compound represented by the following formula (5):

Formula (5)

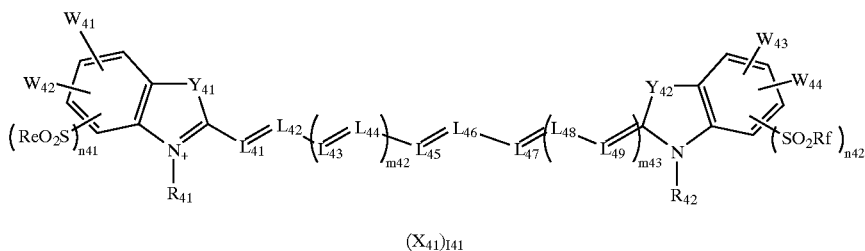

wherein $Y_4$ and $Y_{42}$ each are independently an oxygen atom, a sulfur atom, a selenium atom, —C(Ra)(Rb)— group or —CH=CH— group, in which Ra and Rb each are a hydrogen atom, a lower alkyl group or an atomic group necessary to form an aliphatic spiro ring together with Ra and Rb; $R_{41}$ and $R_{42}$ each are independently an aliphatic group; Re and Rf each are independently an unsubstituted lower alkyl group, cycloalkyl group, aralkyl group, aryl group or heterocyclic group; $W_{41}$, $W_{42}$, $W_{43}$, and $W_{44}$ each are independently a hydrogen atom, a substituent or a non-metallic atom group necessary to form a condensed ring by bonding between $W_{41}$ and $W_{42}$, $W_{43}$ and $W_{44}$; $L_{41}$ to $L_{49}$ are each a methine group; $X_{41}$ is an ion necessary to compensate for an intramolecular charge; l41 is an ion necessary to compensate for an intramolecular charge; m42 and m43 each are 0 or 1; n41 and n42 each are 0, 1 or 2, provided that n41 and n42 are not 0 at the same time;

12. The photographic material described in 9 above, wherein said compound is represented by the formula (4) described above;

13. The photographic material described in 12 above, wherein the photosensitive layer further contains a compound represented by formula (6):

14. The photographic material described in 6 above, wherein the photosensitive layer further contains an organic silver salt and a reducing agent;

15. The photographic material described in 14 above, wherein the compound is represented by the formula (1) or (2) described above;

16. The photographic material described in 15 above, wherein the compound is represented by the formula (1-1) or (2-1) described above;

17. The photographic material described in 14 above, wherein the compound is represented by the formula (3) or (4) described above;

18. The photographic material described in 17, wherein the compound is represented by the formula (3) described above;

19. The photographic material described in 18 above, wherein the photosensitive layer further contains a compound represented by the formula (5) described above;

20. The photographic material described in 17 above, wherein the compound is represented by the formula (4) described above;

21. The photographic material described in 20 above, wherein the photosensitive layer further contains a compound represented by the formula (6)described above;

Formula (6)

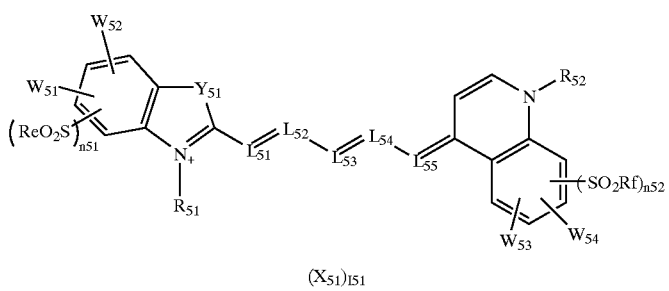

wherein $Y_{51}$ is independently an oxygen atom, a sulfur atom, a selenium atom, —C(Ra)(Rb)— group or —CH=CH— group, in which Ra and Rb each are a hydrogen atom, a lower alkyl group or an atomic group necessary to form an aliphatic Spiro ring together with Ra and Rb; $R_{51}$ and $R_{52}$ each are independently an aliphatic group; Re and Rf each are independently an unsubstituted lower alkyl group, cycloalkyl group, aralkyl group, aryl group or heterocyclic group; $W_{51}$, $W_{52}$, $W_{53}$ and $W_{54}$ each are independently a hydrogen atom, a substituent or a non-metallic atom group necessary to form a condensed ring by bonding between $W_{51}$ and $W_{52}$, or $W_{53}$ and $W_{54}$; $L_{51}$ to $L_{55}$ are each a methine group; $X_{51}$ is an ion necessary to compensate for an intramolecular charge; l51 is an ion necessary to compensate for an intramolecular charge; n51 and n52 each are 0, 1 or 2, provided that n51 and n52 are not 0 at the same time;

22. The photographic material described in 14 above, wherein the photographic material further has a non-photosensitive layer, said non-photosensitive layer containing a binder, a phthalazine compound, a benzenepolycarboxylic acid or an acid anhydride compound;

23. An image forming method comprising exposing a photosensitive material to laser, the photosensitive material comprising a support having thereon at least a photosensitive layer containing a compound represented by the formulas (1) to (4) described above;

24. The image forming method described in 23 above, wherein the compound is represented by the formula (1) or (2) described above;

25. The image forming method described in 24 above, wherein said compound is represented by the formula (1-1) or (2-1 described above.

DETAILED DESCRIPTION OF THE INVENTION

The invention will be further described. It was found according to the inventors of the invention that the invention was accomplished by the use of the compounds represented by formulas (1) to (6) as an infrared sensitizing dye or an infrared sensitizer dye.

One feature of the infrared sensitizing dye according to the invention concerns a three ring-condensed heterocyclic nucleus formed by bonding between a nitrogen atom contained in a benzothiazole ring and a carbon atom at the peri-position; and another feature is a long chain polymethine dye, in which a sulfonyl group is substituted on the benzene ring of the benzothiazole ring, leading to high sensitivity, low fogging and superior storage stability.

The infrared sensitive silver halide emulsion used in the invention refers to a silver halide emulsion exhibiting sensitivity to light having the wavelengths longer than the visible light wavelengths of 400 to 700 nm. The infrared sensitive silver halide light sensitive material used in the invention refers to a light sensitive material capable of forming a black-and-white image through developing, fixing and washing; a light sensitive material having an emulsion layer containing a coupler, a colored coupler or a DIR compound and capable of forming a color image through developing, bleach-fixing and washing; or a light sensitive material capable of forming an image upon thermal development without being subjected to wet processing, i.e., thermally developable photosensitive material.

The compounds represented by formula (1) to (6) will be described below.

The 5- or 6-membered condensed rings completed by an atomic group represented by $Z_1$ include a condensed cyclohexene ring, a condensed benzene ring, a condensed thiophene ring, a condensed pyridine ring, and a condensed naphthalene ring. Exemplary examples thereof include a benzoxazole ring, tetrahydrobenzoxazole ring, naphthooxazole ring, benzonephthooxazole ring, benzothiazole ring, tetrahydrobenzothiazole ring, naphthothiazole ring, benzonaphthothiazole ring; thienothiazole ring, thianaphthenothiazole ring, pyridothiazole ring, benzoselenazole ring, tetrahydrobenzoselenazole ring, naphthoselenazole ring, benzonaphthoselenazole ring, quinoline ring, 3,3-dialkylindolenine and 3,3-dialkylpyridopyrroline. Any substituent such as one represented by $W_1$ to $W_4$ described later can be substituted on the ring described above.

Examples of the aliphatic group represented by $R_1$, $R_{11}$, $R_{21}$, $R_{22}$, $R_{31}$, $R_{32}$, $R_{41}$, $R_{42}$, $R_{51}$ and $R_{52}$ include a branched or straight-chained alkyl group having 1 to 10 carbon atoms (e.g., methyl, ethyl, propyl, butyl, pentyl, I-pentyl, 2-ethylhexyl, octyl, decyl), an alkenyl group having 3 to 10 carbon atoms (e.g., 2-propenyl, 3-butenyl, 1-methyl-3-propenyl, 3-pentenyl, 1-methyl-3-butenyl, 4-hexenyl), and an aralkyl group having 7 to 10 carbon atoms (e.g., benzyl, phenethyl). These groups may further be substituted with a substituent, including groups such as a lower alkyl group (e.g., methyl, ethyl, propyl), a halogen atom (e.g., fluorine atom, chlorine atom, or bromine atom), a vinyl group, an aryl group (e.g., phenyl, p-tolyl, p-bromophenyl), trifluoromethyl, an alkoxy group (e.g., methoxy, ethoxy, methoxyethoxy), an aryloxy group (e.g., phenoxy, p-tolyloxy), cyano, a sulfonyl group (e.g., methanesulfonyl, trifluoromethansulfonyl), p-toluenesulfonyl), an alkoxycarbonyl group (e.g., ethoxycarbonyl, butoxycarbonyl), an amino group (e.g., amino, biscarboxymethylamino), an aryl group (e.g., phenyl, carboxyphenyl), a heterocyclic group (e.g., tetrahydrofurfuryl, 2-pyrrolidinone-1-yl), an acyl group (e.g., acetyl, benzoyl), an ureido group (e.g., ureido, 3-methylureido, 3-phenylureido), a thioureido group (e.g., thioureido, 3-methylthioureido), an alkylthio group (e.g., methylthio, ethylthio), an arylthio group (e.g., phenylthio), a heterocyclic-thio group (e.g., 2-thienythio, 3-thienylthio, 2-imidazolylthio), a carbonyloxy group (e.g., acetyloxy, propanoyloxy, benzoyloxy), an acylamino group (e.g., acetylamino, benzoylamino); and hydrophilic groups, such as a sulfo group, a carboxy group, a phosphono group, a sulfate group, hydroxy, mercapto, sulfino group, a carbamoyl group (e.g., carbamoyl, n-methylcarbamoyl, N,N-tetramethylenecarbamoyl), a sulfamoyl group (e.g., sulfamoyl, N,N-3-oxapentamethylenaminosulfonyl), a sulfonamido group (e.g., methanesulfonamido, butanesulfoneamido), a sulfonylaminocarbonyl group (e.g., methanesulfonylaminocarbonyl, ethanesulfonylaminocarbonyl), an acylaminosulfonyl group (e.g., acetoamidosulfonyl, methoxyacetoamidosulfonyl), an acylaminocarbonyl group (e.g., acetoamidocarbonyl, methoxyacetoamidocarbonyl), and a sulfinylaminocarbonyl group (e.g., methasulfinylaminocarbonyl, ethanesulfinylaminocarbonyl). Examples of aliphatic groups substituted by a hydrophilic group include carboxymethyl, carboxypentyl, 3-sulfatobutyl, 3-sulfopropyl, 2-hydroxy-3-sulfopropyl, 4-sulfobutyl, 5-sulfopentyl, 3-sulfopentyl, 3-sulfinobutyl, 3-phosphonopropyl, hydroxyethyl, N-methanesulfonylcarbamoylmethyl, 2-carboxy-2-propenyl, o-sulfobenzyl, p-sulfobenzyl and p-carboxybenzyl.

The lower alkyl group represented by R include a straight-chained or branched one having 1 to 5 carbon atoms, such as methyl, ethyl, @propyl, pentyl and isopropyl. The cycloalkyl group includes, e.g., cyclopropyl, cyclobutyl and cyclopentyl. The aralkyl group includes, e.g., benzyl, phenethyl, p-methoxyphenylmethyl and o-acetylaminophenylethyl; the lower alkoxy group includes one having 1 to 4 carbon atoms, including methoxy, ethoxy, propoxy and i-propoxy; the aryl group includes substituted or unsubstituted one, such as phenyl, 2-naphthyl, 1-naphthyl, o-tolyl, o-methoxyphenyl, m-chlorophenyl, m-bromophenyl, p-tolyl and p-ethoxyphenyl. These groups may be substituted by a substituent group, such as a phenyl group, a halogen atom (e.g., fluorine atom, chlorine atom, bromine atom, iodine atom), an alkoxy group or hydroxy.

The unsubstituted lower alkyl group represented by Ra or Rb includes those which are cited in R described above.

The lower alkyl group represented by Rc, Rd, Re or Rf includes a straight-chained or branched one having 1 to 5 carbon atoms, such as methyl, ethyl, @propyl, pentyl and isopropyl. The cycloalkyl group includes, e.g., cyclopropyl, cyclobutyl and cyclopentyl. The aralkyl group includes, e.g., benzyl, phenethyl, p-methoxyphenylmethyl and o-acetylaminophenyl-ethyl; the aryl group includes substituted or unsubstituted one, such as phenyl, 2-naphthyl, 1-naphthyl, o-tolyl, o-methoxyphenyl, m-chlorophenyl, m-bromophenyl, p-tolyl and p-ethoxyphenyl; and the heterocyclic group includes substituted or unsubstituted one, such as 2-furyl, 5-methyl-2-furyl, 2-thienyl, 2-imidazolyl, 2-methyl-1-imidazolyl, 4-phenyl-2-thiazolyl, 5-hydroxy-2-benzothiazolyl, 2-pyridyl and 1-pyrrolyl. These groups, as described above, may be substituted by a substituent group, such as a phenyl group, a halogen atom, an alkoxy group or hydroxy.

Examples of the substituents represented by $W_1$ to $W_4$, $W_{11}$ to $W_{14}$, $W_{21}$ to $W_{24}$, $W_{31}$ to $W_{34}$, $W_{41}$ to $W_{44}$ and $W_{51}$ to $W_{54}$ include an alkyl group (e.g., methyl, ethyl, butyl, I-butyl), an aryl group (including monocyclic and polycyclic ones such as phenyl and naphthyl), a heterocyclic group (e.g., thienyl, furyl, pyridyl, carbazolyl, pyrrolyl, indolyl), a halogen atom (e.g., fluorine atom, chlorine atom, bromine atom, iodine atom), a vinyl group, trifluoromethyl, an alkoxy group (e.g., methoxy, ethoxy, methoxyethoxy), an aryloxy group (e.g., phenoxy, p-tolyloxy), a sulfonyl group (e.g., methanesulfonyl, p-toluenesulfonyl), an alkoxycarbonyl group (e.g., ethoxycarbonyl, butoxycarbonyl), an amino group (e.g., amino, biscarboxymethylamino), an acyl group (e.g., acetyl, benzoyl), an ureido group (e.g., ureido, 3-methylureido), a thioureido group (e.g., thioureido, 3-methylthioureido), an alkylthio group (e.g., methylthio, ethylthio), an alkenyl thio group, an arylthio group (e.g., phenylthio), hydroxy and styryl.

These groups may be substituted by the same substituents as described in the aliphatic group represented by $R_1$. Examples of substituted alkyl group include 2-methoxyethyl, 2-hydroxyethyl, 3-ethoxycarbonylpropyl, 2-carbamoylethyl, 2-methanesulfonylethyl, 3-methanesulfonylaminopropyl, benzyl, phenethyl, carboxymethyl, carboxyethyl, allyl, and 2-furylethyl. Examples of substituted aryl groups include p-carboxyphenyl, p-N,N-dimethylaminophenyl, p-morpholinophenyl, p-methoxyphenyl, 3,4-dimethoxyphenyl, 3,4-methylenedioxyphenyl, 3-chlorophenyl, and p-nitrophenyl. Further, examples of substituted heterocyclic group include 5-chloro-2-pyridyl, 2-ethoxycarbonyl-2-pyridyl and 5-carbamoyl-2-pyridyl. $W_1$ and $W_2$, $W_3$ and $W_4$, $W_{11}$ and $W_{12}$, $W_{13}$ and $W_{14}$, $W_{21}$ and $W_{22}$, $W_{23}$ and $W_{24}$, $W_{31}$ and $W_{32}$, $W_{33}$ and $W_{34}$, $W_{41}$ and $W_{42}$, $W_{43}$ and $W_{44}$, $W_{51}$ and $W_{52}$ or $W_{53}$ and $W_{54}$ each pair may combine to form a condensed ring, such as 5- or 6-membered saturated or unsaturated condensed carbon rings, which are further substituted by substituents as described in the aliphatic group.

Among the groups represented by $V_1$ to $V_9$, $V_{11}$ to $V_{13}$, $V_{21}$ to $V_{29}$, and $V_{31}$ to $V_{33}$, the halogen atom includes, e.g., a fluorine atom, chlorine atom, bromine atom and iodine atom; the amino group includes, e.g., amino, dimethylamino, diphenylamino, and methylphenylamino; the alkylthio group includes substituted and substituted ones, such as phenylthio or m-fluorphenylthio; the lower alkyl group includes straight-chained or branched one having five or less carbon atoms, such as methyl, ethyl, propyl, butyl, pentyl or isopropyl; the lower alkoxy group includes one having four or less carbon atoms, such as methoxy, ethoxy, propoxy, or isopropoxy; the aryl group includes substituted and unsubstituted ones, such as phenyl, 2-naphthyl, 1-naphthyl, o-tolyl, o-methoxyphenyl, m-chlorophenyl, m-bromophenyl, p-tolyl, and p-ethoxyphenyl; the aryloxy group includes substituted and unsubstituted ones, such as phenoxy, p-tolyloxy, and m-carboxyphenyloxy; and the heterocyclic group includes substituted or unsubstituted ones, such as 2-furyl, 5-methyl-2-furyl2-thienyl, 2-imidazolyl, 2-methyl-1-imidazolyl, 4-phenyl-2-thiazolyl, 5-hydroxy-2-benzothiazolyl, 2-pyridyl, and 1-pyrrolyl. These groups may further be substituted by a substituent group, such as a phenyl group, a halogen atom, alkoxy group, or hydroxy. $V_1$ and $V_3$, $V_2$ and $V_4$, $V_3$ and $V_5$, $V_4$ and $V_6$, $V_5$ and $V_7$, $V_6$ and $V_8$, $V_7$ and $V_9$, $V_{11}$ and $V_{13}$, $V_{21}$ and $V_{23}$, $V_{22}$ and $V_{24}$, $V_{23}$ and $V_{25}$, $V_{24}$ and $V_{26}$, $V_{25}$ and $V_{27}$, $V_{26}$ and $V_{28}$, $V_{27}$ and $V_{29}$, and $V_{31}$ and $V_{33}$ each pair may combine to form a 5- to 7-membered ring, such as a cyclopentene ring, cyclohexene ring, cycloheptene ring, and decalin ring, each of which may further be substituted by a lower alkyl group, lower alkoxy group or aryl group, as described in R.

The methylene group represented by $L_1$ to $L_9$, $L_{11}$ to $L_{15}$, $L_{41}$ to $L_{49}$ and $L_{51}$ to $L_{55}$ each are a substituted or unsubstituted methylene group. Examples of the substituent thereof include fluorine and chlorine atoms, a substituted or unsubstituted lower alkyl group(e.g., methyl, ethyl, I-propyl, benzyl), and a substituted or unsubstituted alkoxy group (e.g., methoxy, ethoxy), a substituted or unsubstituted aryloxy group (e.g., phenoxy, naphthoxy), a substituted or unsubstituted aryl group (e.g., phenyl, naphthyl, p-tolyl, o-carboxyphenyl), $N(U_1)(U_2)$, —SRg, a substituted or unsubstituted heterocyclic group [e.g., 2-thienyl, 2-furyl, N,N'-bis(methoxyethyl)barbituric acid], in which Rg is a lower alkyl group, an aryl group or a heterocyclic group and examples of —SRg include methylthio, ethylthio, benzylthio, phenylthio and tolylthio groups; $U_1$ and $U_2$ are each a substituted or unsubstituted lower alkyl group or aryl group, provided that $V_1$ and $V_2$ may combine to form a 5- or 6-membered nitrogen containing heterocyclic ring (e.g., pyrazole ring, pyrrole ring, pyrrolidine ring, morpholine ring, pyperizine ring, pyridine, pyrimidine ring, etc.). Methylene groups which are adjacent or distant by one may combine to form a 5- or 6-membered ring.

In cases where the compound represented by formulas (1) to (6) is substituted with a cationic- or anionic-charged group, a counter ion is formed by an anionic or cationic equivalent to compensate an intramolecular charge. As an ion necessary to compensate the intramolecular charge, which is represented by $X_1$, $X_{11}$, $X_{21}$, $X_{31}$, $X_{41}$ or $X_{51}$, examples of cations include a proton, an organic ammonium ion (e.g., triethylammonium, triethanolammonium) and inorganic cations (e.g., cations of lithium, sodium and potassium); and examples of acid anions include halide ions (e.g., chloride ion, bromide ion, iodide ion), p-toluenesulfonate ion, perchlorate ion, tetrafluoroborate ion, sulfate ion, methylsulfate ion, ethylsulfate ion, methanesulfonate ion, trifluoromethanesulfonate ion).

The infrared sensitizing dye according to the invention is characterized in that a three ring-condensed heterocyclic nucleus is formed by bonding between a nitrogen atom contained in a benzothiazole ring and a carbon atom at a peri-position; and that the dye is a long chain polymethine dye, in which a sulfonyl group is substituted on the benzene ring of the benzothiazole ring. It is not definitely clarified why the use of these dyes leads to high sensitivity, low fogging and superior storage stability. It is assumed that the dye containing a three ring-condensed heterocyclic ring easily form an aggregate of a stacking structure when forming a dye structure. It is further assumed that a benzoazole ring substituted with a sulfinyl or sulfonyl group contains a sulfur atom exhibiting higher hydrophilicity and less interaction with silver than a thioether, and an electron-withdrawing action of this group lowers the ground state of the dye to advantageously prevent direct influences such as fogging, leading to advantageous effects such as antifogging or stabilization. Furthermore, the polarized structure between an oxygen atom and a sulfur atom may advantageously act on interaction between dye molecules, stabilizing the dye aggregate.

Of spectral sensitizing dyes represented by formulas (3) to (5) and (6), those which have a substituted methine chain are preferred; and those which have a structure of forming a ring on the methine chain are also preferred.

Exemplary examples of the sensitizing dyes represented by formulas (1) to (4) and the sensitizing dyes represented by by formulas (5) and (6) are shown below, but are not limited to these.

Compound represented by Formulas (1) to (4):
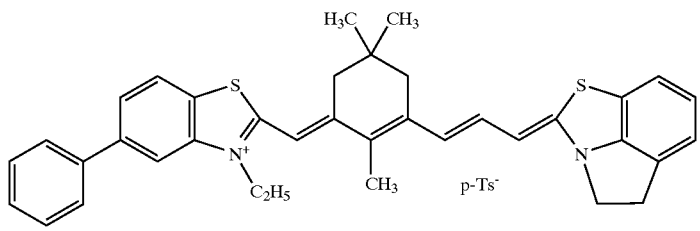
No. S-1
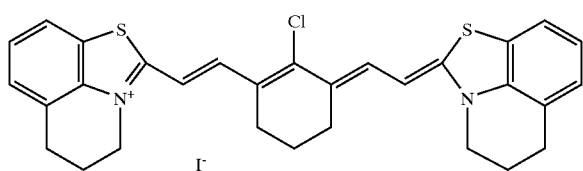
No. S-2
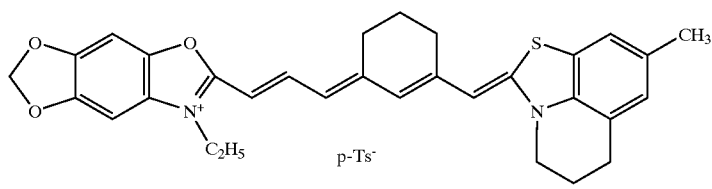
No. S-3
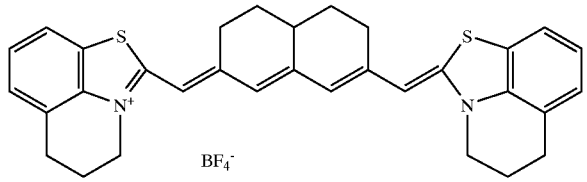
No. S-4
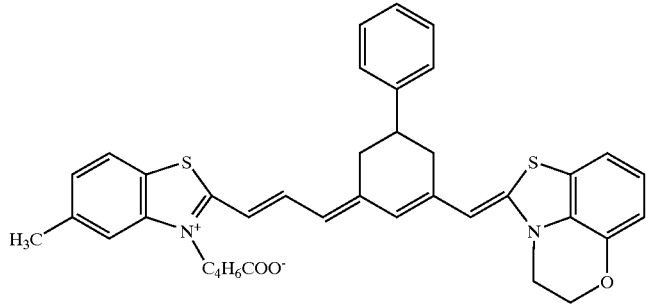
No. S-5
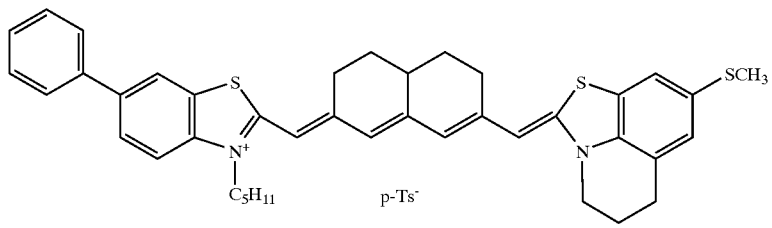
No. S-6
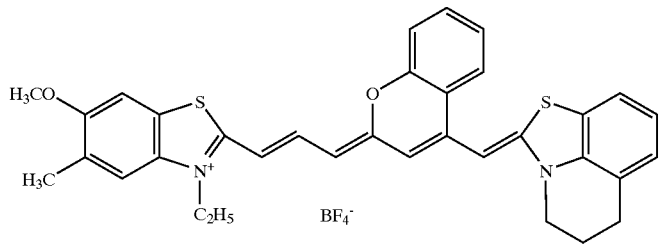
No. S-7

-continued
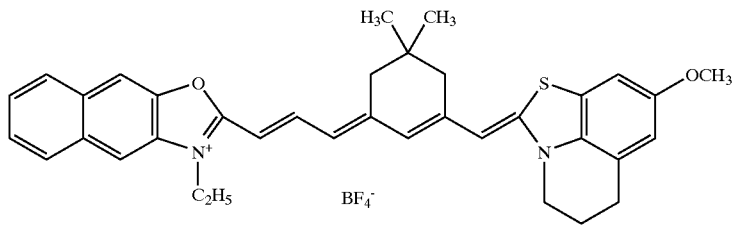
No. S-8
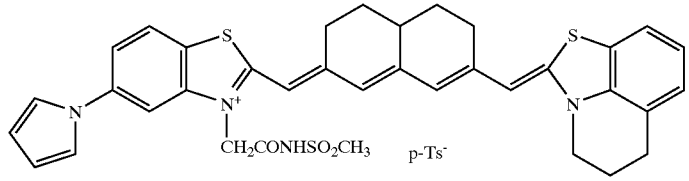
No. S-9
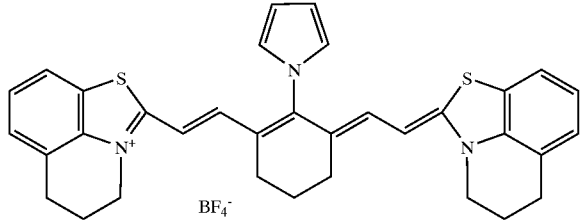
No. S-10
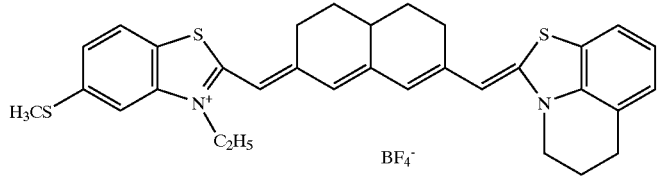
No. S-11
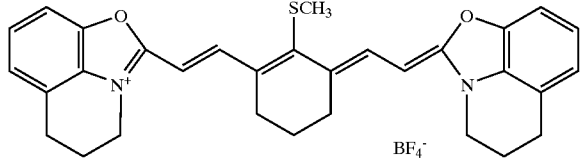
No. S-12
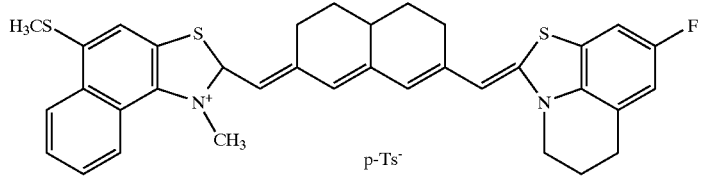
No. S-13
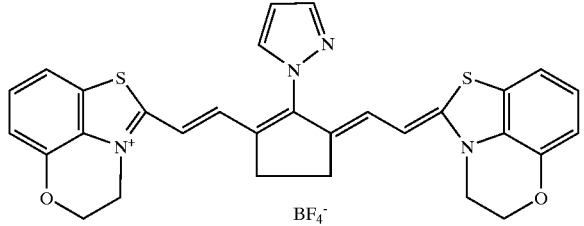
No. S-14

-continued
No. S-15
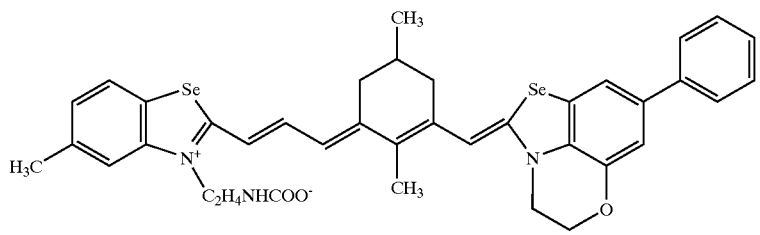
No. S-16
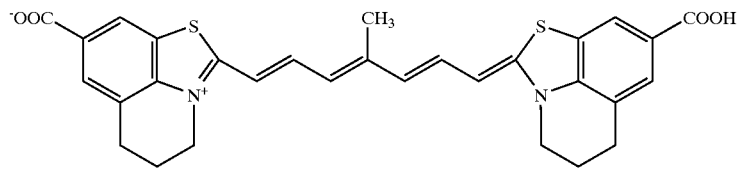
No. S-17
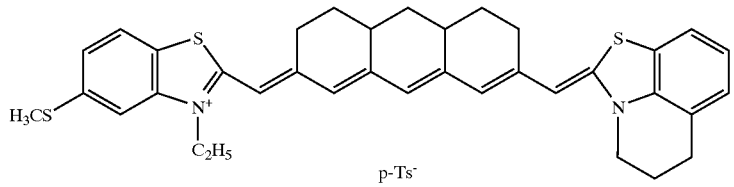
No. S-18
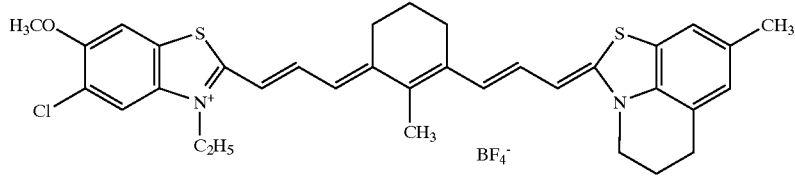
No. S-19
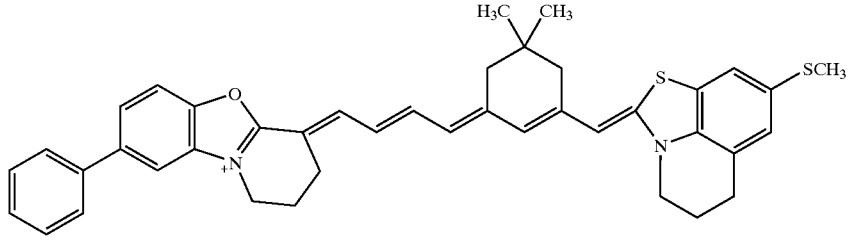
No. S-20
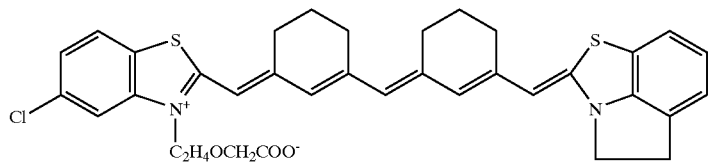
No. S-21
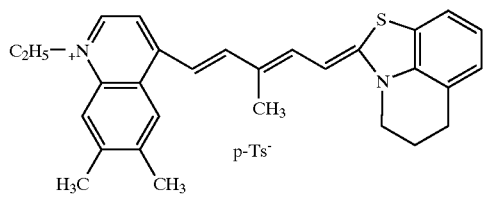
No. S-22
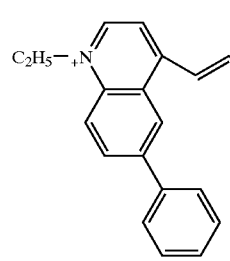

-continued
No. S-23
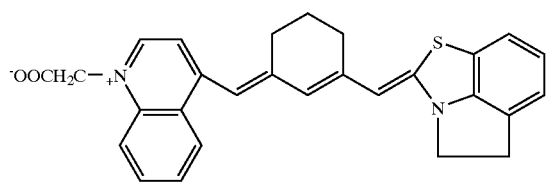
No. S-24
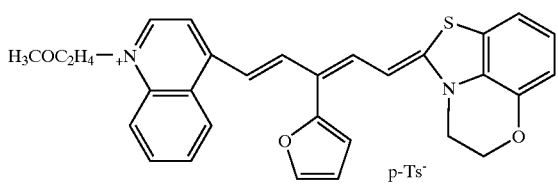
No. S-25
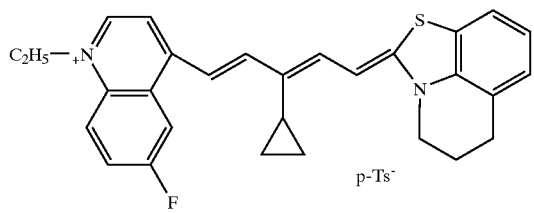
No. S-26
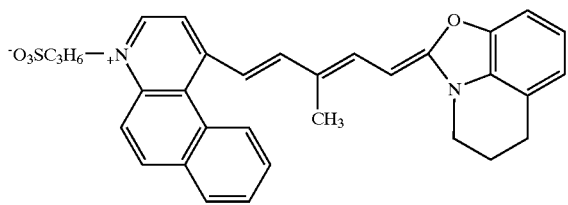
No. S-27
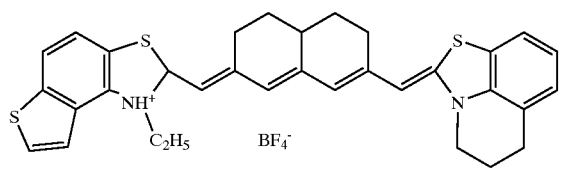
No. S-28
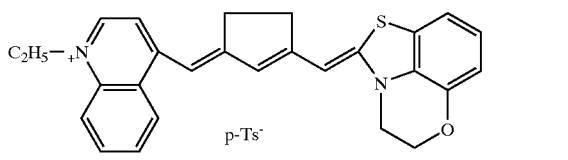
No. S-29
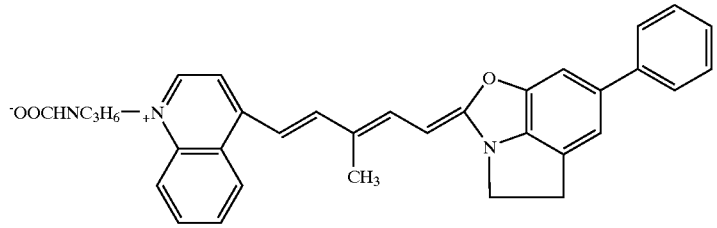
No. S-30
No. S-31
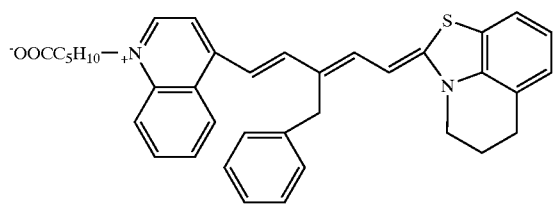
No. S-32
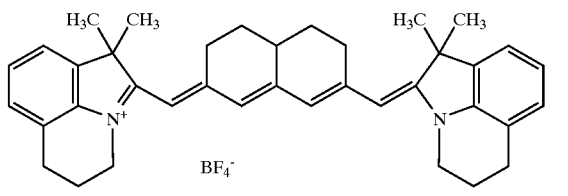
No. S-33
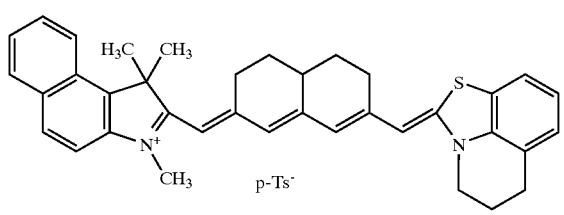
No. S-34
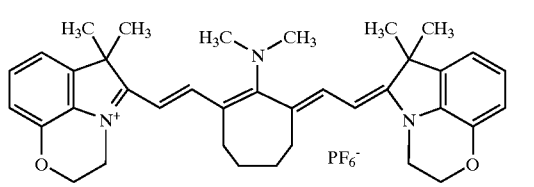

-continued
No. S-35
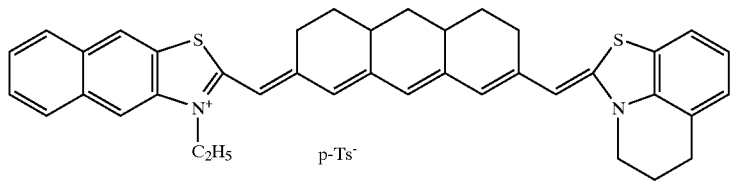
No. S-36
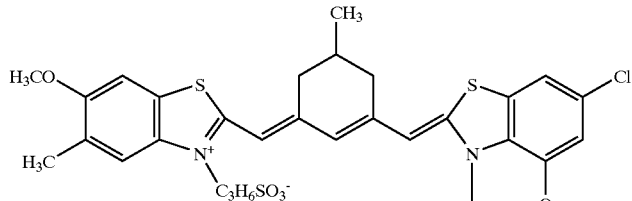
No. S-37
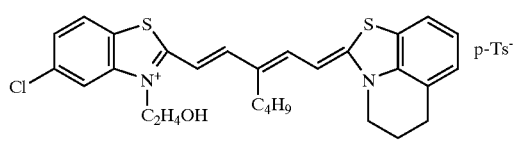
No. S-38
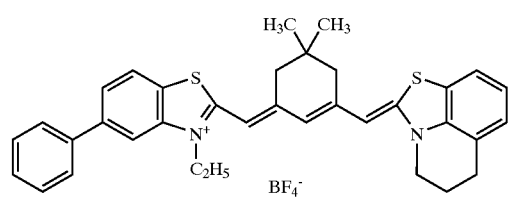
No. S-39
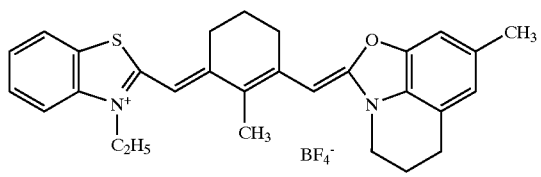
No. S-40
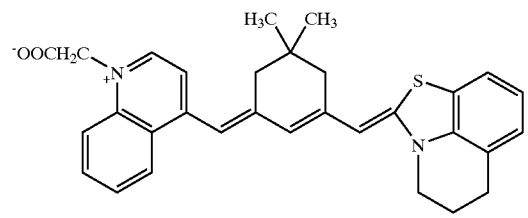
No. S-41
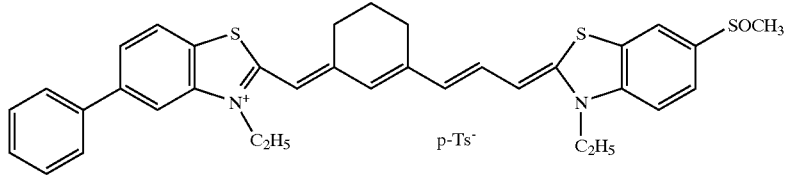
No. S-42
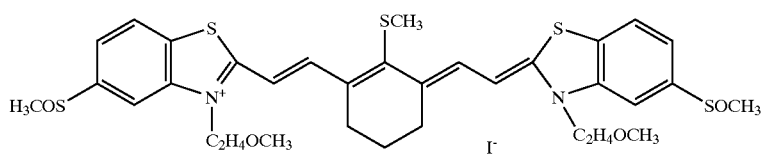
No. S-43
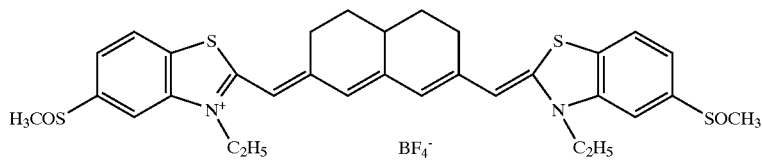
No. S-44
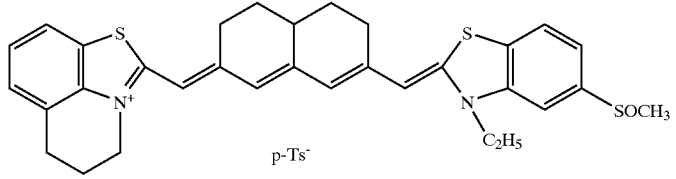

-continued
No. S-45
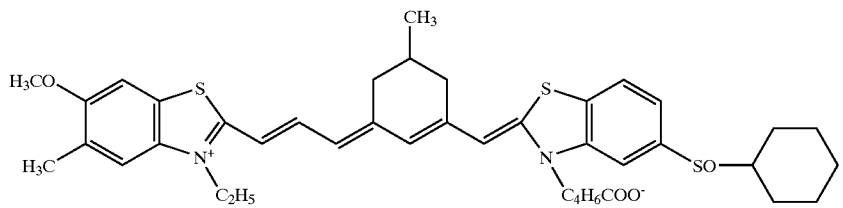
No. S-46
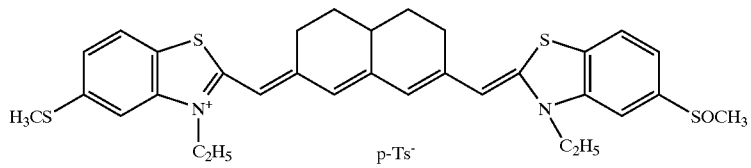
No. S-47
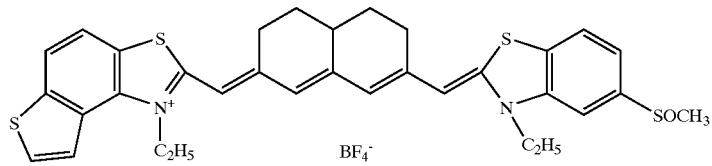
No. S-48
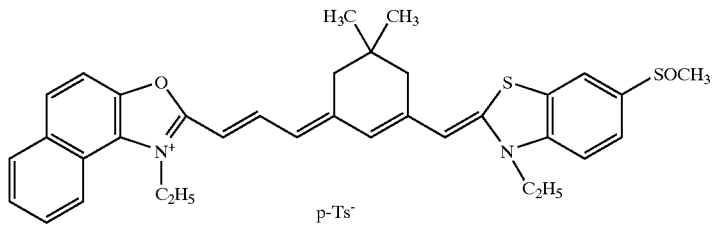
No. S-49
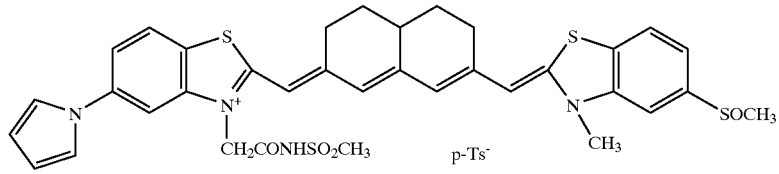
No. S-50
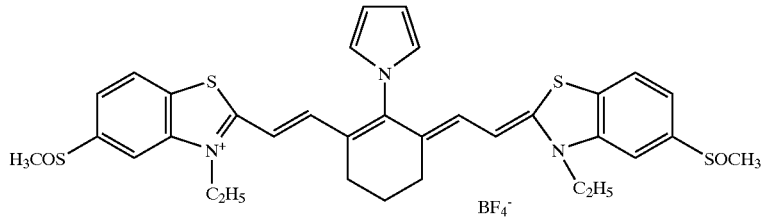
No. S-51
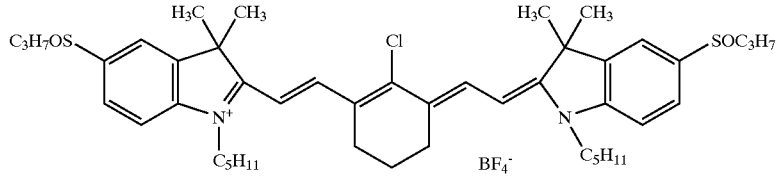
No. S-52
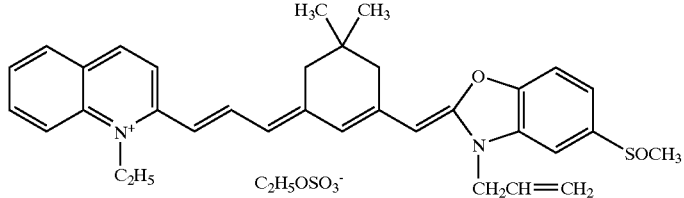

-continued
No. S-53
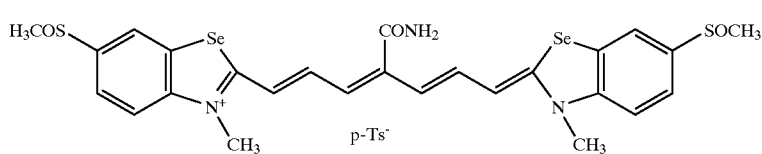
No. S-54
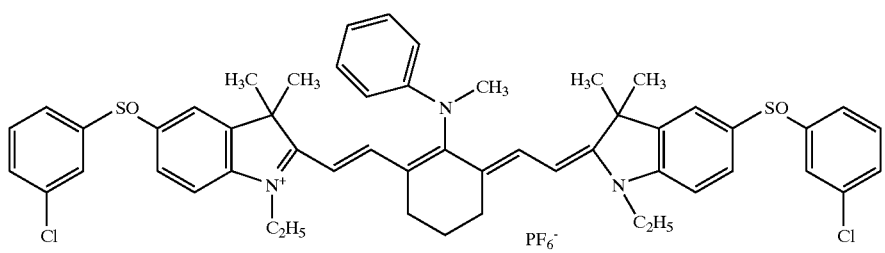
No. S-55
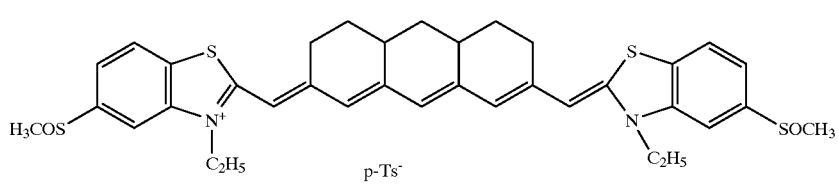
No. S-56
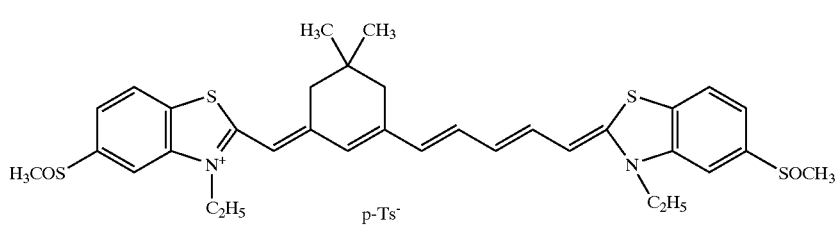
No. S-57
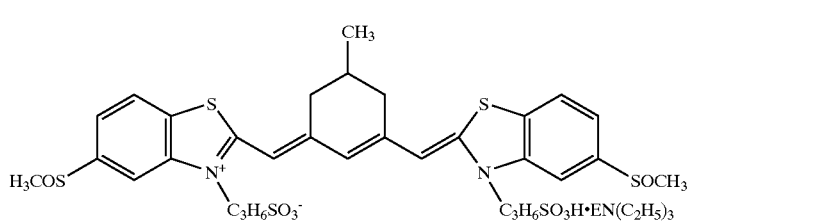
No. S-58
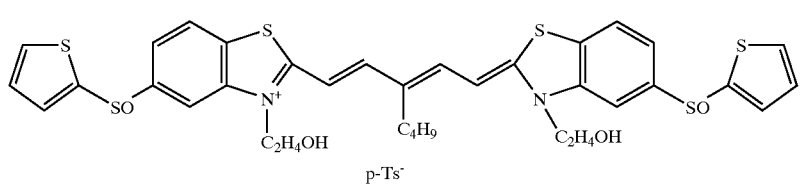
No. S-59
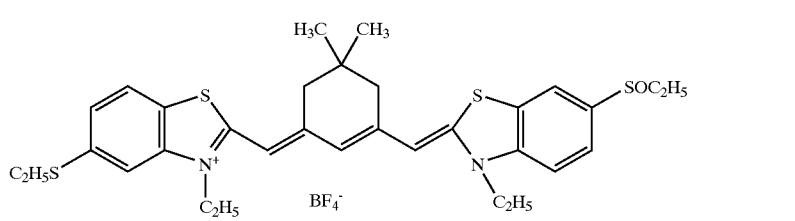
No. S-60
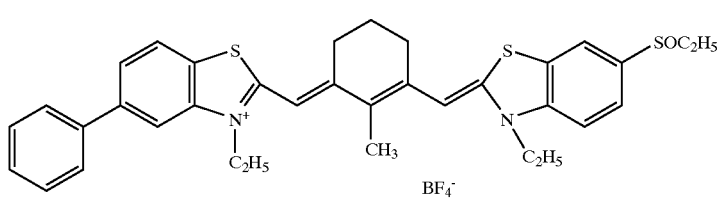

-continued
No. S-61
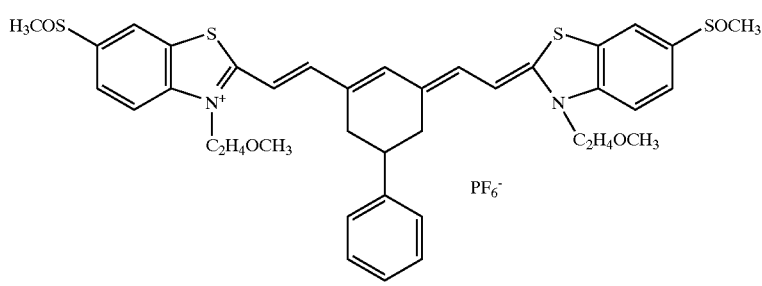
No. S-62
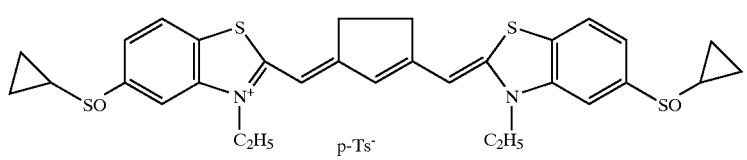
No. S-63
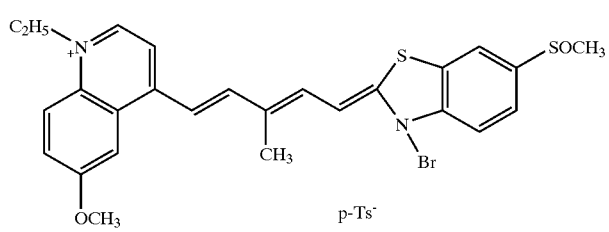
No. S-64
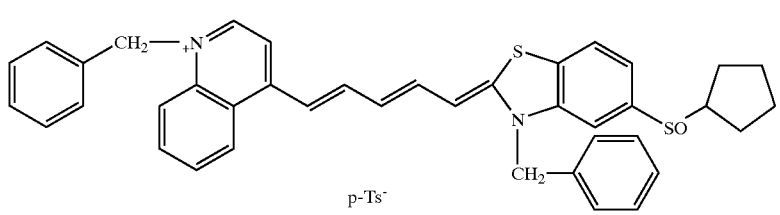
No. S-65
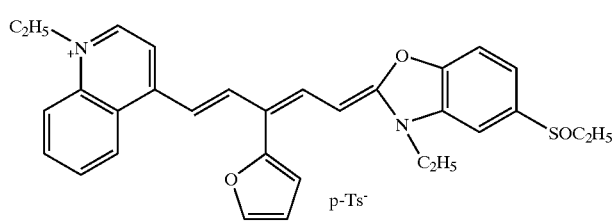
No. S-66
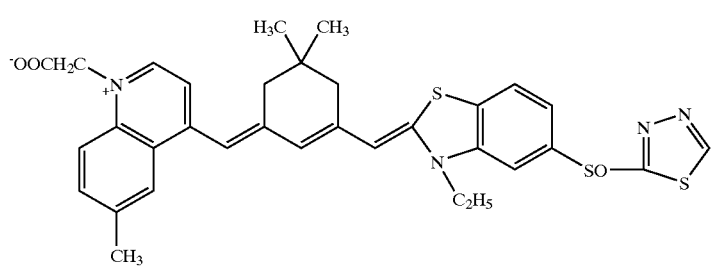
No. S-67
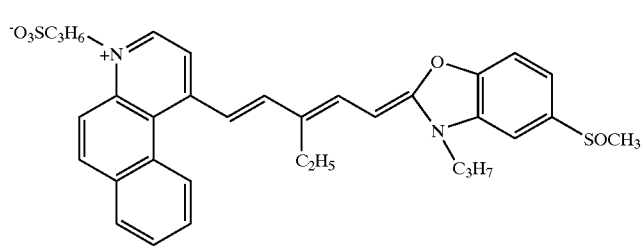

-continued
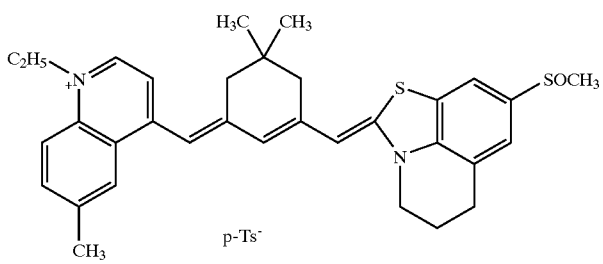
No. S-68
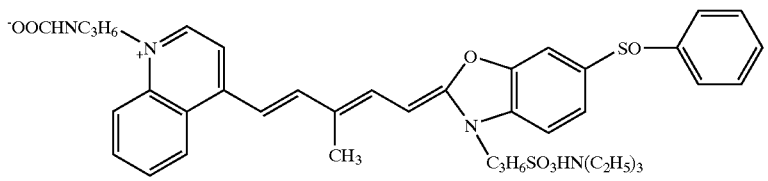
No. S-69
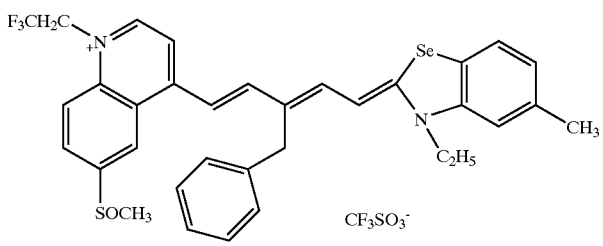
No. S-70
Compound represented by Formulas (5) and (6):
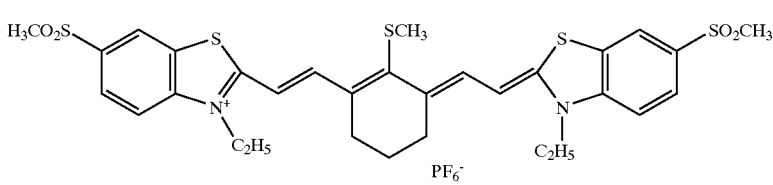
No. 1
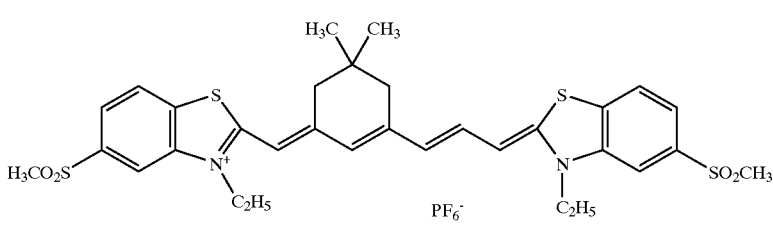
No. 2
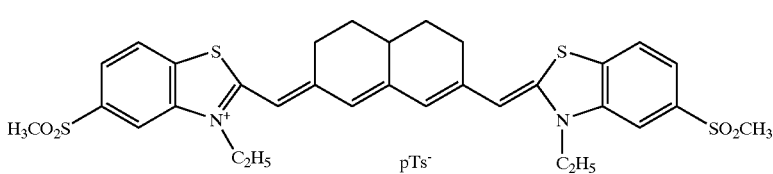
No. 3
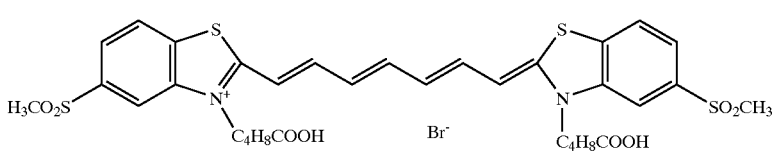
No. 4

No. 5
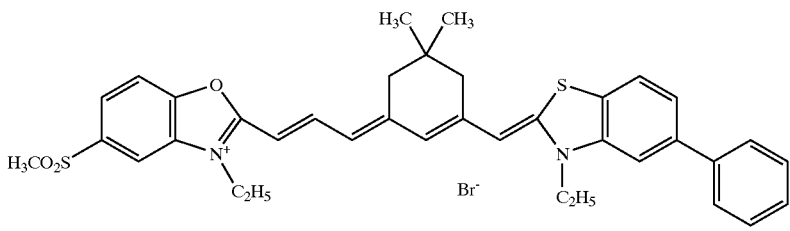

No. 6
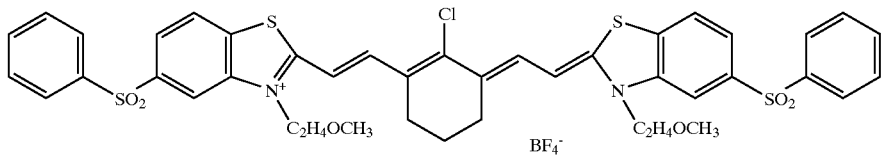

No. 7
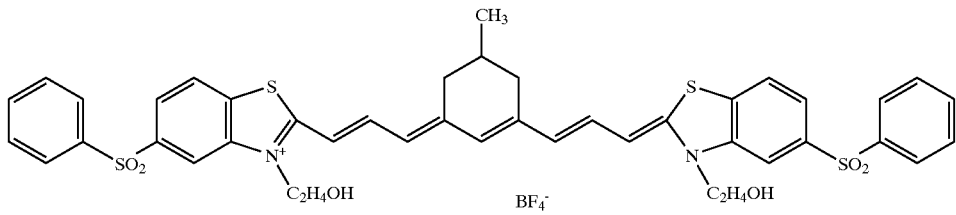

No. 8
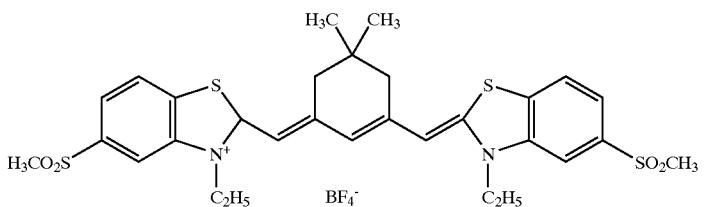

No. 9
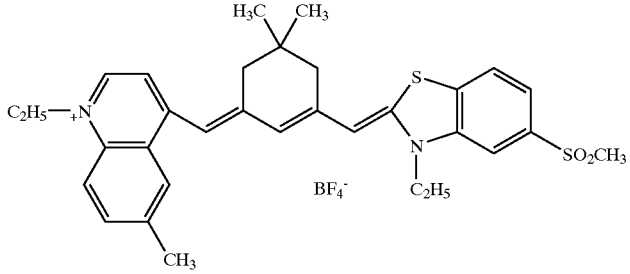

No. 10
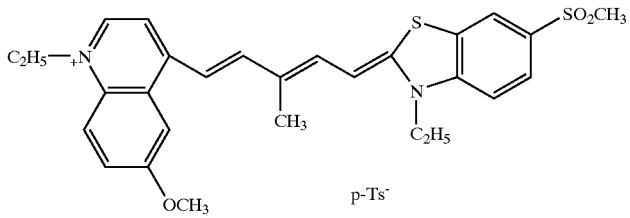

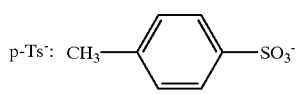

The infrared sensitizing dyes and spectral sensitizing dyes described above can be readily synthesized according to the methods described in F. M. Hammer, The Chemistry of Heterocyclic Compounds vol.18, "The cyanine Dyes and Related Compounds" (A. Weissberger ed. Interscience Corp., New York, 1964); J. Ber., 64, 1664–1674 (1931); Ukrain. Khim. Zhur., 21, 744–749 (1955); British patents 625,245 and 895,930; U.S. Pat. Nos. 2,320,439 and 2,398,999.

Synthesis of the compounds described above are exemplarily explained as below.

Synthesis Example 1

Synthesis of Compound No. S-4

In 2.5 ml of m-cresol was dissolved 4.51 g (0.02 molw) of 5,6-dihydro-2-methyl-4H-thoazolo[5,4,3-ij]quinolinium hydrochloric acid salt, which was synthesized according to the method described in Ukrain. Khim. Zhur., 21, 744–749 (1955) and 2.0 g (0.01 mole) of 2,7-dimethoxy-1,4,5,8-tetrahydronaphthalene was added thereto and heated in an oil bath at 120° C. for 10 min., while stirring. Subsequently, 50 ml ethanol and 1 g triethylamine was further added thereto and heated in a water bath at 70° C. for 30 min., while stirring. To the reaction mixture was added 1 g of sodium tetrafluoroborate and cooled with stirring to form precipitates. The resulting crystals were separated from the solution by filtration and were recrystallized from a mixed solvent of fluoroalcohol and methanol to obtain 0.41 g purified product. Mass spectrum gave a molecular ion peak at 507, which was in agreement with a molecular weight of the intended structure. The absorption maximum in methanol was 744.4 nm ($\epsilon$: 221,000).

Synthesis Example 2

Synthesis of Compound No. S-11

Synthesis of intermediate {3-ethyl-2-[(7-methoxy-3,4,5,6-tetrahydro-1H-2-naphthylidene)methyl]-5-methylthiobenzothiazolium-p-toluenesulfonate}

3-ethyl-2-methyl-5-methylthiobenzothiazolium-p-tolyenesulfonate of 19.75 g (0.05 mole) and 2,7-dimethoxy-1,4,5,8-tetrahydronaphthalene of 28.8 g (0.15 mole) were mixed in 40 ml dimethylsulfoxide and heated in a oil bath at 120° C. for 15 min, while stirring. The reaction mixture was added with ethyl acetate, diluted to five times and crystallized out of solution upon sufficiently cooling. The crystals was separated from the solution by filtration and washed with ethyl acetate to obtain 16.2 g of substituted product. The produced intermediate exhibited an absorption maximum at 496 nm in methanol($\epsilon$: 57,700).

Dye Condensation 5,6-Dihydroxy-2-methyl-4H-thiazolo[5,4,3-ij]quinolinium hydrochloric acid salt of 10.4 g, p-toluenesulfonic acid ethyl ester of 2.26 g (0.01 mole) and 3-ethyl-2-[(7methyl-3,4,5,6-tetrahydro-1H-2-naphthylidene)methyl]-5-methylthiobenzothiazolium-p-toluenesulfonate of 5.56 g (0.01 mole) were dissolved in 5.0 ml m-cresol and heated in an oil bath at 120° C. for 15 min., while stirring. Subsequently, 100 ml ethanol and 2 g triethylamine were added thereto and heated in a water bath at 80° C. for 30 min., while stirring. The reaction mixture was added with 2 g of sodium tetrafluoroborate and crystallized out of solution upon cooling with stirring. The crystals were separated from the solution by filtration, washed with water and recrystallized from mixed solvents of fluoroalcohol and methanol to obtain 1.1 g purified product. Mass spectrum gave a molecular ion peak at 541, which was in agreement with a molecular weight of the intended structure. The absorption maximum in methanol was 749.50 nm ($\epsilon$: 193,000).

Synthesis Example 3

Synthesis of Compound No. S-43

Synthesis of intermediate 1 (2-methyl-5-methylsulfonyl-benzothiazole)

In 100 ml methanol was dissolved 3.9 g (0.02 mole) of 2-methyl-5-methylthiobenzothiazole and 100 ml aqueous solution containing 5.2 g (0.024 mole) sodium periodate was added thereto and stirred at room temperature for 1 hr. The reaction mixture was condensed under reduced pressure to remove methanol, an aqueous 5% sodium hydrogen carbonate solution was added to make weak alkaline, was further added with sodium chloride and extracted with ethyl acetate. The extracted solution was condensed and the resulting precipitates were separated from solution by filtration. Crystals were purified by recrystallization from mixed solvents of ethyl acetate and n-hexane (at a yield of 75%), exhibiting a melting point of 95.97° C.

Synthesis of intermediate 2 (3-ethyl-2-methyl-5-methylsulfinylbenzothiazolium-p-toluenesulfonate)

2-Methyl-5-methylsulfinylbenzothiazole of 2.1 g (0.01 mole) and ethyl p-toluenesulfonate of 2.4 g (0.012 mole) were mixed and heated in an oil bath at 120 to 130° C. for 8 hrs. The reaction mixture was separated by means of column chromatography using silica gel and mixed solvents of ethyl acetate/methanol (2:1) and eluted with methanol solution. To the methanol eluate was added activated carbon, stirred and separated by filtration. The resulting filtrate was condensed under reduced pressure and dried to obtain 1.7 g of intended viscous solid substance. This intermediate compound was used in the following dye condensation reaction without purification.

Dye Condensation 3-ethyl-2-methyl-5-methylsulfinylbenzothiazolium-p-toluenesulfonate of 1.6 g (0.004 mole) and 2,7-dimethoxy-1,4,5,8-tetrahydronaphthalene of 0.3 g (0.0015 mole) were dissolved in 0.5 m-cresol and heated in an oil bath at 120° C. for 15 min., while stirring. Subsequently, 5 ml ethanol and 0.g triethylamine were added thereto and heated in a water bath at 80° C. for 10 min., while stirring. The reaction mixture was added with 4 ml of aqueous 50% ethanol solution containing 0.4 g of sodium tetrafluoroborate and crystallized out of solution upon cooling with stirring. The crystals were separated from the solution by filtration, washed with water and recrystallized from mixed solvents of fluoroalcohol and methanol to obtain 0.15 g purified product. Mass spectrum gave a molecular ion peak at 607, which was in agreement with a molecular weight of the intended structure. The absorption maximum in methanol was 747.30 nm ($\epsilon$: 228,000).

The sensitizing dye used in the invention may be used alone or in combination. Specifically, a combination of dyes represented by formula (3) and (5), and a combination of dyes represented by formulas (4) and (6) are preferred. In either case when used alone or used in combination, the total amount of the dye(s) to be incorporated is preferably $1\times10^{-6}$ to $5\times10^{-3}$, more preferably $1\times10^{-5}$ to $2.5\times10^{-3}$, and still more preferably $4\times10^{-5}$ to $1\times10^{-3}$ mol per mol of silver halide.

In cases when dyes are used in combination, the dyes can be incorporated in any proportion. The dye may be directly dispersed in a silver halide emulsion. Alternatively, the may be dissolved in an appropriate solvent such as methanol, ethanol, n-propanol, methyl cellosolve, acetone, water, pyridine, or a mixture thereof and added to the emulsion in the form of a solution. Ultrasonic can also be employed. The sensitizing dye can be added in such a manner that a dye is dissolved in a volatile organic solvent, the resulting solution is dispersed in a hydrophilic colloidal medium and the dispersion is added to the emulsion, as described in U.S. Pat. No. 3,469,987; a water-insoluble dye is dispersed in aqueous medium without being dissolved and the dispersion is added to the emulsion, as described in JP-B 46–24185 (hereinafter, the term, JP-B means a published Japanese Patent); a dye is dissolved using a surfactant and the resulting solution is added to the emulsion, as described in U.S. Pat. No. 3,822,135; a dye is dissolved using a compound capable of shifting to longer wavelengths and the solution is added to the emulsion, as described in JP-A 51-74624; or a dye is dissolved in an acid substantially containing no water and the solution is added to the emulsion, as described in JP-A 50-80826. Further, the dye may be added according to the method described in U.S. Pat. Nos. 2,912,343, 3,342,605, 2,996,287 and 3,492,835. The dye may be homogeneously dispersed in a silver halide emulsion before coating on a support, or may be dispersed at any stage of preparing the silver halide emulsion.

In cases when used in combination, the dyes can be independently or in the form of a mixture dispersed in a silver halide emulsion. Together with the dye(s), a visible region-absorbing dye capable of exhibiting supersensitization, a dye not exhibiting supersensitization, or a compound having no absorption in the visible region may be incorporated into the emulsion. Usable sensitizing dyes and substances exhibiting supersensitization in combination with the dye are described in Research Disclosure (hereinafter, also denoted as "RD") vol. 176, item 17643 (December, 1978) page 23, section IV-J; JP-B 49-15500 and 43-4933; and JP-A 59-9032, 3-15049 and 62-123454.

Techniques described in Research Disclosure No. 308119 (hereinafter, also denoted such as RD 308119) are applicable to the silver halide emulsions used in the invention, as shown below. The silver halide emulsions include those which are used in color and black-and-white photographic light sensitive materials.

| Item | RD 308119 |
| --- | --- |
| Iodide | 993, I-A |
| Preparing method | 993, I-A; 994, I-E |
| Crystal habit (regular crystal) | 993, I-A |
| Crystal habit (twinned crystal) | 993, I-A |
| Epitaxial | 993, I-A |
| Halide composition (uniform) | 993, I-B |
| Halide composition (non-uniform) | 993, I-B |
| Halide conversion | 994, I-C |
| Halide substitution | 994, I-C |
| Metal occlusion | 994, I-D |
| Grain size distribution | 995, I-F |
| Solvent addition | 995, I-F |
| Latent image forming site (surface) | 995, I-G |
| Latent image forming site (internal) | 995, I-G |
| Photographic material (negative) | 995, I-H |
| Photographic material (positive) | 995, I-H |
| Emulsion blending | 995, I-J |
| Desalting | 995, II-A |

The silver halide emulsion according to the invention is subjected to physical ripening, chemical ripening and spectral sensitization. As additives used in these processes are shown compounds described in Research Disclosure No. 17643, No. 18716 and No. 308119 (hereinafter, denoted as RD 17643, RD 18716 and RD 308119), as below.

| Item | RD 308119 | RD 17643 | RD 18716 |
| --- | --- | --- | --- |
| Chemical Sensitizer | 996, III-A | 23 | 648 |
| Spectral Sensitizer | 996, IV-A-A,B,C, D,H,I,J | 23–24 | 648–9 |
| Super Sensitizer | 996, IV-A-E,J | 23–24 | 648–9 |

-continued

| Item | RD 308119 | RD 17643 | RD 18716 |
| --- | --- | --- | --- |
| Antifoggant | 998, VI | 24–25 | 649 |
| Stabilizer | 998, VI | 24–25 | 649 |

Photographic additives usable in the invention are also described, as below.

| Item | RD 308119 | RD 17643 | RD 18716 |
| --- | --- | --- | --- |
| Anti-staining agent | 1002, VII-I | 25 | 650 |
| Dye Image-Stabilizer | 1001, VII-J | 25 | |
| Whitening Agent | 998, V | 24 | |
| U.V. Absorbent | 1003, VIII-C, XIII-C | 25–26 | |
| Light Absorbent | 1003, VIII | 25–26 | |
| light-Scattering Agent | 1003, VIII | | |
| Filter Dye | 1003, VIII | 25–26 | |
| Binder | 1003, IX | 26 | 651 |
| Antistatic Agent | 1006, XIII | 27 | 650 |
| Hardener | 1004, X | 26 | 651 |
| Plasticizer | 1006, XII | 27 | 650 |
| Lubricating Agent | 1006, XII | 27 | 650 |
| Surfactant, Coating aid | 1005, XI | 26–27 | 650 |
| Matting Agent | 1007, XVI | | |
| Developing Agent (included in photographic material) | 1001, XXB | | |

A variety of couplers can be employed in the invention and examples thereof are described in research Disclosures described above. Relevant description portions are shown below.

| Item | RD 308119 | RD 17643 |
| --- | --- | --- |
| Yellow coupler | 1001, VII-D | 25, VII-C~G |
| Magenta coupler | 1001, VII-D | 25, VII-C~G |
| Cyan coupler | 1001, VII-D | 25, VII-C~G |
| Colored coupler | 1002, VII-G | 25, VII-G |
| DIR coupler | 1001, VII-F | 25, VII-F |
| BAR coupler | 1002, VII-F | |
| PUG releasing coupler | 1001, VII-F | |
| Alkali-soluble coupler | 1001, VII-E | |

Additives used in the invention can be added by dispersing methods described in RD 308119 XIV. In the invention are employed supports described in RD 17643, page 28; RD 18716, page 647–648; and RD 308119 XIX. In the photographic material according to the invention, there can be provided auxiliary layers such as a filter layer and interlayer, as described in RD 308119 VII–K, and arranged a variety of layer orders such as normal layer order, reverse layer order and unit layer arrangement.

Silver halide photographic light sensitive materials used in the invention can be processed by use of commonly known developing agents described in T. H. James, The Theory of the Photographic Process, Fourth edition, page 291 to 334; and Journal of American Chemical Society, 73, 3100 (1951), including, e.g., hydroquinone, p-aminophenol, N-methyl-p-aminophenol, 2,4-aminophenol, 2,4-diaminophenol as described in JP-A 4-15641; 1-phenyl-3-pyrazolidones such as 1-phenyl-3-pyrazolidone, 1-phenyl-4-methyl4-hydroxymethyl-3-pyrazolidone, and 5,5-dimethyl-1-phenyl-3-pyrazolidone and according the conventional method described in RD17643, pages 28–29, RD18716, page 615 and RD308119, XIX.

Infrared sensitizing dyes used in the invention can also be advantageously applicable to thermally developable photosensitive materials. As is conducted in the techniques of conventional silver halide emulsions, after the dye is allowed to adsorb onto silver halide grains, the silver halide grain emulsion may be mixed with an organic silver salt. Alternatively, after an organic silver salt and silver halide are mixed, the dye may be added thereto in a manner similar to the conventional silver halide emulsions described above. Plural dyes may be used to perform supersensitization. For example, the infrared sensitizing dye may be used in combination with sensitizing dyes described in RD17643 section IV–X (December 1978, page 23) and Rd18431, section X (August 1979, page 437), or other sensitizing dyes. Further, a supersensitizer exhibiting no absorption in the visible region may be used in combination, as used in conventional silver halide techniques. As described later, instead of preparing silver halide in ex citu and mixing it with the dye, spectral sensitization can be achieved by converting a part of the organic silver salt to silver halide and by further adding the dye thereto.

The present invention also relates to thermally developable photosensitive materials containing an infrared sensitizing dye represented by formulas (1) to (4), a preparation method thereof and an image recording method and image forming method by use thereof.

These infrared sensitizing dyes are superior in adsorption to silver halide and enhancing sensitivity and storage stability, as compared to conventionally used infrared sensitizing dyes. However, there still remains problems such that in cases when applied to thermally developable photosensitive materials, marked reduction in sensitivity after pre-exposure storage of the photosensitive material or being allowed to stand in the form a solution at the stage of preparing a coating solution; and improvements thereof are desired. It is contemplated that such problems are caused due to the fact that the thermally developable photosensitive material is difference in constitution from the conventional silver halide photographic material, which is to be subjected to liquid processing. The present invention was accomplished as a result of the inventor's study to solve the problems.

Thermally developable photosensitive materials comprise a photosensitive silver halide, an organic silver salt, a reducing agent, adjuvants such as a tone modifier (also called image tone-providing agent or activator toner) and a binder. Specifically, the tone modifier also promotes development and compounds having a strong affinity for a silver ion are employed. Examples of representative tone modifiers include phthalazines, phthalazinones, and benzenepolycarboxlic acids and their anhydrides. The tone modifier concerns oxidation-reduction reaction of the organic silver salt and reducing agent, having a function of enhancing silver image density or blackening image tone. The tone modifier may be incorporated into a non-photosensitive layer or a photosensitive silver halide layer. In any case thereof, it was found that adding the tone modifier immediately before coating a photosensitive coating solution was preferred, enhancing sensitivity and reducing variation in photographic performance during standing of the photosensitive coating solution. It is contemplated that these advantageous effects are related to infrared sensitizing dyes used in the invention. Such effects are also unexpected and surprising.

The reason for the effects is not definitely clarified. It is contemplated that these compounds have a high affinity for a silver compound, affecting adsorption of a sensitizing dye, and a protic compound of the tone modifier undergoes protonation to a sensitizing dye, possibly affecting absorption and stability of the sensitizing dye. In fact, there was found a difference in sensitivity spectrum (or spectral sensitivity distribution) between a photosensitive material which was coated after standing a coating solution added with a toner modifier and a photosensitive material which was coated immediately after adding the toner modifier.

Phthalazines and phthalazinones may be substituted and preferred substituents include substituted alkyl, substituted aryl, hydroxy, halogen, substituted amino, substituted amido, substituted ester, substituted nitro and substituted alkoxy. Exemplary examples thereof include phthalazine, phthalazinone, 4-(1-naphthyl)phthalazine, 4-(1-naphthyl) phthalazinone, 6-chlorophthalazine, 60chlorophthalazinone, 5,7-dimethyloxyphthalazine, 5,7-dimethyloxuphthalazinone, 4-phthalazine and 4-phthalazinone. Benzenepolycarboxylic acids may be substituted and preferred substituents include substituted alkyl, substituted aryl, hydroxy, halogen, substituted amino, substituted amido, substituted ester, substituted nitro and substituted alkoxy. Preferred benzenepolycarboxylic acids are substituted or unsubstituted benzenedicarboxylic acids, substituted or unsubstituted benzenetricarboxylic acids, including phthalic acids, terephthalic acids, isophthalic acids and trimellitic acids. Substituted or unsubstituted benzenedicarboxylic acids are specifically preferred and phthalic acids are most preferred.

Phthalic acids may be substituted and preferred substituents include substituted alkyl, substituted aryl, hydroxy, halogen, substituted amino, substituted amido, substituted ester, substituted nitro and substituted alkoxy. The benzenepolycarboxylic acids may be in the form of an anhydride, such as phthalic acid and its anhydride, 4-methylphthalic acid and its anhydride, 4-nitrophthalic acid and its anhydride, and tetrachlorophthalic acid and its anhydride.

In the photosensitive material according to the invention, at least one of these compounds is incorporated into a photosensitive silver halide layer or a non-photosensitive layer. The non-photosensitive layer refers to a layer containing no photosensitive silver halide and provided on the same side as the layer containing photosensitive silver halide, including a protective layer.

In cases when added into the non-photosensitive layer, the tone modifier may be at any time between after the start of preparation of the photosensitive layer coating solution and immediately before coating. In cases when added into the photosensitive layer, it is preferred to add the tone modifier into a coating solution of the photosensitive layer immediately before coating. In this case, the expression "immediately before" means 2 hrs to 1 sec., and 1 hr. to 10 sec. before the start of coating. In cases when incorporated into the photosensitive layer, the phthalazine, phthalazinones, or benzenepolycarboxylic acids, the amount thereof is preferably 0.1 to 20% by weight, and more preferably 0.2 to 15% by weight, based on total silver including organic silver salts and silver halide. In cases when incorporated into another layer such as non-photosensitive protective layer, the same or more amount to be incorporated is preferred. In cases when incorporated into a protective layer, 1.1 to 3 times the amount to be incorporated into the photosensitive layer is preferred. A large excess of the tone modifier causes bleeding on thermal development to stain a heated drum, causing stains in the photosensitive material. In cases when the tone modifier is incorporated into an infrared sensitizing dye-containing layer or another layer, photosensitive materials with high sensitivity and superior storage stability can be obtained by adding the tone modifier and promptly making completion of coating and drying within a period of time after adding it.

The compounds described above are most effective as a tone modifier. Further, compounds described below are also effective as a tone modifier. Thus, other preferred tone modifiers usable in the invention are disclosed in Research Disclosure 176, item 17029. Exemplary examples thereof include:

imides (for example, phthalimide), cyclic imides, pyrazoline-5-one, and quinazolinone (for example, succinimide, 3-phenyl-2-pyrazoline-5-on, 1-phenylurazole, quinazoline and 2,4-thiazolidione); naphthalimides (for example, N-hydroxy-1,8-naphthalimide); cobalt complexes (for example, cobalt hexaminetrifluoroacetate), mercaptans (for example, 3-mercapto-1,2,4-triazole); N-(aminomethyl) aryldicarboxyimides (for example, N-(dimethylaminomethyl)phthalimide); blocked pyrazoles, isothiuronium derivatives and combinations of certain types of light-bleaching agents (for example, combination of N,N'-hexamethylene(1-carbamoyl-3,5-dimethylpyrazole), 1,8-(3,6-dioxaoctane)bis-(isothiuroniumtrifluoroacetate), and 2-(tribromomethyl-sulfonyl)benzothiazole; merocyanine dyes (for example, 3-ethyl-5-((3-etyl-2-benzothiazolinylidene-(benzothiazolinylidene))-1-methylethylidene-2-thio-2,4-oxazolidinedione); phthalazinone, phthalazinone derivatives or metal salts thereof (for example, 4-(1-naphthyl)phthalazinone, 6-chlorophthalazinone, 5,7-dimethylphthalazinone, and 2,3-dihydro-1,4-phthalazinedione); combinations of phthalazinone and sulfinic acid derivatives (for example, 6-chlorophthalazinone and benzenesulfinic acid sodium, or 8-methylphthalazinone and p-trisulfonic acid sodium); combinations of phthalazine and phthalic acid; combinations of phthalazine (including phthalazine addition products) with at least one compound selected from maleic acid anhydride, and phthalic acid, 2,3-naphthalenedicarboxylic acid or o-phenylenic acid derivatives and anhydrides thereof (for example, phthalic acid, 4-methylphthalic acid, 4-nitrophthalic acid, and tetrachlorophthalic acid anhydride); quinazolinediones, benzoxazine, naphthoxazine derivatives, benzoxazine-2,4-diones (for example, 1,3-benzoxazine-2,4-dione); pyrimidines and asymmetry-triazines (for example, 2,4-dihydroxypyrimidine), and tetraazapentalene derivatives (for example, 3,6-dimercapto-1,4-diphenyl-1H, 4H-2,3a,5,6a-tatraazapentalene). Preferred image color control agents include phthalazone or phthalazine.

It is preferred to apply a heteroatom-containing macrocyclic compound to the thermally developable photosensitive materials used in the invention. The heteroatom containing macrocyclic compound refers to a nine- or more membered macrocyclic compound containing at least a heteroatom selected from a nitrogen atom, an oxygen atom, a sulfur atom and a selenium atom. The macrocyclic compound is preferably a 12- to 18-membered ring. Representative compounds thereof include compounds commonly known as a crown ether, which was synthesized by Pederson in 1967 and a number of which have been synthesized since its specific report. The compounds are detailed in C. J. Pederson, Journal of American Chemical Society vol. 86 (2495), 7017–7036 (1967); G. W. Gokel & S. H. Korzeniowski, "Macrocyclic Polyether Synthesis", Springer-Vergal (1982); "Chemistry of Crown Ether" edited by Oda, Shono & Tabuse, published by Kyoritsu Shuppan (1978); "Host-Guest" edited by Tabuse, published by Kyoritsu Shuppan (1979); and Suzuki & Koga, Yuki Gosei Kagaku (Journal of Organic Synthetic Chemistry) vol. 45 (6) 571–582 (1987).

Exemplary examples of the heteroatom containing macrocyclic compounds used in the invention are shown below, but are not limited to these examples.

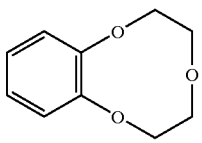

S-1

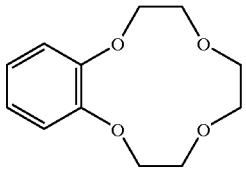

S-2

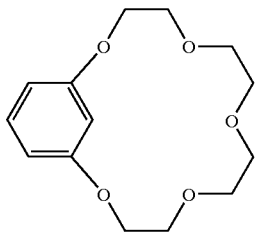

S-3

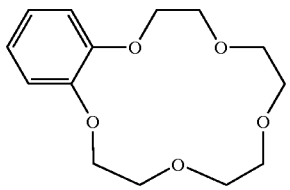

S-4

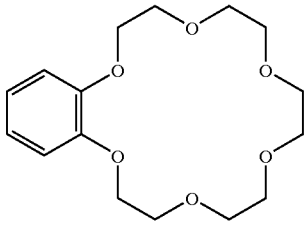

S-5

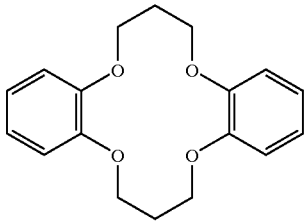

S-6

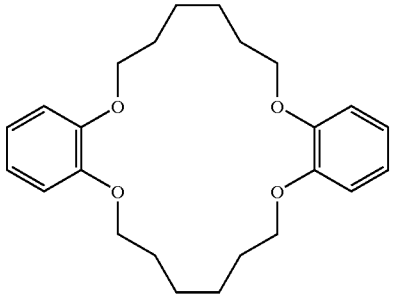

S-7

-continued
S-8
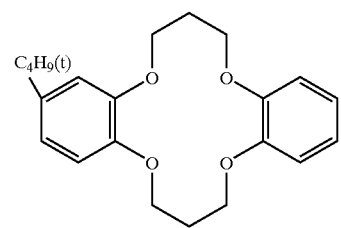
S-9
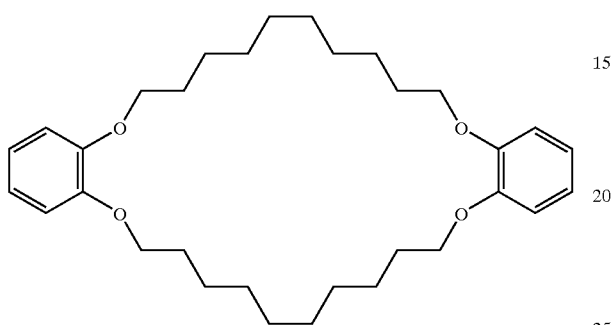
S-10
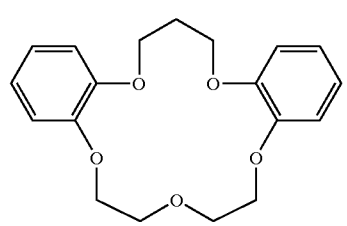
S-11
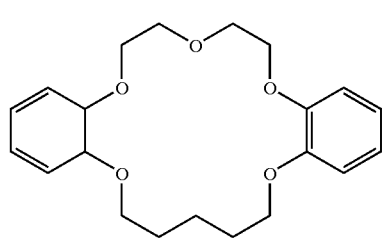
S-12
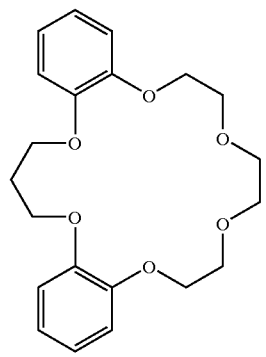
S-13
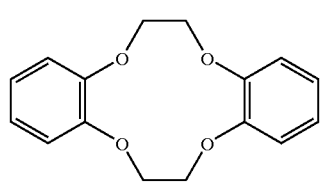
-continued
S-14
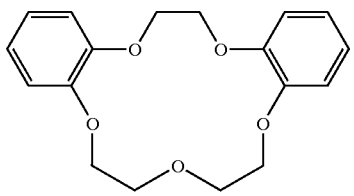
S-15
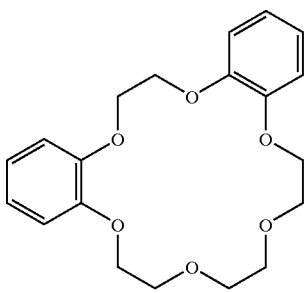
S-16
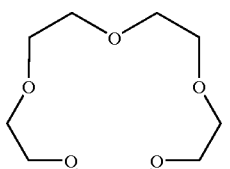
S-17
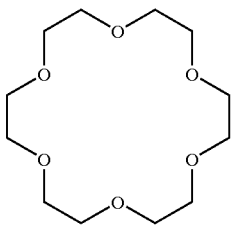
S-18
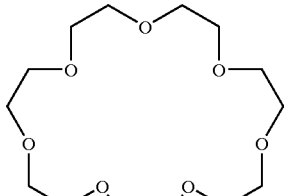
S-19
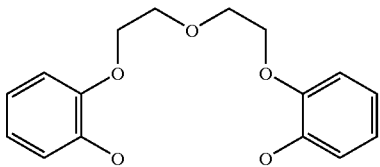
S-20
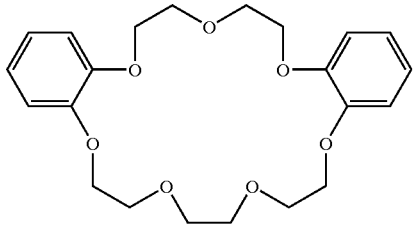

S-21
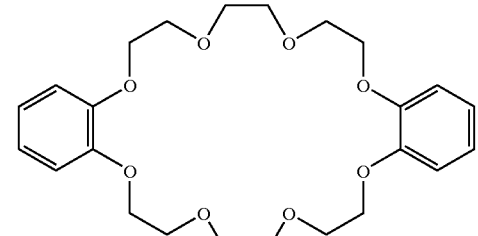
S-27
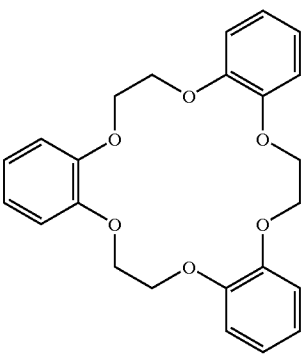
S-22
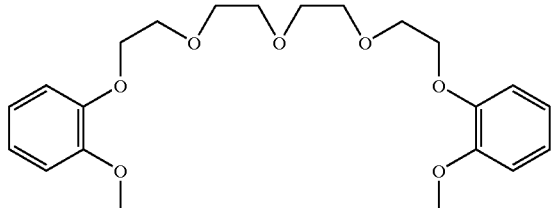
S-28
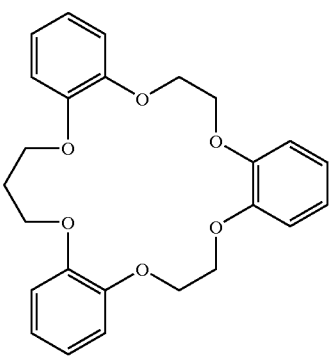
S-23
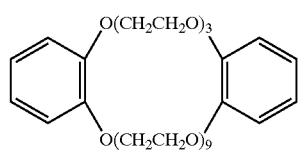
S-24
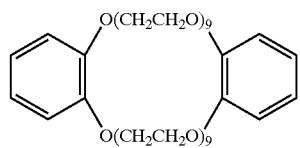
S-25
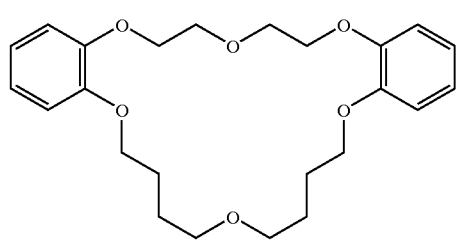
S-29
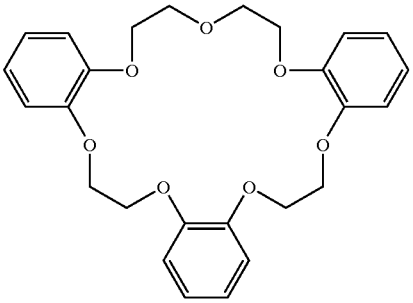
S-26
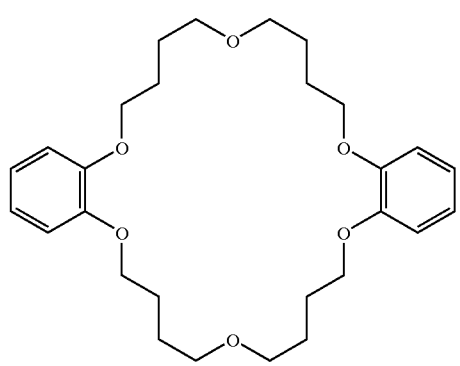
S-30
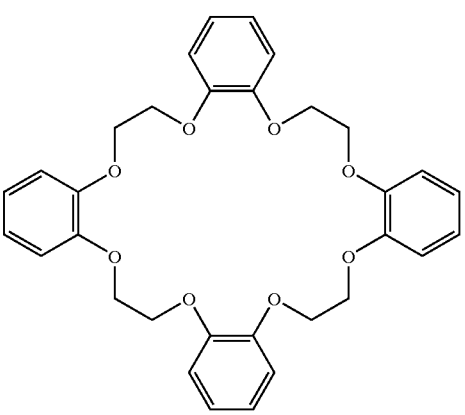

S-31 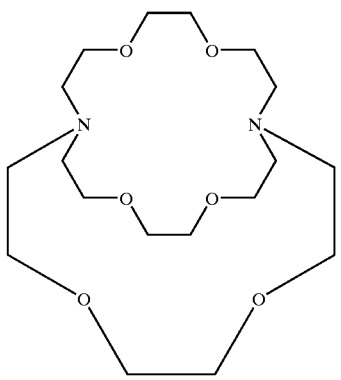
S-32 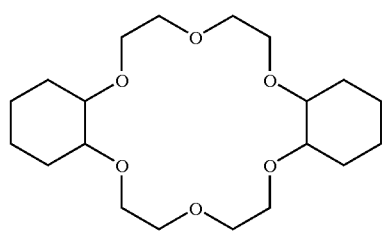
S-33 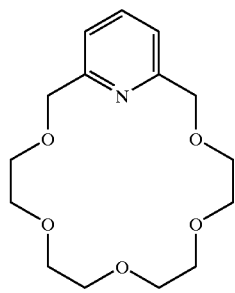
S-34 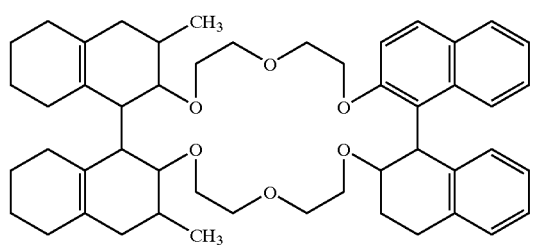
S-35 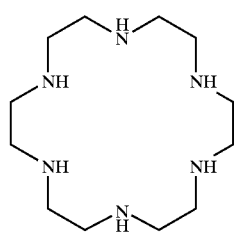
S-36 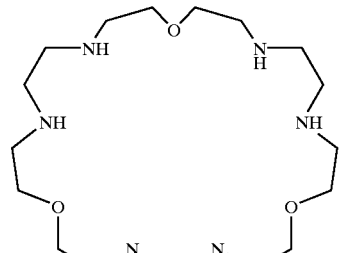
S-37 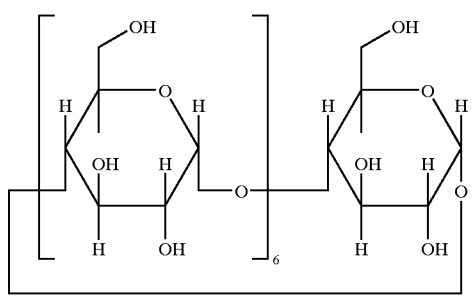
S-38 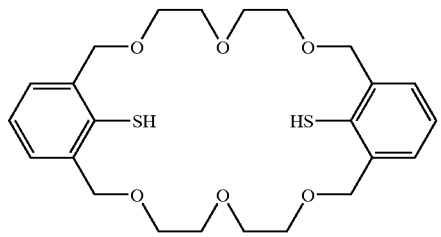
S-39 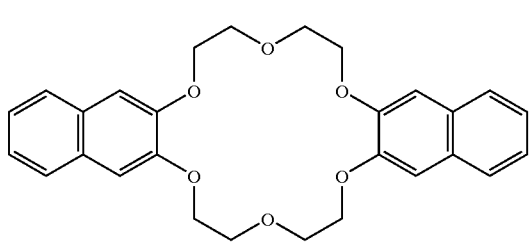
S-40 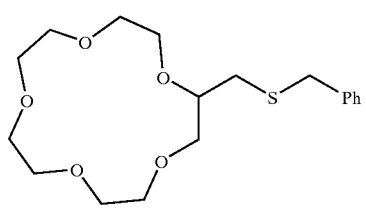
S-41 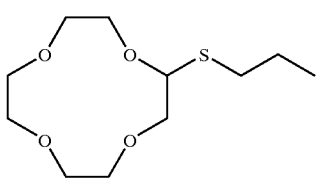

-continued

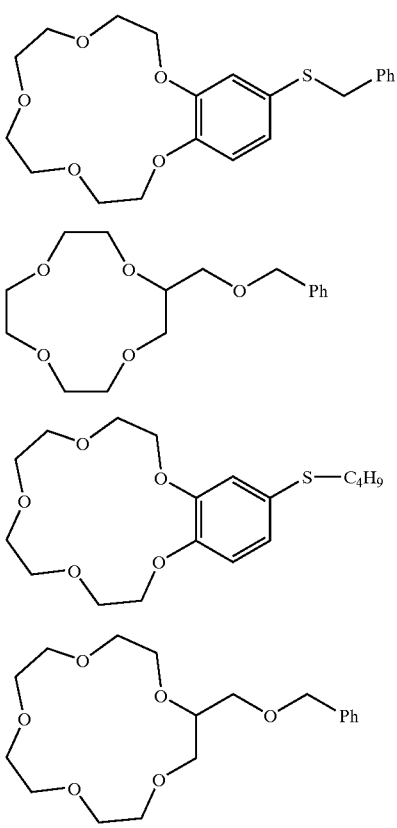

Ph: phenyl group

The heteroatom containing macrocyclic compound may be added at any stage after forming silver halide and until preparing a coating solution, and is added preferably prior to adding the sensitizing dye. The heteroatom containing macrocyclic compounds are generally incorporated into the thermally developable photosensitive layer through solution in organic solvents such as methanol, ethanol or fluorinated alcohols, or water. In cases where solubility is not sufficient, dissolution-promoting agent may be used in combination, including potassium acetate, potassium iodide, potassium fluoride, potassium p-toluenesulfonate, $KBF_4$, $KPF_6$, $NH_4BF_4$ and $NH_4PF_6$. Any compound containing an ion capable of forming an inclusion compound together with the heteroatom containing macrocyclic compound, which is able to improve solubility may be usable as the dissolution-promoting agent.

Thermally developable photosensitive materials are disclosed, for example, in U.S. Pat. Nos. 3,152,904 and 3,457,075, and D. Morgan, "Dry Silver Photographic Material" and D. Morgan and B. Shely, "Thermally Processed Silver Systems" (Imaging Processes and Materials) Neblette, 8th Edition, edited by Sturge, V. Walworth, and A. Shepp, page 2, 1969), etc. of these, the thermally developable photosensitive material used in the invention is characterized in that they are thermally developed at temperature of 80 to 140° C. so as to obtain images without fixation.

Silver halide grains of photosensitive silver halide in the present invention work as a light sensor. In order to minimize cloudiness after image formation and to obtain excellent image quality, the less the average grain size, the more preferred, and the average grain size is preferably less than 0.1 μm, more preferably between 0.01 and 0.1 μm, and still more preferably between 0.02 and 0.08 μm. The average grain size as described herein is defined as an average edge length of silver halide grains, in cases where they are so-called regular crystals in the form of cube or octahedron. Furthermore, in cases where grains are not regular crystals, for example, spherical, cylindrical, and tabular grains, the grain size refers to the diameter of a sphere having the same volume as the silver grain. Furthermore, silver halide grains are preferably monodisperse grains. The monodisperse grains as described herein refer to grains having a monodispersibility obtained by the formula described below of less than 40%; more preferably less than 30%, and most preferably from 0.1 to 20%.

Monodispersibility=(standard deviation of grain diameter)/(average grain diameter)×100(%)

The silver halide grain shape is not specifically limited, but a high ratio accounted for by a Miller index [100] plane is preferred. This ratio is preferably at least 50%; is more preferably at least 70%, and is most preferably at least 80%. The ratio accounted for by the Miller index [100] face can be obtained based on T. Tani, J. Imaging Sci., 29, 165 (1985) in which adsorption dependency of a [111] face or a [100] face is utilized.

Furthermore, another preferred silver halide shape is a tabular grain. The tabular grain as described herein is a grain having an aspect ratio represented by r/h of at least 3, wherein r represents a grain diameter in μm defined as the square root of the projection area, and h represents thickness in μm in the vertical direction. Of these, the aspect ratio is preferably between 3 and 50. The grain diameter is preferably not more than 0.1 μm, and is more preferably between 0.01 and 0.08 μm. These are described in U.S. Pat. Nos. 5,264,337, 5,314,789, 5,320,958, and others. In the present invention, when these tabular grains are used, image sharpness is further improved. The composition of silver halide may be any of silver chloride, silver chlorobromide, silver iodochlorobromide, silver bromide, silver iodobromide, or silver iodide.

Silver halide emulsions used in the invention can be prepared according to the methods described in P. Glafkides, Chimie Physique Photographique (published by Paul Montel Corp., 19679; G. F. Duffin, Photographic Emulsion Chemistry (published by Focal Press, 1966); V. L. Zelikman et al., Making and Coating of Photographic Emulsion (published by Focal Press, 1964). Any one of acidic precipitation, neutral precipitation and ammoniacal precipitation is applicable and the reaction mode of aqueous soluble silver salt and halide salt includes single jet addition, double jet addition and a combination thereof. Silver halide may be incorporated into the image forming layer by any means so that the silver halide is arranged so as to be close to reducible silver source. Silver halide may be mixed with a previously-prepared organic silver salt. Alternatively, silver halide may be added into a solution used for preparing an organic silver salt so that silver halide is arranged closely to the organic silver salt prepared.

Photosensitive silver halide emulsions usable in the thermally developable photosensitive materials according to the invention can be prepared according to the methods commonly known in the photographic art, such as single jet or double jet addition, or ammoniacal, neutral or acidic precipitation. Thus, the silver halide emulsion is prepared in advance and then the emulsion is mixed with other components of the invention to be incorporated into the composition used in the invention. To sufficiently bring the photosensitive silver halide into contact with an organic silver salt, there can be applied such techniques that polymers other than gelatin, such as polyvinyl acetal are employed as a protective colloid in the formation of photosensitive silver halide, as described in U.S. Pat. Nos. 3,706,564, 3,706,565, 3,713,833 and 3,748,143, British Patent 1,362,970; gelatin contained in a photosensitive silver halide emulsion is degraded with an enzyme, as described in British Patent 1,354,186; or photosensitive silver halide grains are prepared in the presence of a surfactant to save the use of a protective polymer, as described in U.S. Pat. No. 4,076,539.

It is preferred to prepare silver halide in advance and mix it with an organic silver salt. Alternatively, silver halide may be formed by reaction of an organic silver salt and a halide ion to convert a part of the organic silver salt to silver halide. A combination of these may be applicable. The content of silver halide is preferably 0.75 to 30% by weight, based on an organic silver salt.

Silver halide preferably occludes ions of metals belonging to Groups 6 to 11 of the Periodic Table. Preferred as the metals are W; Fe, Co, Ni, Cu, Ru, Rh, Pd, Re, Os, Ir, Pt and Au. These metals may be introduced into silver halide in the form of a complex. In the present invention, regarding the transition metal complexes, six-coordinate complexes represented by the general formula described below are preferred:

Formula: $(ML_6)^m$:
wherein M represents a transition metal selected from elements in Groups 6 to 11 of the Periodic Table; L represents a coordinating ligand; and m represents 0, 1-, 2-, 3- or 4-. Exemplary examples of the ligand represented by L include halides (fluoride, chloride, bromide, and iodide), cyanide, cyanato, thiocyanato, selenocyanato, tellurocyanato, azido and aquo, nitrosyl, thionitrosyl, etc., of which aquo, nitrosyl and thionitrosyl are preferred. When the aquo ligand is present, one or two ligands are preferably coordinated. L may be the same or different. Particularly preferred examples of M include rhodium (Rh), ruthenium (Ru), rhenium (Re), iridium (Ir) and osmium (Os).

Exemplary examples of transition metal ligand complexes are shown below.

1: $[RhCl_6]^{3-}$
2: $[RuCl_6]^{3-}$
3: $[ReCl_6]^{3-}$
4: $[RuBr_6]^{3-}$
5: $[OsCl_6]^{3-}$
6: $[IrCl_6]^{2-}$
7: $[Ru(NO)Cl_5]^{2-}$
8: $[RuBr_4(H_2O)]^{2-}$
9: $[Ru(NO)(H_2O)Cl_4]^-$
10: $[RhCl_5(H_2O)]^{2-}$
11: $[Re(NO)Cl_5]^{2-}$
12: $[Re(NO)(CN)_5]^{2-}$
13: $[Re(NO)Cl(CN)_4]^{2-}$
14: $[Rh(NO)_2Cl_4]^-$
15: $[Rh(NO)(H_2O)Cl_4]^-$
16: $[Ru(NO)(CN)_5]^{2-}$
17: $[Fe(CN)_6]^{3-}$
18: $[Rh(NS)Cl_5]^{2-}$
19: $[Os(NO)Cl_5]^{2-}$
20: $[Cr(NO)Cl_5]^{2-}$
21: $[Re(NO)Cl_5]^-$
22: $[Os(NS)Cl_4(TeCN)]^{2-}$
23: $[Ru(NS)Cl_5]^{2-}$
24: $[Re(NS)Cl_4(SeCN)]^{2-}$
25: $[Os(NS)Cl(SCN)_4]^{2-}$
26: $[Ir(NO)Cl_5]^{2-}$
27: $[Ir(NS)Cl_5]^{2-}$

One type of these metal ions or complex ions may be employed and the same type of metals or the different type of metals may be employed in combinations of two or more types. Generally, the content of these metal ions or complex ions is suitably between $1 \times 10^{-9}$ and $1 \times 10^{-2}$ mole per mole of silver halide, and is preferably between $1 \times 10^{-8}$ and $1 \times 10^{-4}$ mole. Compounds, which provide these metal ions or complex ions, are preferably incorporated into silver halide grains through addition during the silver halide grain formation. These may be added during any preparation stage of the silver halide grains, that is, before or after nuclei formation, growth, physical ripening, and chemical ripening. However, these are preferably added at the stage of nuclei formation, growth, and physical ripening; furthermore, are preferably added at the stage of nuclei formation and growth; and are most preferably added at the stage of nuclei formation. These compounds may be added several times by dividing the added amount. Uniform content in the interior of a silver halide grain can be carried out. As disclosed in JP-A No. 63-29603, 2-306236, 3-167545, 4-76534, 6-110146, 5-273683, the metal can be non-uniformly occluded in the interior of the grain.

These metal compounds can be dissolved in water or a suitable organic solvent (for example, alcohols, ethers, glycols, ketones, esters, amides, etc.) and then added. Furthermore, there are methods in which, for example, an aqueous metal compound powder solution or an aqueous solution in which a metal compound is dissolved along with NaCl and KCl is added to a water-soluble silver salt solution during grain formation or to a water-soluble halide solution; when a silver salt solution and a halide solution are simultaneously added, a metal compound is added as a third solution to form silver halide grains, while simultaneously mixing three solutions; during grain formation, an aqueous solution comprising the necessary amount of a metal compound is placed in a reaction vessel; or during silver halide preparation, dissolution is carried out by the addition of other silver halide grains previously doped with metal ions or complex ions. Specifically, the preferred method is one in which an aqueous metal compound powder solution or an aqueous solution in which a metal compound is dissolved along with NaCl and KCl is added to a water-soluble halide solution. When the addition is carried out onto grain surfaces, an aqueous solution comprising the necessary amount of a metal compound can be placed in a reaction vessel immediately after grain formation, or during physical ripening or at the completion thereof or during chemical ripening.

Silver halide grain emulsions used in the invention may be desalted after the grain formation, using the methods known in the art, such as the noodle washing method and flocculation process.

The photosensitive silver halide grains used in the invention is preferably subjected to a chemical sensitization. As preferable chemical sensitizations, well known chemical sensitizations in this art such as a sulfur sensitization, a selenium sensitization and a tellurium sensitization are usable. Furthermore, a noble metal sensitization using gold, platinum, palladium and iridium compounds and a reduction sensitization are available. As the compounds preferably used in the sulfur sensitization, the selenium sensitization and the tellurium sensitization, well known compounds can be used and the compounds described in JP-A 7-128768 is usable. Examples of the compounds used in the noble metal sensitization include chloroauric acid, potassium chloroaurate, potassium aurothiocyanate, gold sulfide, gold selenide, compounds described U.S. Pat. No. 2,448,060 and British Patent No. 618,061. Examples of the compounds used in the reduction sensitization include ascorbic acid, thiourea dioxide, stannous chloride, aminoiminomethanesulfinic acid, hydrazine derivatives, borane compounds, silane compounds and polyamine compounds. The reduction sensitization can be carried out by ripening an emulsion with keeping the pH and pAg at not less than 7 and not more than 8.3, respectively. Furthermore, the reduction sensitization can be carried out by introducing a silver ion alone at a time during the grain formation.

Halide composition of silver halide used in the invention is not specifically limited, including silver chloride, silver chlorobromide, silver iodochlorobromide, silver bromide, silver iodobromide, and silver iodide. Of these, silver iodobromide is preferred to improve adsorption property. Silver halide grains used in the thermally developable photosensitive material are preferably those which have an average iodide content in the vicinity of the grain surface of 0.1 to 10 mol %, and more preferably 1 to 7 mol %. In the thermally developable photosensitive materials, higher iodide silver halide is preferred in terms of adsorption of a sensitizing dye, as compared to conventional silver halide photographic materials. The average iodide content in the vicinity of the grain surface refers to an average iodide content to a depth of 5 nm from the surface, which can be determined by the XPS method (i.e., X-ray Photoelectron Spectroscopy), according to the following procedure. A sample is cooled to a temperature of not higher than −110° C. under ultra-high vacuum of not more than $1\times10^{-8}$ torr, exposed to MgKα-line as X-ray for probe at a X-ray source voltage of 15 kV and X-ray source current of 40 mA and measured with respect to Ag3d5/2, Br3d and I3d3/2 electrons. The thus measured integrated peak intensity is corrected with a sensitivity factor and from the obtained intensity ratio can be determined halide composition in the vicinity of the grain surface. Cooling the sample reduces measurement errors, which are due to destruction of the sample occurred when exposed at room temperature, enhancing measurement precision. Cooling to a temperature of −110° C. prevents destruction of the sample at an acceptable level in the measurement.

The amount of silver halide used in the thermally developable photosensitive material is preferably not more than 50%, more preferably 0.1 to 25%, and still more preferably 0.1 to 15%, based on the total amount of silver halide and organic silver salt.

Photosensitive silver halide used in the thermally developable photosensitive material of the invention can be formed simultaneously with the formation of organic silver salt by allowing a halide component such as a halide ion to concurrently be present together with organic silver salt-forming components and further introducing a silver ion thereinto during the course of preparing the organic silver salt.

Alternatively, a silver halide-forming component is allowed to act onto a pre-formed organic silver salt solution or dispersion or a sheet material containing an organic silver salt to convert a part of the organic silver salt to photosensitive silver halide. The thus formed silver halide is effectively in contact with the organic silver salt, exhibiting favorable actions. In this case, the silver halide forming component refers to a compound capable of forming silver salt upon reaction with the organic silver salts. Such a compound can be distinguished by the following simple test. Thus, a compound to be tested is to be mixed with the organic silver salt, and if necessary, the presence of a peal specific to silver halide can be confirmed by the X-ray diffractometry, after heating. Compounds that have been confirmed to be effective as a silver halide-forming component include inorganic halide compounds, onium halides, halogenated hydrocarbons, N-halogene compounds and other halogen containing compounds. These compounds are detailed in U.S. Pat. No. 4,009,039, 3,457,075 and 4,003, 749, British Patent 1,498,956 and JP A 53-27027 and 53-25420. Exemplary examples thereof are shown below:

(1) Inorganic halide compound: e.g., a halide compound represented by formula, $MX_n$, in which M represents H, $NH_4$ or a metal atom; n is 1 when M is H or $NH_4$ and a number equivalent to a valence number of the metal atom when M is the metal atom; the metal atom includes lithium, sodium, potassium, cesium, magnesium, calcium, strontium, barium, zinc, cadmium, mercury, tin, antimony, chromium, manganese, cobalt, rhodium, and cerium, and molecular halogen such as aqueous bromine being also effective;

(2) Onium halide: e.g., quaternary ammonium halides such as trimethylphenylammonium bromide, cetylethyldimethylammonium bromide, and trimethylbenzylammonium bromide; and tertiary sulfonium halides such as trimethylsulfonium iodide;

(3) Halogenated hydrocarbons: e.g., iodoform, bromoform, carbon tetrachloride and 2-brom-2-methylpropane;

(4) N-halogeno compounds: e.g., N-chlorosuccinimide, N-bromosucciimde, N-bromophthalimide, N-bromoacetoamide, N-iodosuccinimide, N-bromophthalazinone, N-bromooxazolinone, N-chlorophthalazinone, N-bromoacetoanilide, N,N-dibromobenzenesulfonamide, N-bromo-N-methylbenzenesulfonamide, 1,3-dibromo-4,4-dimethylhydantoin and N-bromourazole;

(5) Other halogen containing compounds: e.g., triphenylmethyl chloride, triphenylmethyl bromide 2-bromoacetic acid, 2-bromoethanol and dichlorobenzophenone.

The silver halide forming component is used stoichiometrically in a small amount per organic silver salt. Thus, it is preferably 0.001 to 0.7 mol, and more preferably 0.03 to 0.5 mol per mol of organic silver salt. The silver halide-forming component may be used in combination. Conditions including a reaction temperature, reaction time and reaction pressure during the process of converting a part of the organic silver salt to silver halide using the silver halide forming component can be appropriately set in accordance with the purpose of preparation. The reaction temperature is preferably −20° C. to 70° C., the reaction time is preferably 0.1 sec to 72 hrs. and the reaction pressure is preferably atmospheric pressure. The reaction is performed preferably in the presence of polymer as a binder, wherein the polymer to be used is preferably 0.01 to 100 weight parts, and more preferably 0.1 to 10 weight parts per 1 weight part of an organic silver salt.

The thus formed photosensitive silver halide can be chemically sensitized with a sulfur containing compound, gold compound, platinum compound, palladium compound, silver compound, tin compound, chromium compound or their combination. The method and procedure for chemical sensitization are described in U.S. Pat. No. 4,036,650, British Patent 1,518,850, JP-A 51-22430, 51-78319 and 51-81124. As described in U.S. Pat. No. 3,980,482, a low molecular weight amide compound may be concurrently present to enhance sensitivity at the time of converting a part of the organic silver salt to photosensitive silver halide.

To improve reciprocity law failure or adjust contrast, the photosensitive silver halide may be contained with metal ions of the 6th group to 10th group in the periodical table, such as Rh, Ru, Re, Ir, Os, Fe and their complexes and complex ions. Specifically, complex ions are preferred, e.g., Ir complex ions such as $IrCl_6^{2-}$ are preferably contained to improve reciprocity law failure.

Organic silver salts used in the invention are reducible silver source, and silver salts of organic acids or organic heteroacids are preferred and silver salts of long chain fatty acid (preferably having 10 to 30 carbon atom and more preferably 15 to 25 carbon atoms) or nitrogen containing heterocyclic compounds are more preferred. Specifically, organic or inorganic complexes, ligand of which have a total stability constant to a silver ion of 4.0 to 10.0 are preferred. Exemplary preferred complex salts are described in RD17029 and RD29963, including organic acid salts (for example, salts of gallic acid, oxalic acid, behenic acid, stearic acid, palmitic acid, lauric acid, etc.); carboxyalkylthiourea salts (for example, 1-(3-carboxypropyl)thiourea, 1-(3-caroxypropyl)-3,3-dimethylthiourea, etc.); silver complexes of polymer reaction products of aldehyde with hydroxy-substituted aromatic carboxylic acid (for example, aldehydes (formaldehyde, acetaldehyde, butylaldehyde, etc.), hydroxy-substituted acids (for example, salicylic acid, benzoic acid, 3,5-dihydroxybenzoic acid, 5,5-thiodisalicylic acid, silver salts or complexes of thiones (for example, 3-(2-carboxyethyl)-4-hydroxymethyl-4-(thiazoline-2-thione and 3-carboxymethyl-4-thiazoline-2-thione), complexes of silver with nitrogen acid selected from imidazole, pyrazole, urazole, 1.2,4-thiazole, and 1H-tetrazole, 3-amino-5-benzylthio-1,2,4-triazole and benztriazole or salts thereof; silver salts of saccharin, 5-chlorosalicylaldoxime, etc.; and silver salts of mercaptides. Of these organic silver salts, silver salts of fatty acids are preferred, and silver salts of behenic acid, arachidinic acid and stearic acid are specifically preferred.

The organic silver salt compound can be obtained by mixing an aqueous-soluble silver compound with a compound capable of forming a complex. Normal precipitation, reverse precipitation, double jet precipitation and controlled double jet precipitation described in JP-A 9-127643 are preferably employed. For example, to an organic acid is added an alkali metal hydroxide (e.g., sodium hydroxide, potassium hydroxide, etc.) to form an alkali metal salt soap of the organic acid (e.g., sodium behenate, sodium arachidinate, etc.), thereafter, the soap and silver nitrate are mixed by the controlled double jet method to form organic silver salt crystals. In this case, silver halide grains may be concurrently present.

In the present invention, organic silver salts have an average grain diameter of 2 μm or less and are monodispersed. The average diameter of the organic silver salt as described herein is, when the grain of the organic salt is, for example, a spherical, cylindrical, or tabular grain, a diameter of the sphere having the same volume as each of these grains. The average grain diameter is preferably between 0.05 and 1.5 μm, and more preferably between 0.05 and 1.0 μm. Furthermore, the monodisperse as described herein is the same as silver halide grains and preferred monodispersibility is between 1 and 30%.

It is also preferred that at least 60% of the total of the organic silver salt is accounted for by tabular grains. The tabular grains refer to grains having a ratio of an average grain diameter to grain thickness, i.e., aspect ratio (denoted as AR) of 3 or more:

AR=average diameter (μm)/thickness (μm)

To obtain such tabular organic silver salts, organic silver salt crystals are pulverized together with a binder or surfactant, using a ball mill. Thus, using these tabular grains, photosensitive materials exhibiting high density and superior image fastness are obtained.

To prevent hazing of the photosensitive material, the total amount of silver halide and organic silver salt is preferably 0.5 to 2.2 g in equivalent converted to silver per m$^2$, leading to high contrast images. The amount of silver halide is preferably 50% by weight or less, more preferably 25% by weight or less, and still more preferably 0.1 to 15% by weight, based on the total silver amount.

Reducing agents are preferably incorporated into the thermally developable photosensitive material of the present invention. Examples of suitable reducing agents are described in U.S. Pat. Nos. 3,770,448, 3,773,512, and 3,593,863, and Research Disclosure Items 17029 and 29963, and include the following: aminohydroxycycloalkenone compounds (for example, 2-hydroxypiperidino-2-cyclohexane); esters of amino reductones as the precursor of reducing agents (for example, piperidinohexose reducton monoacetate); N-hydroxyurea derivatives (for example, N-p-methylphenyl-N-hydroxyurea); hydrazones of aldehydes or ketones (for example, anthracenealdehyde phenylhydrazone; phosphamidophenols; phosphamidoanilines; polyhydroxybenzenes (for example, hydroquinone, t-butylhydroquinone, isopropylhydroquinone, and (2,5-dihydroxy-phenyl)methylsulfone); sulfydroxamic acids (for example, benzenesulfhydroxamic acid); sulfonamidoanilines (for example, 4-(N-methanesulfonamide)aniline); 2-tetrazolylthiohydroquinones (for example, 2-methyl-5-(1-phenyl-5-tetrazolylthio)hydroquinone); tetrahydroquionoxalines (for example, 1,2,3,4-tetrahydroquinoxaline); amidoxines; azines (for example, combinations of aliphatic carboxylic acid arylhydrazides with ascorbic acid); combinations of polyhydroxybenzenes and hydroxylamines, reductones and/or hydrazine; hydroxamic acids; combinations of azines with sulfonamidophenols; α-cyanophenylacetic acid derivatives; combinations of bis-β-naphthol with 1,3-dihydroxybenzene derivatives; 5-pyrazolones, sulfonamidophenol reducing agents, 2-phenylindane-1,3-dione, etc.; chroman; 1,4-dihydropyridines (for example, 2,6-dimethoxy-3,5-dicarboethoxy-1,4-dihydropyridine); bisphenols (for example, bis(2-hydroxy-3-t-butyl-5-methylphenyl)methane, bis(6-hydroxy-m-tri)mesitol, 2,2-bis(4-hydroxy-3-methylphenyl)propane, 4,5-ethylidene-bis(2-t-butyl-6-methyl)phenol, UV-sensitive ascorbic acid derivatives and 3-pyrazolidones. Of these, particularly preferred reducing agents are hindered phenols.

As hindered phenols, listed are compounds represented by the general formula (A) described below:

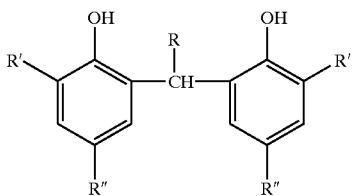
Formula (A)

wherein R represents a hydrogen atom or an alkyl group having from 1 to 10 carbon atoms (for example, —$C_4H_9$, 2,4,4-trimethylpentyl), and R' and R" each represents an alkyl group having from 1 to 5 carbon atoms (for example, methyl, ethyl, t-butyl).

Exemplary examples of the compounds represented by the formula (A) are shown below.

A-1
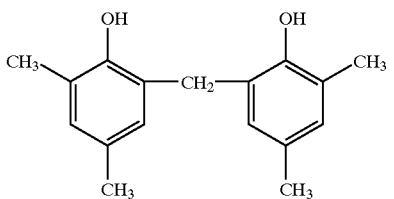

A-2
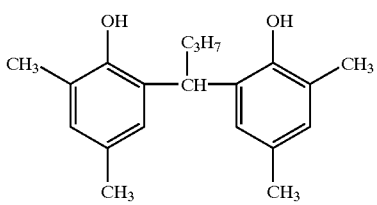

A-3
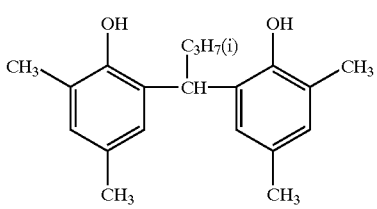

A-4
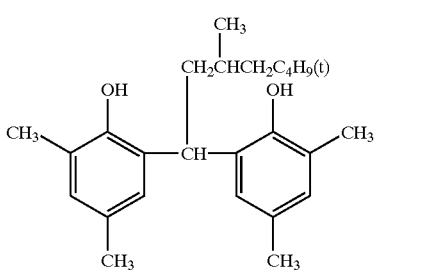

A-5
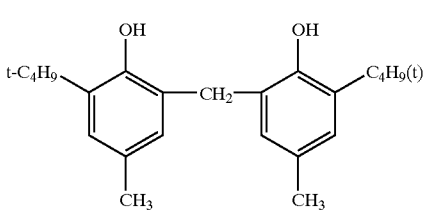

-continued

A-6
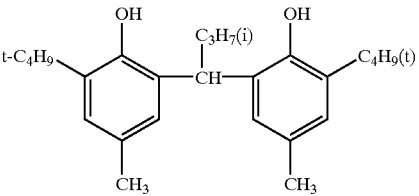

A-7
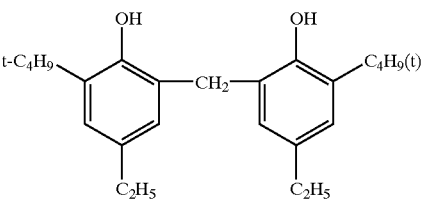

The used amount of reducing agents represented by the above-mentioned general formula (A) is preferably between $1 \times 10^{-2}$ and 10 moles, and is more preferably between $1 \times 10^{-2}$ and 1.5 moles per mole of silver.

Binders suitable for the thermally developable photosensitive material to which the present invention is applied are transparent or translucent, and generally colorless. Binders are natural polymers, synthetic resins, and polymers and copolymers, other film forming media; for example, gelatin, gum arabic, poly(vinyl alcohol), hydroxyethyl cellulose, cellulose acetate, cellulose acetatebutylate, poly(vinyl pyrrolidone), casein, starch, poly(acrylic acid), poly(methyl methacrylic acid), poly(vinyl chloride), poly(methacrylic acid), copoly(styrene-maleic acid anhydride), copoly (styrene-acrylonitrile, copoly(styrene-butadiene, poly(vinyl acetal) series [e.g., poly(vinyl formal) and poly(vinyl butyral), polyester series, polyurethane series, phenoxy resins, poly(vinylidene chloride), polyepoxide series, polycarbonate series, poly(vinyl acetate) series, cellulose esters, poly(amide) series. Of these binders are preferred aqueous-insoluble polymers such as cellulose acetate, cellulose acetate-butylate and poly(vinyl butyral); and poly(vinyl formal) and poly(vinyl butyral) are specifically preferred as a polymer used in the thermally developable photosensitive layer; and cellulose acetate and cellulose acetate-butylate are preferably used in a protective layer and backing layer.

A non-photosensitive layer may be provided on the photosensitive layer to protect the surface or prevent abrasion marks. Binder used in the non-photosensitive layer may be the same as or different from the binder used in the photosensitive layer.

The amount of the binder in a photosensitive layer is preferably between 1.5 and 6 g/m$^2$, and is more preferably between 1.7 and 5 g/m$^2$. The binder content of less than 1.5 g/m$^2$ tends to increase a density of unexposed area to levels unacceptable to practical use.

In the present invention, a matting agent is preferably incorporated into the image forming layer side. In order to minimize the image abrasion after thermal development, the matting agent is provided on the surface of a photosensitive material and the matting agent is preferably incorporated in an amount of 0.5 to 30 percent in weight ratio with respect to the total binder in the emulsion layer side.

In cases where a non photosensitive layer is provided on the opposite side of the support to the photosensitive layer, it is preferred to incorporate a matting agent into at least one of the non-photosensitive layer (and more preferably, into the surface layer) in an amount of 0.5 to 40% by weight, based on the total binder on the opposite side to the photosensitive layer.

Materials of the matting agents employed in the present invention may be either organic substances or inorganic substances. Examples of the inorganic substances include silica described in Swiss Patent No. 330,158, etc.; glass powder described in French Patent No. 1,296,995, etc.; and carbonates of alkali earth metals or cadmium, zinc, etc. described in U.K. Patent No. 1.173,181, etc. Examples of the organic substances include starch described in U.S. Pat. No. 2,322,037, etc.; starch derivatives described in Belgian Patent No. 625,451, U.K. Patent No. 981,198, etc.; polyvinyl alcohols described in Japanese Patent Publication No. 44-3643, etc.; polystyrenes or polymethacrylates described in Swiss Patent No. 330,158, etc.; polyacrylonitriles described in U.S. Pat. No. 3,079,257, etc.; and polycarbonates described in U.S. Pat. No. 3,022,169.

The shape of the matting agent may be crystalline or amorphous. However, a crystalline and spherical shape is preferably employed. The size of a matting agent is expressed in the diameter of a sphere having the same volume as the matting agent. The particle diameter of the matting agent in the present invention is referred to the diameter of a spherical converted volume. The matting agent employed in the present invention preferably has an average particle diameter of 0.5 to 10 μm, and more preferably of 1.0 to 8.0 μm. Furthermore, the variation coefficient of the size distribution is preferably not more than 50 percent, is more preferably not more than 40 percent, and is most preferably not more than 30 percent. The variation coefficient of the size distribution as described herein is a value represented by the formula described below:

(Standard deviation of particle diameter)/(average particle diameter)×100

The matting agent according to the present invention can be incorporated into any layer. In order to accomplish the object of the present invention, the matting agent is preferably incorporated into the layer other than the photosensitive layer layer, and is more preferably incorporated into the farthest layer from the support.

Addition methods of the matting agent include those in which a matting agent is previously dispersed into a coating composition and is then coated, and prior to the completion of drying, a matting agent is sprayed. When plural matting agents are added, both methods may be employed in combination.

The thermally developable photosensitive material according to the invention comprises a support having thereon at least one photosensitive layer, and the photosensitive layer may only be formed on the support. The photosensitive layer may be composed of a plurality of layers. To adjust gradation, layers may be arranged in such a manner as a high-speed layer/low-speed layer or a low-speed layer/high-speed layer. Further, at least one non-photosensitive layer is preferably formed on the photosensitive layer. In order to control the amount or wavelength distribution of light transmitted through the photosensitive layer, a filter layer may be provided on the same side as the photosensitive layer, and/or an antihalation layer, that is, a backing layer on the opposite side. Dyes or pigments may also be incorporated into the photosensitive layer. As the usable dyes, those which can absorb aimed wavelength in desired wavelength region can be used, preferred are compounds described in JP-A Nos. 59-6481, 59-182436, U.S. Pat. No. 4,594,312, European Patent Publication Nos. 533, 008, 652,473, JP-A Nos. 2-216140, 4-348339, 7-191432, 7-301890. Furthermore, these non-photosensitive layers may contain the above-mentioned binder, a matting agent and a lubricant such as a polysiloxane compound, a wax and liquid paraffin.

Suitable tone modifiers usable in the invention a) include those used in the invention b). Tone mdifiers are preferably incorporated into the thermally developable photosensitive material used in the present invention. Examples of preferred tone modifiers, which are disclosed in Research Disclosure Item 17029, include the following:

imides (for example, phthalimide), cyclic imides, pyrazoline-5-one, and quinazolinone (for example, succinimide, 3-phenyl-2-pyrazoline-5-on, 1-phenylurazole, quinazoline and 2,4-thiazolidione); naphthalimides (for example, N-hydroxy-1,8-naphthalimide); cobalt complexes (for example, cobalt hexaminetrifluoroacetate), mercaptans (for example, 3-mercapto-1,2,4-triazole); N-(aminomethyl) aryldicarboxyimides (for example, N-(dimethylaminomethyl)phthalimide); blocked pyrazoles, isothiuronium derivatives and combinations of certain types of light-bleaching agents (for example, combination of N,N'-hexamethylene(1-carbamoyl-3,5-dimethylpyrazole), 1,8-(3,6-dioxaoctane)bis-(isothiuroniumtrifluoroacetate), and 2-(tribromomethyl-sulfonyl)benzothiazole; merocyanine dyes (for example, 3-ethyl-5-((3-etyl-2-benzothiazolinylidene-(benzothiazolinylidene))-1-methylethylidene-2-thio-2,4-oxazolidinedione); phthalazinone, phthalazinone derivatives or metal salts thereof (for example, 4-(1-naphthyl)phthalazinone, 6-chlorophthalazinone, 5,7-dimethylphthalazinone, and 2,3-dihydro-1,4-phthalazinedione); combinations of phthalazinone and sulfinic acid derivatives (for example, 6-chlorophthalazinone and benzenesulfinic acid sodium, or 8-methylphthalazinone and p-trisulfonic acid sodium); combinations of phthalazine and phthalic acid; combinations of phthalazine (including phthalazine addition products) with at least one compound selected from maleic acid anhydride, and phthalic acid, 2,3-naphthalenedicarboxylic acid or o-phenylenic acid derivatives and anhydrides thereof (for example, phthalic acid, 4-methylphthalic acid, 4-nitrophthalic acid, and tetrachlorophthalic acid anhydride); quinazolinediones, benzoxazine, naphthoxazine derivatives, benzoxazine-2,4-diones (for example, 1,3-benzoxazine-2,4-dione); pyrimidines and asymmetry-triazines (for example, 2,4-dihydroxypyrimidine), and tetraazapentalene derivatives (for example, 3,6-dimercapto-1,4-diphenyl-1H, 4H-2,3a,5,6a-tatraazapentalene). Preferred tone modifiers include phthalazone or phthalazine.

In the present invention, to restrain or accelerate development for the purpose of controlling the development, to enhance the spectral sensitive efficiency, or to enhance the reservation stability before and after the development, a mercapto compound, a disulfide compound and a thione compound can be incorporated in the photosensitive material. In cases where the mercapto compound is used in the present invention, any compound having a mercapto group can be used, but preferred compounds are represented by the following formulas, Ar—SM and Ar—S—S—Ar, wherein M represents a hydrogen atom or an alkaline metal atom, Ar represents an aromatic ring compound or a condensed aromatic ring compound having at least a nitrogen, sulfur, oxygen, selenium or tellurium. Preferable aromatic heterocyclic ring compounds include benzimidazole, naphthoimidazole, benzothiazole, naphthothiazole, benzoxazole, naphthooxazole, benzoselenazole, benzotellurazole, imidazole, oxazole, pyrazole, triazole, thiadiazole, tetrazole, triazine, pyrimidine, pyridazine, pyrazine, pyridine, purine, quinoline or quinazoline. These aromatic heterocyclic ring compounds may contain a substituent selected from a halogen atom (e.g., Br and Cl), a hydroxy group, an amino group, a carboxy group, an alkyl group (e.g., alkyl group having at least a carbon atom, preferably 1 to 4 carbon atoms) and an alkoxy group (e.g., alkoxy group having at least a carbon atom, preferably 1 to 4 carbon atoms). Examples of mercapto-substituted aromatic heterocyclic ring compounds include 2-mercaptobenzimidazole, 2-mercaptobenzoxazole, 2-mercaptobenzothiazole, 2-mercapto-5-methylbenzothiazole, 3-mercapto-1,2,4-triazole, 2-mercaptoquinoline, 8-mercaptopurine, 2,3,5,6-tetrachloro-4-pyridinethiol, 4-hydroxy-2-mercaptopyrimidine and 2-mercapto-4-phenyloxazole, but the exemplified compounds according to the present invention are not limited thereto.

Antifoggants may be incorporated into the thermally developable photosensitive material to which the present invention is applied. The substance which is known as the most effective antifoggant is a mercury ion. The incorporation of mercury compounds as the antifoggant into photosensitive materials is disclosed, for example, in U.S. Pat. No. 3,589,903. However, mercury compounds are not environmentally preferred. As mercury-free antifoggants, preferred are those antifoggants as disclosed in U.S. Pat. Nos. 4,546,075 and 4,452,885, and JP-A 59-57234. Particularly preferred mercury-free antifoggants are heterocyclic compounds having at least one substituent, represented by C(X1)(X2)(X3) (wherein X1 and X2 each represent halogen, and X3 represents hydrogen or halogen), as disclosed in U.S. Pat. Nos. 3,874,946 and 4,756,999. As examples of suitable antifoggants, employed preferably are compounds described in paragraph numbers [0030] through [0036] of JP-A 9-288328. Further, as another examples of suitable antifoggants, employed preferably are compounds described in paragraph numbers [0062] and [0063] of JP-A 9-90550. Furthermore, other suitable antifoggants are disclosed in U.S. Pat. No. 5,028,523, and European Patent 600,587; 605,981 and 631,176.

In the thermally processable photosensitive material of the present invention, employed can be sensitizing dyes described, for example, in JP-A Nos. 63-159841, 60-140335, 63-231437, 63-259651, 63-304242, and 63-15245; U.S. Pat. Nos. 4,639,414, 4,740,455, 4,741,966, 4,751,175, and 4,835,096. Useful sensitizing dyes employed in the present invention are described, for example, in publications described in or cited in Research Disclosure Items 17643, Section IV–A (page 23, December 1978). Particularly, selected can advantageously be sensitizing dyes having the spectral sensitivity suitable for spectral characteristics of light sources of various types of scanners. For example, compounds described in JP-A Nos. 9-34078, 9-54409 and 9-80679 are preferably employed.

Various kinds of additives can be incorporated into a photosensitive layer, a non-photosensitive layer or other construction layers. Except for the compounds mentioned above, surface active agents, antioxidants, stabilizers, plasticizers, UV (ultra violet rays) absorbers, covering aids, etc. may be employed in the thermally developable photosensitive material according to the present invention. These additives along with the above-mentioned additives are described in Research Disclosure Item 17029 (on page 9 to 15, June, 1978) and can be employed.

Supports employed in the present invention are preferably, in order to minimize the deformation of images after development processing, plastic films (for example, polyethylene terephthalate, polycarbonate, polyimide, nylon, cellulose triacetate, polyethylene naphthalate). The thickness of the support is between about 50 and about 300 $\mu$m, and is preferably between 70 and 180 $\mu$m. Furthermore, thermally processed plastic supports may be employed. As acceptable plastics, those described above are listed. The thermal processing of the support, as described herein, is that after film casting and prior to the photosensitive layer coating, these supports are heated to a temperature at least 30° C. higher than the glass transition point, preferably by not less than 35° C. and more preferably by at least 40° C. However, when the supports are heated at a temperature higher than the melting point, no advantages of the present invention are obtained. Commonly known casting methods and subbing methods are applicable to the support used in the invention, as described in JP-A 9-50094, items [0030]–[0070].

To improve an electrification property, a conducting compound such as a metal oxide and/or a conducting polymer can be incorporated into a construction layer. These compounds can be incorporated into any layer, preferably into a sublayer, a backing layer and an intermediate layer between a photosensitive layer and a sublayer, etc. In the present invention, the conducting compounds described in U.S. Pat. No. 5,244,773, column 14 through 20, are preferably used.

In cases where the thermally developable photosensitive material is specifically employed for the output of a printing image setter with an oscillation wavelength of 600 to 800 nm, hydrazine derivatives are preferably incorporated into the photosensitive material. Exemplary preferred hydrazine compounds are described in RD23515 (November, 1983, page 346), U.S. Pat. Nos. 4,080,207, 4,269,929, 4,276,364, 4,278,748, 4,385,108, 4,459,347, 4,478,928, 4,560,638, 4,686,167, 4,912,016, 4,988,604, 4,994,365, 5,041,355, and 5,104,769; British Patent 2,011,391B; European Patents 217,310, 301,799 and 356,898; JP-A 60-179734, 61-170733, 61-270744, 62-178246, 62-270948, 63-29751, 63-32538, 63-104047, 63-121838, 63-129337, 63-22374, 63-234244, 63-234245, 63-234246, 63-294552, 63-306438, 64-10233, 1-90439, 1-100530, 1-105041, 1-105943, 1-276128, 1-280747, 1-283548, 1-283549, 1-285940, 2-2541, 2-7057, 2-13958, 2-196234, 2-196235, 2-198440, 2-198441, 2-198442, 2-220042, 2-221953, 2-221954, 2-285342, 2-285343, 2-289843, 2-302750, 2-304550, 3-37642, 3-54549, 3-125134, 3-184039, 3-240036, 3-240037, 3-259240, 3-280038, 3-282536, 4-51143, 4-56842, 4-84134, 2-230233, 4-96053, 4-216544, 5-45761, 5-45762, 5-45763, 5-45764, 5-45765, 6-289524, and 9-160164.

Furthermore, other than those, employed can be compounds described in (Ka 1) of Japanese Patent Publication (hereinafter, denoted as JP-B) No. 6-77138, specifically, compounds described on pages 3 and 4 of the Publication; compounds represented by general formula (I) in JP-B No. 6-93082, specifically, compounds 1 through 38 described on pages 8 to 18 of the Publication; compounds represented by general formula (4), general formula (5), and general formula (6) in JP-A No. 6-230497, specifically, compounds 4-1 through 4-10 on pages 25 and 26, compounds 5-1 through 5-42 on pages 28 to 36, and compounds 6-1 through 6-7 on pages 39 and 40 of the Publication; compounds represented by general formula (I) and general formula (2) in JP-A No. 6-289520, specifically, compounds 1-1) through 1-17) and 2-1) on pages 5 to 7 of the Publication; compounds described in (Ka 2) and (Ka 3) of JP-A No. 6-313936, specifically, compounds described on pages 6 to 19 of the Publication; compounds described in (Ka 1) of JP-A No.

6-313951, specifically, compounds described on pages 3 to 5 of the Publication; compounds represented by general formula (I) in JP-A No. 7-5610, specifically, compounds I-1 through I-38 described on pages 5 to 10 of the Publication; compounds represented by general formula (II) in JP-A No. 7-77783, specifically, compounds II-1 through II-102 described on pages 10 to 27 of the Publication; and compounds represented by general formula (H) and general formula (Ha) in JP-A No. 7-104426, specifically, compounds H-1 through H-44 described on pages 8 to 15 of the Publication.

In addition to these materials, a variety of adjuvants may be incorporated into the photosensitive layer, non-photosensitive layer or other layer(s). Exemplarily, a surfactant, an antioxidant, a stabilizer, a plasticizer, a UV absorbent or a coating aid may be incorporated. As these adjuvants and other additives can be used compounds described in RD17029 (June, 1978, page 9–15).

Supports usable in the thermally developable photosensitive materials include various kinds of polymeric materials, glass, wool fabric, cotton fabric, paper, metal (e.g., aluminum) and those which are convertible to flexible sheets or rolls are preferred in terms of handling as information recording material. Preferred supports usable in thermally developable photosensitive materials are plastic resin films (e.g., cellulose acetate film, polyester film, polyethylene terephthalate film, polyethylene naphthalate film, polyamide film, polyimide film, cellulose triacetate film, polycarbonate film) and biaxially stretched polyethylene terephthalate film is specifically preferred. The thickness of the support is preferably 50 to 300 $\mu$m, and more preferably 70 to 180 $\mu$m.

In the present invention, to improve an electrification property, a conducting compound such as a metal oxide and/or a conducting polymer can be incorporated into a construction layer. These compounds can be incorporated into any layer, preferably into a sublayer, a backing layer and an intermediate layer between a photosensitive layer and a sublayer, etc. In the present invention, the conducting compounds described in U.S. Pat. No. 5,244,773, column 14 through 20, are preferably used.

The thermally developable photosensitive material according to the invention comprises a support having thereon a photosensitive layer, and preferably further on the photosensitive layer having a non-photosensitive layer. For example, it is preferred that a protective layer is provided on the photosensitive layer to protect the photosensitive layer and that a back coating layer is provided on the opposite side of the support to the photosensitive layer to prevent adhesion between photosensitive materials or sticking of the photosensitive material to a roller. Further, there may be provided a filter layer on the same side or opposite side to the photosensitive layer to control the amount or wavelengths of light transmitting the thermally developable photosensitive layer. Alternatively, a dye or pigment may be incorporated into the photosensitive layer. In this case, dyes described in JP-A 8-201959 are preferably used therein. The photosensitive layer may be comprised of plural layers. To adjust contrast, a high speed layer and low speed layer may be provided in combination. Various adjuvants may be incorporated into the photosensitive layer, non-photosensitive layer or other component layer(s).

The coating method of the photosensitive layer, protective layer and backing layer is not specifically limited. Coating can be conducted by any method known in the art, including air knife, dip-coating, bar coating, curtain coating, and hopper coating. Two or more layers can be simultaneously coated. As a solvent for coating solution are employed organic solvents such as methyl ethyl ketone (also denoted as MEK), ethyl acetate and toluene.

The thermally developable photosensitive material, which is stable at ordinary temperatures, is exposed and heated at a high temperature (preferably 80 to 200° C., and more preferably 100 to 150° C.) to undergo development. In cases when heated at a temperature of lower than 80° C., sufficient image density can be obtained within a short time. Further, in cases when heated at a temperature of higher than 200° C., a binder melts and is transferred to a roller, adversely affecting not only images but also transportability and a developing machine. The organic silver salt (functioning as an oxidant) and the reducing agent undergo oxidation-reduction reaction upon heating to form silver images. The reaction process proceeds without supplying any processing solution such as water.

Any light source within the infrared region is applicable to exposure of the thermally developable photosensitive material and infrared semiconductor lasers (780 nm, 820 nm) are preferred in terms of high power and transmission capability through the photosensitive material.

In the invention, exposure is preferably conducted by laser scanning exposure. It is also preferred to use a laser exposure apparatus, in which scanning laser light is not exposed at an angle substantially vertical to the exposed surface of the photosensitive material. The expression "laser light is not exposed at an angle substantially vertical to the exposed surface" means that laser light is exposed preferably at an angle of 55 to 88°, more preferably 60 to 86°, still more preferably 65 to 84, and optimally 70 to 82°. When the photosensitive material is scanned with laser light, the beam spot diameter on the surface of the photosensitive material is preferably not more than 200 $\mu$m, and more preferably not more than 100 $\mu$m. Thus, the less spot diameter preferably reduces an angle displacing from verticality of the laser incident angle. The lower limit of the beam spot diameter is 10 $\mu$m. The thus laser scanning exposure can reduce deterioration in image quality due to reflection light, such as occurrence of interference fringe-like unevenness.

Exposure applicable in the invention is conducted preferably using a laser scanning exposure apparatus producing longitudinally multiple scanning laser light, whereby deterioration in image quality such as occurrence of interference fringe-like unevenness is reduced, as compared to scanning laser light with longitudinally single mode. Longitudinal multiplication can be achieved by a technique of employing backing light with composing waves or a technique of high frequency overlapping. The expression "longitudinally multiple" means that the exposure wavelength is not a single wavelength. The exposure wavelength distribution is usually not less than 5 nm and not more than 10 nm. The upper limit of the exposure wavelength distribution is not specifically limited but usually about 60 nm.

It is preferred that when subjected to thermal development, the thermally developable photosensitive material contains an organic solvent. Examples of solvents include ketones such as acetone, isophorone, ethyl amyl ketone, methyl ethyl ketone, methyl isobutyl ketone; alcohols such as methyl alcohol, ethyl alcohol, n-propyl alcohol, isopropyl alcohol, n-butyl alcohol, isobutyl alcohol, diacetone alcohol, cyclohexanol, and benzyl alcohol; glycols such as ethylene glycol, dimethylene glycol, triethylene glycol, propylene glycol and hexylene glycol; ether alcohols such as ethylene glycol monomethyl ether, and dimethylene glycol monomethyl ether; ethers such as ethyl ether, dioxane, and isopropyl ether; esters such as ethyl acetate, butyl acetate, amyl acetate, and isopropyl acetate; hydrocarbons such as n-pentane, n-hexane, n-heptane, cyclohexene, benzene, toluene, xylene; chlorinated compounds-such as chloromethyl, chloromethylene, chloroform, and dichlorobenzene; amines such as monomethylamine, dimethylamine, triethanol amine, ethylenediamine, and triethylamine; and water, formaldehyde, dimethylformaldehyde, nitromethane, pyridine, toluidine, tetrahydrofuran and acetic acid. The solvents are not to be construed as limiting these examples. These solvents may be used alone or in combination.

The solvent content in the photosensitive material can be adjusted by varying conditions such as temperature conditions at the drying stage after the coating stage. The solvent content can be determined by means of gas chromatography under the conditions suitable for detecting the solvent. The total solvent content (based on weight) of the thermally developable photosensitive material used in the invention is preferably adjusted to be 40 to 4500 ppm, and more preferably 100 to 4000 ppm (based on the weight of constituting components of the photosensitive material, except for a support). The solvent content within the range described above leads to a thermally developable photosensitive material with low fog density as well as high sensitivity.

The use of novel infrared sensitizing dyes relating to the invention is not limited to silver halide light sensitive photographic materials and thermally developable photosensitive materials each of which contains silver halide as a photosensitive material or photosensor. These novel infrared sensitizing dyes are applicable to any photosensitive composition, in which these dye are capable of functioning as a photoreceptor, including a photosensitive composition containing a non-silver photosensitive substance which is capable of being spectral-sensitized with this novel infrared sensitizing dye and a photosensitive composition containing the infrared sensitizing dye, light absorption of which enable to form images. Exemplary examples of the photosensitive composition include a quinoneazide containing photosensitive material used for lithographic printing plate and a photosensitive composition used for free radical photography. Photosensitive materials to make a lithographic printing plate, for example, are described in U.S. Pat. Nos. 5,430,699, and 3,799,778; JP-A 53-13342, 60-37549 and 9-171254.

EXAMPLES

The present invention will be explained based on examples, but embodiments of the invention are not limited to these.

Example 1

Preparation of Photographic Material Sample 101

On a subbed cellulose triacetate film were coated the following compositions to prepare photographic material Sample 101. Unless otherwise noted, the addition amount of each compound was represented in term of $g/m^2$, provided that the amount of silver halide or colloidal silver was converted to the silver amount and the amount of a sensitizing dye was represented in mol/Ag mol.

| 1st Layer: Anti-Halation Layer | |
|---|---|
| Black colloidal silver | 0.18 |
| UV absorbent (UV-1) | 0.30 |
| High boiling solvent (Oil-2) | 0.17 |
| Gelatin | 1.59 |
| 2nd Layer: Intermediate Layer | |
| High boiling solvent (Oil-2) | 0.01 |
| Gelatin | 1.27 |
| 3rd Layer: Infrared-sensitive Layer | |
| Silver iodobromide emulsion A | 0.15 |
| Silver iodobromide emulsion B | 0.70 |
| Sensitizing dye (as shown in Table 1) | $5.0 \times 10^{-5}$ |
| Magenta coupler (M-1) | 0.20 |
| High boiling solvent (Oil-1) | 0.34 |
| Gelatin | 0.90 |
| 4th Layer: First Protective Layer | |
| Silver iodobromide emulsion (av. 0.04 μm, I: 4.0 mol %) | 0.30 |
| UV absorbent (UV-2) | 0.03 |
| UV absorbent (UV-3) | 0.015 |
| UV absorbent (UV-4) | 0.015 |
| UV absorbent (UV-5) | 0.015 |
| UV absorbent (UV-6) | 0.10 |
| High boiling solvent (Oil-1) | 0.44 |
| High boiling solvent (Oil-3) | 0.07 |
| Gelatin | 1.35 |
| 5th Layer: Second protective Layer | |
| Alkali-soluble matting agent (Av. Particle size of 2 μm) | 0.15 |
| Polymethyl methacrylate (av. Particle size of 3 μm) | 0.04 |
| Lubricant (WAX-1) | 0.02 |
| Gelatin | 0.54 |

In addition to the above compositions, compounds Su-1, Su-2, SU-3 and SU-4; viscosity-adjusting agent V-1; hardeners H-1 and H-2; stabilizer ST-1; antifoggant AF-1 and AF-2, and AF-3 having a weight-averaged molecular weight of 10,000 and 100,000; dyes AI-1, AI-2 and AI-3; compounds FS-1 and Fs-2; and antiseptic agent DI-1 were optimally added to each layer.

M-1
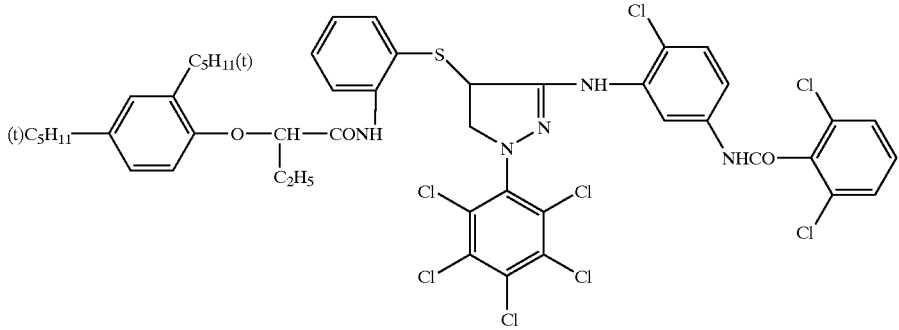
Oil-1
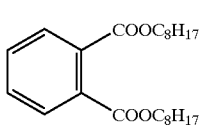
Oil-3
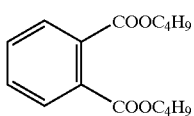
Oil-2
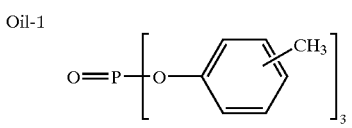
UV Absorbent
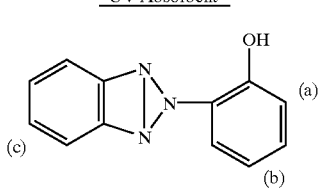
| | (a) | (b) | (c) |
|---|---|---|---|
| UV-1 | —$C_{12}H_{25}$ | —$CH_3$ | —H |
| UV-2 | —H | —(t)$C_4H_9$ | —H |
| UV-3 | —(t)$C_4H_9$ | —(t)$C_4H_9$ | —H |
| UV-4 | —(t)$C_4H_9$ | —$CH_3$ | —Cl |
| UV-5 | —(t)$C_4H_9$ | —(t)$C_4H_9$ | —Cl |
UV-6
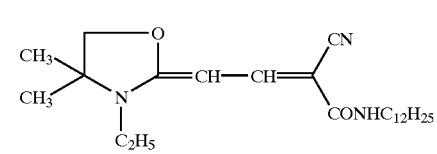
WAX-1
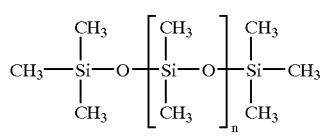
Weight-average molecular weight MW: 3,000
SU-1
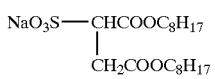
-continued
SU-2
SU-3
$CF_3$—$(CF_2)_7$—$SO_2$—N($C_3H_7$)—$CH_2COOK$
SU-4
$C_8F_{17}$—$SO_2NH$—$(CH_2)_3$—$N^+(CH_3)_3$·$Br^-$
FS-1
FS-2
AI-1
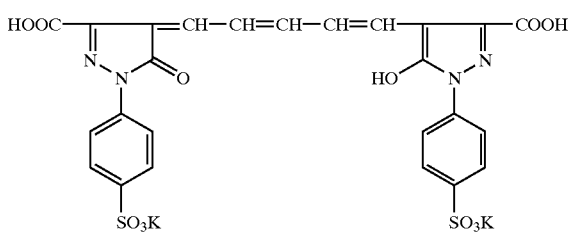

-continued

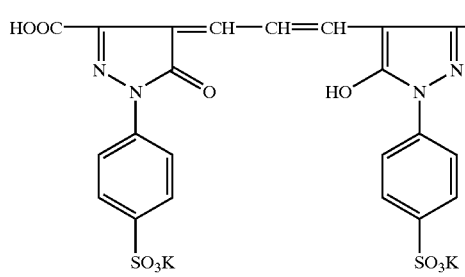
AI-2

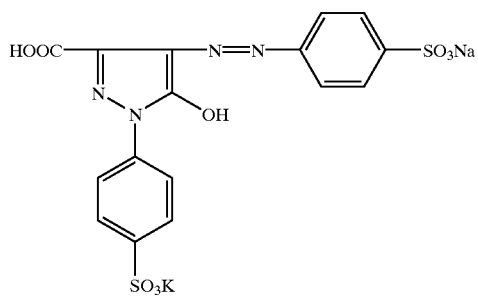
AI-3

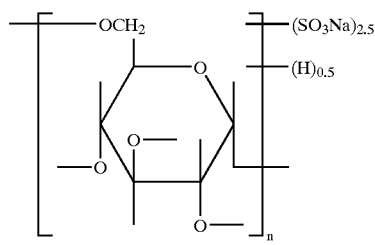
Weight-average molecular weight MW: 120,000

V-1

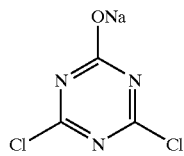
H-1

$(CH_2=CHSO_2CH_2)_2O$
H-2

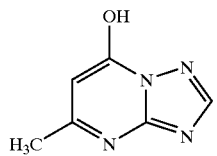
ST-1

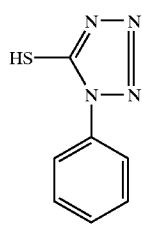
AF-1

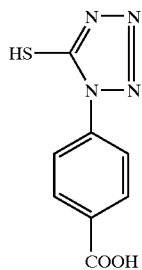
AF-2

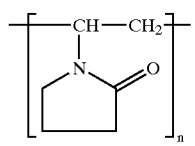
AF-3

Weight-average molecular weight MW: 10,000

Weight-average molecular weight MW: 100,000

DI-1 (mixture)

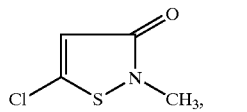     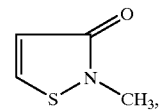

A     B

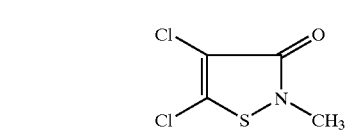

C

A:B:C = 50:46:4 (molar ratio)

Characteristics of silver iodobromide emulsions described above are shown below, in which the average grain size refers to an edge length of a cube having the same volume as that of the grain. Each emulsion was subjected to gold, sulfur and selenium sensitization.

| Emul-sion | Av. AgI Content (mol %) | Av. Grain Size (μm) | Crystal Habit | Diameter/Thickness |
|---|---|---|---|---|
| A | 6.0 | 0.60 | Twinned Tabular | 4.0 |
| B | 8.0 | 0.90 | Twinned Tabular | 3.0 |

Preparation of Photographic Material Samples 102 to 115

Samples 102 to 115 were prepared in a manner similar to Sample 101, except that sensitizing dye Dye-A (comparative dye) used in the 3rd layer was replaced by an equimolar amount of a dye as shown in Table 1.

Evaluation of Sensitivity and Fog

Samples 1-1 to 115 were cut to a size according to the 135-standard and allowed to stand under the following conditions:

Condition A: 23° C., 55% RH, 4 days
Condition B: 40° C., 80% RH, 4 days.

Each sample was exposed to infrared light for 1/100 sec., using Kodak Wratten filter 89B, subjected to color processing (CNK-4, available from Konica Corp.) and evaluated with respect to sensitivity and fogging.

Fog Density

The fog density was represented by a green light transmission density value measured by using PD transmission type densitometer (available from Konica Corp.), as shown in Table 1.

Sensitivity

Sensitivity was represented by a relative value of reciprocal of exposure necessary to give a density of a fog density plus 0.15, based the sensitivity of Sample 101 being 100.

Evaluation of Standing and Storage Stability

Coating solution stability was evaluated as follows. A coating solution used for the 3rd layer of each sample was allowed to stand at 40° C. for 30 min. and then coated to prepare a photographic material sample. The photographic material was further aged under the condition A and obtained sensitivity was denoted as SiA. Another coating solution was allowed to stand at 40° C. for 8 hrs., the prepared photographic material sample was similarly aged under the condition A and obtained sensitivity was denoted as SCA. A value of variation in sensitivity, $\Delta$Sp (=SiA/SCA) was regarded as a measure of coating solution stability.

Further, photographic material samples coated after allowing the coating solution to stand at 40° C. for 8 hrs. were each aged under the condition B and obtained sensitivity was denoted as SCB. Similarly, the photographic material samples each were aged under the condition A and obtained sensitivity was denoted as SCA. A value of variation in sensitivity, $\Delta$Ss (=SCA/SCB) was regarded as a measure of storage stability of the photographic material. Furthermore, a fog density of the photographic material aged under the condition A was determined and denoted as FCA. Similarly, a fog density of the photographic material aged under the condition B was determined and denoted as FCB. A value of difference in fog density, $\Delta$Fs (=FCB−FCA) was regarded as a measure of storage stability with respect to fogging. The value of $\Delta$Sp is the closer to 1, production stability (or coating solution stability) was superior. The value of $\Delta$Ss or $\Delta$Fs is the closer to 1, storage stability of the photographic material was superior. Results are shown in Table 1.

TABLE 1

| Sample | Sensitizing Dye | Fog (FCA) | Sensitivity (SCA) | Standing ($\Delta$Sp) | Aging $\Delta$Ss | Aging $\Delta$Fs | Remark |
|---|---|---|---|---|---|---|---|
| 101 | Dye-A | 0.08 | 100 | 1.29 | 1.23 | 0.05 | Comp. |
| 102 | Dye-B | 0.09 | 97 | 1.26 | 1.21 | 0.10 | Comp. |
| 103 | Dye-C | 0.07 | 102 | 1.15 | 1.28 | 0.05 | Comp. |
| 104 | Dye-D | 0.08 | 100 | 1.20 | 1.19 | 0.09 | Comp. |
| 105 | No.S-3 | 0.06 | 106 | 1.12 | 1.14 | 0.05 | Inv. |
| 106 | No.S-7 | 0.06 | 110 | 1.12 | 1.13 | 0.04 | Inv. |
| 107 | No.S-9 | 0.07 | 112 | 1.09 | 1.12 | 0.03 | Inv. |
| 108 | No.S-15 | 0.06 | 108 | 1.11 | 1.14 | 0.04 | Inv. |
| 109 | No.S-21 | 0.06 | 106 | 1.13 | 1.15 | 0.07 | Inv. |
| 110 | No.S-24 | 0.06 | 105 | 1.13 | 1.16 | 0.07 | Inv. |
| 111 | No.S-41 | 0.06 | 109 | 1.08 | 1.11 | 0.04 | Inv. |
| 112 | No.S-61 | 0.06 | 110 | 1.09 | 1.10 | 0.05 | Inv. |
| 113 | No.S-63 | 0.07 | 109 | 1.12 | 1.13 | 0.06 | Inv. |
| 114 | No.S-63 & No.10 (20:1) | 0.07 | 114 | 1.13 | 1.14 | 0.06 | Inv. |
| 115 | No.10 | 0.06 | 82 | 1.20 | 1.17 | 0.05 | Comp. |

Dye-A

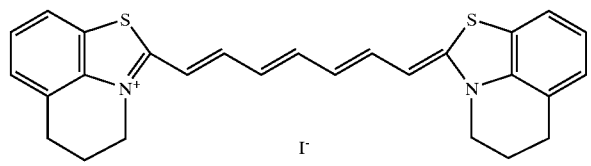

Dye-B

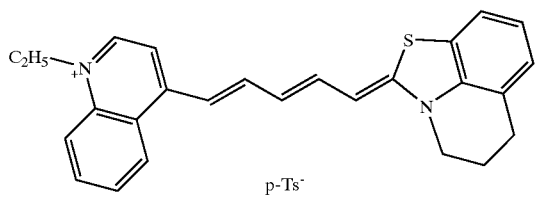

Dye-C

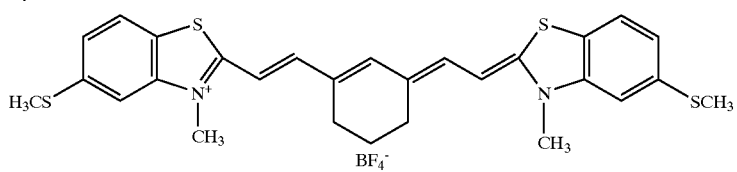

Dye-D

TABLE 1-continued

| Sample | Sensitizing Dye | Fog (FCA) | Sensitivity (SCA) | Standing (ΔSp) | Aging ΔSs | ΔFs | Remark |
|---|---|---|---|---|---|---|---|

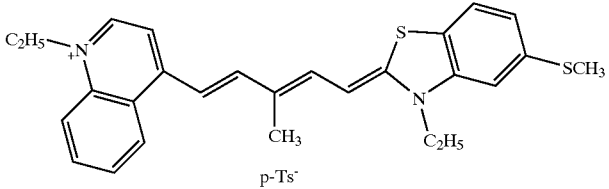

As apparent from Table 1, silver halide photographic materials obtained according to the invention exhibited high sensitivity, low fog, reduced variation in sensitivity due to standing of coating solution and superior storage stability of raw films.

Example 2

Preparation of a Subbed PET Photographic Support

Both surfaces of a biaxially stretched thermally fixed 175 μm PET film, available on the market, was subjected to corona discharging at 8 w/m²·min. Onto the surface of one side, the subbing coating composition a-1 descried below was applied so as to form a dried layer thickness of 0.8 μm, which was then dried. The resulting coating was designated Subbing Layer A-1. Onto the opposite surface, the subbing coating composition b-1 described below was applied to form a dried layer thickness of 0.8 μm. The resulting coating was designated Subbing Layer B-1.

| Subbing Coating Composition a-1 | |
|---|---|
| Latex solution (solid 30%) of a copolymer consisting of butyl acrylate (30 weight %), t-butyl acrylate (20 weight %) styrene (25 weight %) and 2-hydroxyethyl-acrylate (25 weight %) | 270 g |
| (C-1) | 0.6 g |
| Hexamethylene-1,6-bis(ethyleneurea) | 0.8 g |
| Water to make | 1 liter |
| Subbing Coating Composition b-1 | |
| Latex liquid (solid portion of 30%) of a copolymer consisting of butyl acrylate (40 weight %) styrene (20 weight %) glycidyl acrylate (25 weight %) | 270 g |
| (C-1) | 0.6 g |
| Hexamethylene-1,6-bis(ethyleneurea) | 0.8 g |
| Water to make | 1 liter |

Subsequently, the surfaces of Subbing Layers A-1 and B-1 were subjected to corona discharging with 8 w/m²·minute. Onto the Subbing Layer A-1, the upper subbing layer coating composition a-2 described below was applied so as to form a dried layer thickness of 0.8 μm, which was designated Subbing Layer A-2, while onto the Subbing Layer B-1, the upper subbing layer coating composition b-2 was applied so at to form a dried layer thickness of 0.8 μm, having a static preventing function, which was designated Subbing Upper Layer B-2.

| Upper Subbing Layer Coating Composition a-2 | |
|---|---|
| Gelatin in an amount (weight) to make 0.4 g/m² | |
| (C-1) | 0.2 g |
| (C-2) | 0.2 g |
| (C-3) | 0.1 g |
| Silica particles (av. size 3 μm) | 0.1 g |
| Water to make | 1 liter |
| Upper Subbing Layer Coating Composition b-2 | |
| (C-4) | 60 g |
| Latex solution (solid 20% comprising) | 80 g |
| (C-5) as a substituent | |
| Ammonium sulfate | 0.5 g |
| (C-6) | 12 g |
| Polyethylene glycol (average molecular weight of 600) | 6 g |
| Water to make | 1 liter |

(C-1)

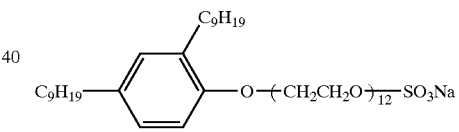

(C-2)

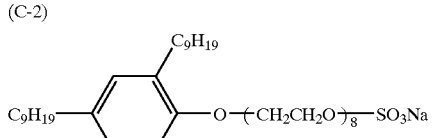

(C-3)

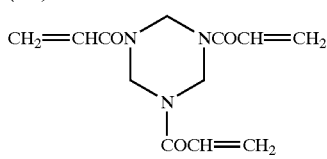

(C-4)

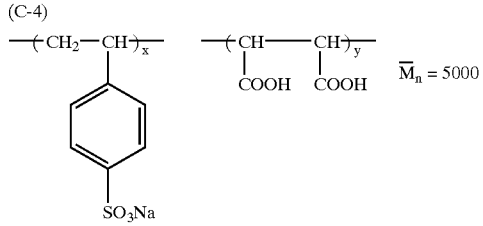

($\overline{M}_n$ is a number average molecular weight)
x:y = 75:25 (weight ratio)

-continued (C-5)

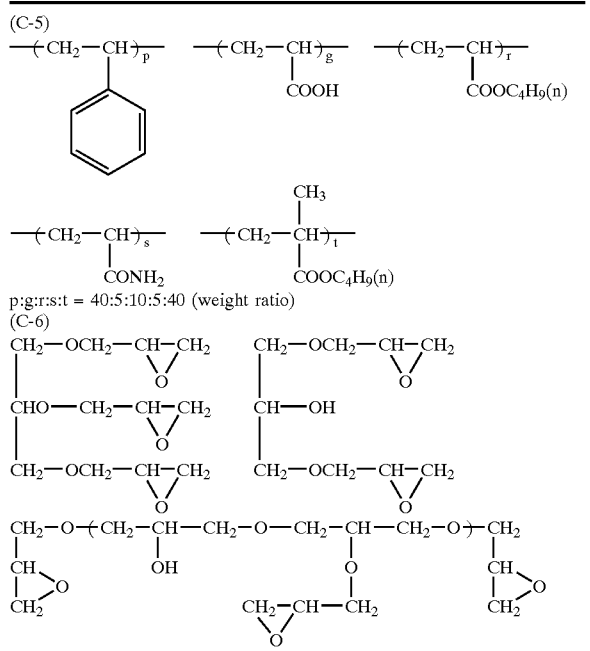

Mixture consisting of the three
compounds illustrated above

Thermal Treatment of Support

The subbed support was dried at 140° C. in the process of subbing and drying a support.

Preparation of Silver Halide Emulsion

In 900 ml of deionized water were dissolved 7.5 g of gelatin and 10 mg of potassium bromide. After adjusting the temperature and the pH to 35° C. and 3.0, respectively, 370 ml of an aqueous solution containing 74 g silver nitrate and an equimolar aqueous solution containing potassium bromide, potassium iodide (in a molar ratio of 98 to 2) and $1\times10^{-6}$ mol/mol Ag of Ir(NO)Cl$_5$ and $1\times10^{-6}$ of rhodium chloride were added over a period of 10 minutes by the controlled double-jet method, while the pAg was maintained at 7.7. Thereafter, 4-hydroxy-6-methyl-1,3,3a,7-tetraazaindene was added and the pH was adjusted to 5 using NaOH. There was obtained cubic silver iodobromide grains having an average grain size of 0.06 μm, a variation coefficient of the projection area equivalent diameter of 11 percent, and the proportion of the {100} face of 87 percent. The resulting emulsion was flocculated to remove soluble salts, employing a flocculating agent and after desalting, 0.1 g of phenoxyethanol was added and the pH and pAg were adjusted to 5.9 and 7.5, respectively to obtain silver halide emulsion.

Preparation of Sodium Behenate

In 945 ml water at 90° C. were dissolved 32.4 g of behenic acid, 9.9 g of arachidic acid and 5.6 g of stearic acid. Aqueous 1.5M sodium hydroxide solution of 98 ml was added thereto, while stirring at high speed. Then, after adding 0.93 ml of concentrated nitric acid, the reaction mixture was cooled to 55° C. and stirred for 30 min. to obtain a sodium behenate aqueous solution.

Preparation of Pre-formed Emulsion of Silver Behenate and Silver Halide Emulsion To the sodium behenate solution was added 15.1 g of the silver halide emulsion. After adjusting the pH at 8.1 with aqueous sodium hydroxide solution, 147 ml of aqueous 1M silver nitrate solution was added in 7 min. After stirring for 20 min., the reaction mixture was subjected ultrafiltration to remove soluble salts. Thus prepared silver behenate dispersion was comprised of monodisperse particles having an average size of 0.8 μm. The dispersion was flocculated and water was removed and washing and removal of water were further repeated six times and dried.

Preparation of Photosensitive Emulsion

To the pre-formed emulsion, 544 g of a methyl ethyl ketone (MEK) solution of polyvinyl butyral (average molecular weight of 3,000 and 17 wt %) and 107 g toluene was gradually added with mixing and dispersed at a rate of 280 kgf/cm$^2$.

Backing-side Coating

A coating solution for a backing layer of the following composition was coated by an extrusion coater on the side of B-2 layer of the support so as to have a wet thickness of 30 μm and dried at 60° C. for 3 min.

| Cellulose acetate (10% methyl ethyl ketone solution) | 15 ml/m$^2$ |
| Dye-B | 7 mg/m$^2$ |
| Dye-C | 7 mg/m$^2$ |
| Matting agent, monodispersed silica having monodispersity of 15% and a mean size of 10 μm | 30 mg/m$^2$ |
| C$_9$H$_{19}$—C$_6$H$_4$—SO$_3$Na | 10 mg/m$^2$ |

Dye-B

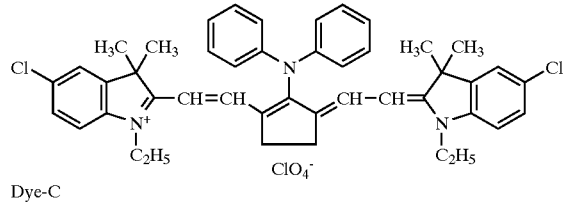

Dye-C

Emulsion Side Coating

Photosensitive Layer 1

On the sub-layer A-2 side of the support, a photosensitive layer having the following composition and, further thereon, a protective layer were coated so as to have silver coverage of 2.4 g/m$^2$, and thereafter dried at 55° C. in 15 min.

Photosensitive layer coating solution

| | |
|---|---|
| Photosensitive emulsion | 240 g |
| Sensitizing dye (as shown in Table 2) (0.1% methanol solution) | 1.7 ml |
| Pyridinium bromide perbromide (6% methanol solution) | 3 ml |
| Calcium bromide (0.1% methanol solution) | 1.7 ml |
| Antifoggant-2 (10% methanol solution) | 1.2 ml |
| 2-(4-Chlorobenzoyl)-benzoic acid (12% methanol solution) | 9.2 ml |
| 2-Mercaptobenzimidazole (1% methanol solution) | 11 ml |
| Tribromethylsulfoquinoline (5% methanol solution) | 17 ml |
| Reducing agent A-3 (20% methanol solution) | 29.5 ml |
| Phthalazinone | 0.6 g |
| 4-Methylphthalic acid | 0.25 g |
| Tetrachlorophthalic acid | 0.2 g |
| Antifoggant-2 | |

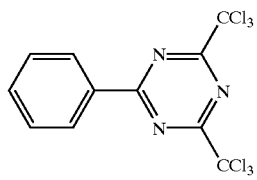

Surface protective layer coating solution

| | |
|---|---|
| Acetone | 5 ml/m² |
| Methyl ethyl ketone | 21 ml/m² |
| Cellulose acetate | 2.3 g/m² |
| Methanol | 7 ml/m² |
| Phthalazinone | 250 mg/m² |
| Matting agent, monodisperse silica having monodispersity of 10% and a mean size of 4 μm | 70 mg/m² |
| $CH_2$=$CHSO_2CH_2CH_2OCH_2CH_2SO_2CH$=$CH_2$ | 35 mg/m² |
| $C_9H_{19}$—$C_6H_4$—$SO_3Na$ | 10 mg/m² |

Exposure and Processing

The thus prepared thermally developable photosensitive material samples were each exposed to laser light using an imager having a semiconductor laser of 810 nm; and the exposed photosensitive material samples were subjected to thermal development at 110° C. for 15 sec. Exposure and development were conducted in an environment maintained at 23° C. and 50% RH.

Sensitometric Evaluation

Unexposed areas of the developed samples were measured with respect to a fog density. The less the value thereof, the better. Sensitivity (also denoted as "S") was represented by relative value of reciprocal of exposure necessary to a density of a fog density plus 1.0, based on the sensitivity of Sample 2-1 being 100.

Thermostatic Aging Test

The thermally developable photosensitive material samples were allowed to stand in a thermostatic chamber maintained at 40° C. and 50% RH for 5 days. The aged samples were measured with respect to sensitivity and fog density.

Evaluation results are shown in Table 2.

TABLE 2

| Sample | Sensitizing Dye | Fresh Sample | | Aged Sample | | Remark |
|---|---|---|---|---|---|---|
| | | Fog | S | Fog | S | |
| 2-1 | Dye-E | 0.18 | 100 | 0.22 | 111 | Comp. |
| 2-2 | Dye-F | 0.23 | 106 | 0.34 | 118 | Comp. |
| 2-3 | Dye-G | 0.12 | 40 | 0.15 | 44 | Comp. |
| 2-4 | No.S-4 | 0.13 | 114 | 0.17 | 118 | Inv. |
| 2-5 | No.S-6 | 0.14 | 118 | 0.17 | 124 | Inv. |
| 2-6 | No.S-11 | 0.13 | 119 | 0.17 | 125 | Inv. |
| 2-7 | No.S-13 | 0.14 | 118 | 0.16 | 125 | Inv. |
| 2-8 | No.S-16 | 0.14 | 114 | 0.19 | 117 | Inv. |
| 2-9 | No.S-27 | 0.15 | 121 | 0.20 | 124 | Inv. |
| 2-10 | No.S-30 | 0.16 | 111 | 0.21 | 117 | Inv. |
| 2-11 | No.S-43 | 0.13 | 122 | 0.19 | 125 | Inv. |
| 2-12 | No.S-43 & No.3* | 0.13 | 129 | 0.18 | 132 | Inv. |
| 2-13 | No.3 | 0.12 | 58 | 0.16 | 70 | Comp. |
| 2-14 | No.S-49 | 0.13 | 124 | 0.16 | 127 | Inv. |
| 2-15 | No.S-64 | 0.15 | 113 | 0.18 | 119 | Inv. |
| 2-16 | No.S-68 | 0.15 | 113 | 0.20 | 120 | Inv. |
| 2-17 | No.S-68 & No.9* | 0.15 | 122 | 0.18 | 128 | Inv. |
| 2-18 | No.9 | 0.14 | 51 | 0.19 | 60 | Comp. |

*Mixture of the dyes in a molar ration of 20:1

Dye-E

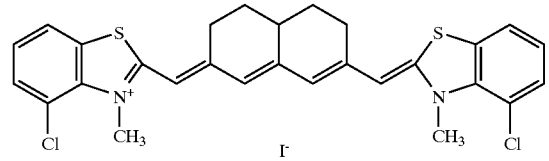

Dye-F

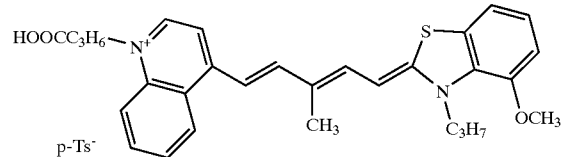

Dye-G

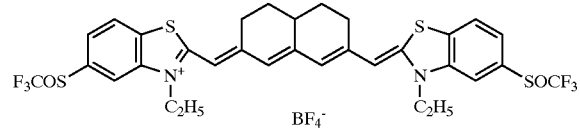

As apparent from Table 2, thermally developable photosensitive materials according to the invention exhibited superior sensitivity and reduced fogging, being little variation in sensitivity and fog density even when subjected to accelerated aging test and exhibiting superior storage stability of raw films.

Example 3

Preparation of Presensitized Plate for Lithographic Printing

A JIS-1050 aluminum plate of 0.24 mm thick was subjected to a degreasing treatment by immersing it in aqueous 10% sodium hydroxide solution maintained at 10° C. for 1 min and washed. The degreased aluminum plate was further subjected to a death-matting treatment by immersion into aqueous 10% sulfuric acid solution at 25° C. and washed. The surface of the aluminum plate was electrochemically roughened in aqueous 1.0% nitric acid solution at 30° C., a current density of 50 A/dm² and an electrolicity quantity of 400 c/dm². Thereafter, the plate was subjected to chemical etching at an aluminum-dissolution rate of 3 g/m2 in aqueous 10% sodium hydroxide solution at 50° C. Subsequently, the plate was subjected to a death-matting treatment by immersing in aqueous 10% nitric acid solution at 25° C. for 10 sec. and washed. The plate was then subjected to anodic oxidation treatment in aqueous 20% sulfuric acid solution at 35° C. and a current density of 2 A/dm² for 1 min. Thereafter, the plate was subjected to sealing treatment by immersing into aqueous 0.1% ammonium acetate solution at 80° C. for 30 sec. and dried at 80° C. for 5 min. On one side (back side) of the aluminum plate, an aqueous solution of JIS No. 3 sodium silicate (10 g/l) was coated by a wire-bar and dried at 80° C. for 3 min. to obtain an aluminum plate for use as a support having a covering layer on the back side. The coverage of the covering layer was 10 mg/m².

On the other side of the support, a coating solution for a photosensitive layer having the following composition was coated using a wire-bar and dried at 80° C. for 2 min. to obtain a photosensitized plate 310 for lithographic printing. The coverage of the photosensitive layer was 2.0 g/m². The term, part(s) means part(s9 by weight.

| | |
|---|---|
| Binder A; novolac resin comprised of co-polycondensation polymer of phenol/m-and p-cresol/formaldehyde (5/57/38, Mw = 4,000) | 70 parts |
| Binder B; copolymer of methyl methacrylate/hydroxyphenylmethacrylamide/methacrylamide/methacryloitrile (20/20/30/30, Mw = 30,000) | 5 parts |
| Acid-decomposable compound (A) | 20 parts |
| Acid-generating agent (B) | 3 parts |
| Infrared absorbing dye (Table 3) | 1 part |
| Crystal violet | 0.3 part |
| Fluorinated surfactant S-381 (available From Asahi Chemical Co. ltd.) | 0.5 part |
| Methyl lactate | 700 parts |
| Methyl ethyl ketone (MEK) | 200 parts |

As the acid-decomposable compound (A) was used Compound S-1 described in Synthesis Example of Japanese Patent Application No. 9-300540, col. 0047, forming a diol compound containing an ethylene glycol component or propylene glycol component upon reaction with acid generated by the acid-generating agent (B), as shown below:

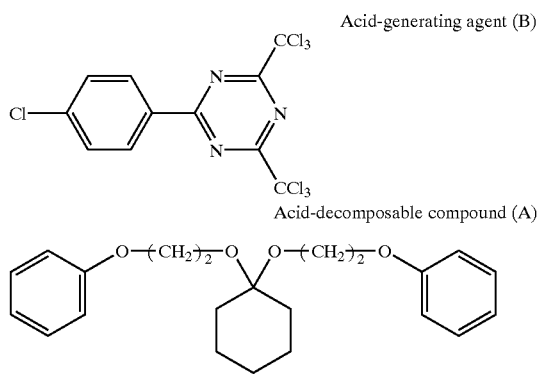

Using the thus obtained lithographic printing plate, images were formed according to the following procedure. Thus, the plate was image wise exposed using an exposure apparatus Trend Setter 3244 (available from Kreo Product Corp., mounted with semiconductor laser of 830 nm at an output of 10W and 240 channels) and processed using an automatic processor PSZ-910 and developer SDR-1 (both available from Konica Corp.). Using 25 lit. of a developing solution, which was prepared by diluting SDR-1 to 6 times with water, in a developing bath, development was conducted at a temperature of 32° C. for 1.2 sec. and thereafter washing was undergone. The thus prepared printing plate was evaluated with respect to sensitivity and storage stability:

Sensitivity; exposure energy necessary to remove exposed areas of the photosensitive layer (mJ/cm²), and Storage stability; sensitivity of the printing plate obtained after aged at 50° C. and 80% RH for 3 days Results thereof are shown in Table 3.

TABLE 3

| | | Sensitivity (mj/cm²) | | |
|---|---|---|---|---|
| Sample | IR Dye | Fresh | Aged | Remark |
| 3-1 | Dye-H | 200 | 35 | Comp. |
| 3-2 | Dye-I | 160 | 200 | Comp. |
| 3-3 | No.S-2 | 240 | 260 | Inv. |
| 3-4 | No.S-18 | 250 | 265 | Inv. |
| 3-5 | No.S-32 | 240 | 260 | Inv. |
| 3-6 | No.S-47 | 255 | 265 | Inv. |
| 3-7 | No.S-54 | 235 | 245 | Inv. |
| 3-8 | No.S-66 | 205 | 230 | Inv. |

Dye-H

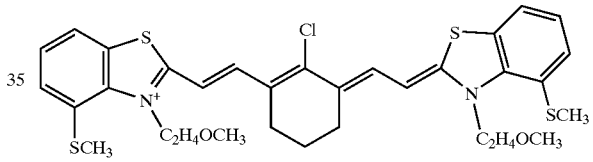

Dye-1

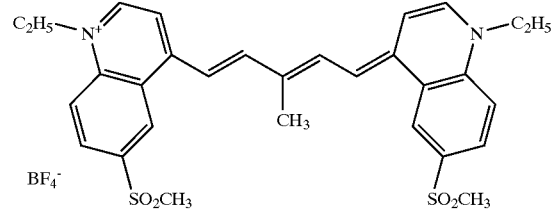

As apparent from Table 3, image forming materials according to the invention exhibited superior sensitivity upon exposure to infrared light, being little variation in sensitivity even after subjected to accelerated aging and superior in storage stability.

Example 4

Preparation of a Subbed PET Photographic Support

Both surfaces of a biaxially stretched thermally fixed 100 μm PET film, available on the market, was subjected to corona discharging at 8 w/m²·min. Onto the surface of one side, the subbing coating composition a-1 descried below was applied so as to form a dried layer thickness of 0.8 μm, which was then dried. The resulting coating was designated Subbing Layer A-1. Onto the opposite surface, the subbing coating composition b-1 described below was applied to form a dried layer thickness of 0.8 μm. The resulting coating was designated Subbing Layer B-1.

| Subbing Coating Composition a-1 | |
|---|---|
| Latex solution (solid 30%) of a copolymer consisting of butyl acrylate (30 weight %), t-butyl acrylate (20 weight %) styrene (25 weight %) and 2-hydroxy ethyl acrylate (25 weight %) | 270 g |
| (C-1) | 0.6 g |
| Hexamethylene-1,6-bis(ethyleneurea) | 0.8 g |
| Water to make | 1 liter |
| Subbing Coating Composition b-1 | |
| Latex liquid (solid portion of 30%) of a copolymer consisting of butyl acrylate (40 weight %) styrene (20 weight %) glycidyl acrylate (25 weight %) | 270 g |
| (C-1) | 0.6 g |
| Hexamethylene-1,6-bis(ethyleneurea) | 0.8 g |
| Water to make | 1 liter |

Subsequently, the surfaces of Subbing Layers A-1 and B-1 were subjected to corona discharging with 8 w/M²·minute. Onto the Subbing Layer A-1, the upper subbing layer coating composition a-2 described below was applied so as to form a dried layer thickness of 0.8 μm, which was designated Subbing Layer A-2, while onto the Subbing Layer B-1, the upper subbing layer coating composition b-2 was applied so at to form a dried layer thickness of 0.8 μm, having a static preventing function, which was designated Subbing Upper Layer B-2.

| Upper Subbing Layer Coating Composition a-2 | |
|---|---|
| Gelatin in an amount (weight) to make 0.4 g/m² | |
| (C-1) | 0.2 g |
| (C-2) | 0.2 g |
| (C-3) | 0.1 g |
| Silica particles (av. size 3 μm) | 0.1 g |
| Water to make | 1 liter |
| Upper Subbing Layer Coating Composition b-2 | |
| (C-4) | 60 g |
| Latex solution (solid 20% comprising) (C-5) as a substituent | 80 g |
| Ammonium sulfate | 0.5 g |
| (C-6) | 12 g |
| Polyethylene glycol (average molecular weight of 600) | 6 g |
| Water to make | 1 liter |

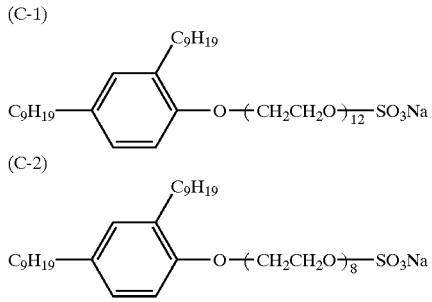

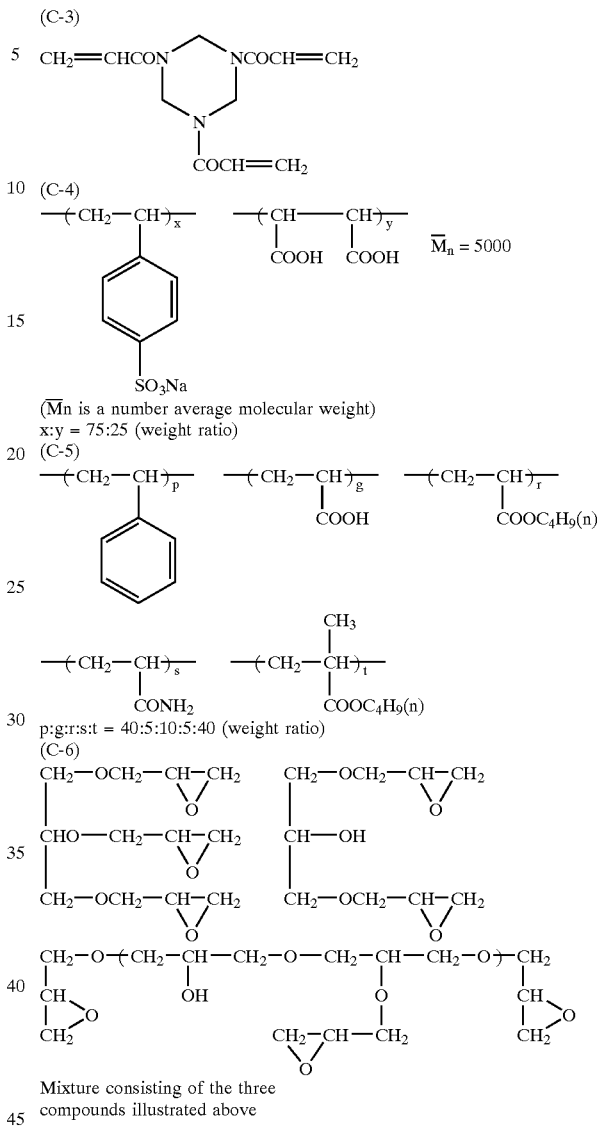

Mixture consisting of the three compounds illustrated above

Thermal Treatment of Support

The subbed support was dried at 140° C. in the process of subbing and drying a support.

Preparation of Backing Coat Composition

To 830 g of methyl ethyl ketone, 84.2 g of cellulose acetate-butylate (CAB381-20, available from Eastman Chemical Co.) and 4.5 g of polyester resin (Vitel PE2200B, available from Bostic Corp.) was added with stirring and dissolved therein. To the resulting solution was added 0.30 g of infrared dye 1 (which was the same as used in the photosensitive layer described later) and 4.5 g fluorinated surfactant (Surflon KH40, available from ASAHI Glass Co. Ltd.) and 2.3 g fluorinated surfactant (Megafag F120K, available from DAINIPPON INK Co. Ltd.) which were dissolved in 43.2 g methanol, were added thereto and stirred until being dissolved. Then, 75 g of silica (Siloid 64X6000, available from W. R. Grace Corp.), which was dispersed in methyl ethyl ketone in a concentration of 1 wt % using a dissolver type homogenizer, was further added thereto with stirring to obtain a coating composition for backing layer.

Coating of Backing Layer

The thus prepared coating composition for a backing layer was coated by an extrusion coater and dried so as to have dry thickness of 3.5 μm and dried at a dry-bulb temperature of 100° C. and a wet-bulb temperature of 10° C. over a period of 5 min.

Preparation of Photosensitive Silver Halide Emulsion a

In 900 ml of deionized water were dissolved 7.5 g of gelatin and 10 mg of potassium bromide. After adjusting the temperature and the pH to 35° C. and 3.0, respectively, 370 ml of an aqueous solution containing 74 g silver nitrate and an equimolar aqueous solution containing potassium bromide, potassium iodide (in a molar ratio of 98 to 2) and $1\times10^{-4}$ mol/mol Ag of iridium chloride were added over a period of 10 minutes by the controlled double-jet method, while the pAg was maintained at 7.7. Thereafter, 4-hydroxy-6-methyl-1,3,3a,7-tetraazaindene was added and the pH was adjusted to 5 using NaOH. There was obtained cubic silver iodobromide grains having an average grain size of 0.06 μm, a variation coefficient of the projection area equivalent diameter of 11 percent, and the proportion of the {100} face of 87 percent. The resulting emulsion was flocculated to remove soluble salts, employing a flocculating agent and after desalting, 0.1 g of phenoxyethanol was added and the pH and pAg were adjusted to 5.9 and 7.5, respectively to obtain silver halide emulsion a. The thus obtained photosensitive emulsion grains were measured with respect to the average iodide content in the vicinity of the grain surface and it was proved to be 4.0 mol %.

Preparation of Powdery Organic Silver Salt

In 4720 ml water were dissolved 111.4 g of behenic acid, 83.8 g of arachidic acid and 54.9 g of stearic acid at 80° C. The, after adding 540.2 ml of 1.5M aqueous sodium hydroxide solution with stirring and further adding 6.9 ml of concentrated nitric acid, the solution was cooled to a temperature of 55° C. to obtain an aqueous organic acid sodium salt solution. To the solution were added the silver halide emulsion obtained above (equivalent to 0.038 mol silver) and 450 ml water and stirring further continued for 5 min., while maintained at a temperature of 55° C. Subsequently, 760 ml of 1M aqueous silver nitrate solution was added in 2 min. and stirring continued further for 20 min., then, the reaction mixture was filtered to remove aqueous soluble salts. Thereafter, washing with deionized water and filtration were repeated until the filtrate reached a conductivity of 2 μS/cm, and after subjecting to centrifugal dehydration, the reaction product was dried with heated air at 37° C. until no reduction in weight was detected to obtain powdery organic silver salt a.

Preparation of Photosensitive Emulsion Dispersing Solution 1

In 1457 g methyl ethyl ketone was dissolved 14.57 g of polyvinyl butyral powder (Butvar B-79, available from Monsanto Corp.) and further thereto was gradually added 500 g of the powdery organic silver salt with stirring by a dissolver type homogenizer. Thereafter, the mixture was dispersed using a media type dispersion machine (available from Gettzmann Corp.), which was packed 1 mm Zr beads (available from Toray Co. Ltd.) by 80%, at a circumferential speed of 13 m and for 0.5 min. of a retention time with a mill to obtain photosensitive emulsion dispersing solution 1.

Preparation of Infrared Sensitizing Dye Solution

In 73.4 ml methanol were dissolved 350 mg of infrared sensitizing dye 1 (IR Dye 1) or an equimolar amount of an infrared sensitizing dye as shown in Table 1, 4.65 g of 2-chlorobenzoic acid, 9.30 g of benzoic acid 1 (o-tolylsulfonyloxybenzoic acid) and 2.14 g of 5-methyl-2-mercaptobenzimidazole in a dark room to obtain an infrared sensitizing dye solution.

Preparation of Photosensitive Layer Coating Composition

The photosensitive emulsion dispersing solution 1 of 500 g and 100 g MEK were maintained at 21° C. with stirring.

Then, 0.45 g antifoggant 1 was added and stirred for 1 hr. and calcium bromide (3.25 ml of 10% methanol solution) was added and further stirred for 20 min. Subsequently, a compound represented by CR-19 (1.00 ml of 15% methanol solution containing 5% potassium acetate) was added thereto, and stirred for 10 min. Then, the sensitizing dye solution prepared above was added, stirred for 1 hr. and after cooling to a temperature of 13° C., stirring further continued for 30 min. Further, 48 g of polyvinyl butyral was added thereto and sufficiently dissolved, while maintaining the temperature at 13° C.; then, the following additives were added:

| | |
|---|---|
| Macrocyclic compound (CR-19) | 0.20 g |
| Developer (exemplified A-3) | 15 g |
| Antifoggant 2 | 0.5 g |
| Desmodu N3300 (aliphatic isocyanate, available from Movey Corp.) | 1.10 g |
| Phthalazinone | 1.5 g |
| Tetrachlorophthalic acid | 0.5 g |
| 4-Methylphthalic acid | 0.5 g |
| Infrared dye 1 | 0.30 g |

Surface Protective Layer
Preparation of Dispersion

In 42.5 g methyl ethyl ketone was dissolved 15 g of cellulose acetate-butylate (CAB171-15, available from Eastman Chemical Co.) and then 5 g of calcium carbonate (Super-Pflex 200, available from Speciality Mineral Corp.) was added thereto and dispersed using a dissolver type homogenizer at a speed of 800 rpm over a period of 30 min. to obtain calcium carbonate dispersion.

Preparation of Coating Solution for Protective Layer

To 865 g of methyl ethyl ketone were added with stirring 96 g of cellulose acetate-butylate (CAB171-15, available from Eastman Chemical Co.) and 4.5 g of polymethyl methacrylate (Paraloid A-21, available from Rohm & Haas Corp.). Further thereto were added and dissolved 1.5 g of vinylsulfon compound HD-1, 1.0 g of benzotriazole and 1.0 g of fluorinated surfactant (Surflon KH40, available from ASAHI Glass Co. Ltd.). Finally, 30 g of calcium carbonate dispersion was added and stirred to obtain a coating composition for the surface protective layer.

dry-bulb temperature of 75° C. and a wet-bulb temperature of 10° C. over a period of 10 min.

Infrared sensitizing dye 1 (IR Dye 1)

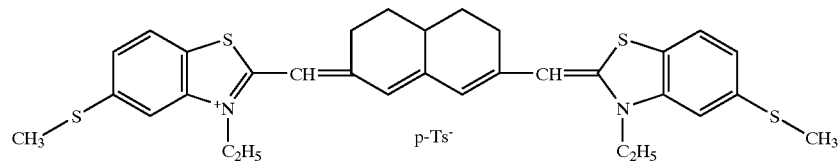

Antifoggant 1

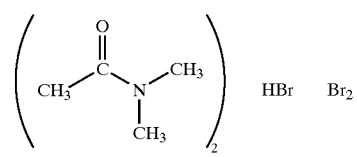

Antifoggant 2

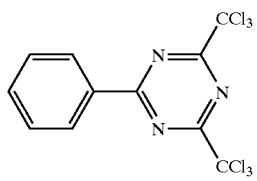

Dye 1

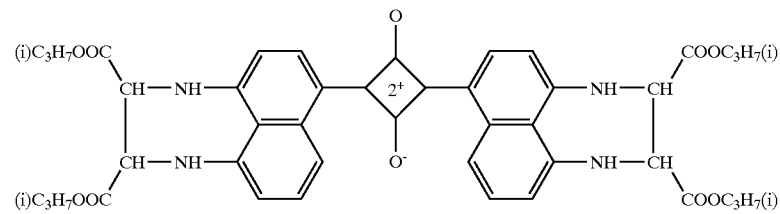

HD-1

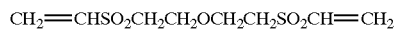

$CH_2\!=\!CHSO_2CH_2CH_2OCH_2CH_2SO_2CH\!=\!CH_2$

Coating of Photosensitive Layer and Protective Layer

The prepared coating composition for the photosensitive layer was allowed to stand for a period of time as shown in Table 4 with maintaining a temperature of 13° C. and then coated according to the following procedure to prepare coating Samples 1 to 3. Further, coating Samples 4 to 24 were similarly prepared, except that the infrared sensitizing dye 1 (also denoted as IR Dye 1) was replaced by a dye according to the invention and the layer to be added with phthalazine, tetrachlorophthalic acid or 4-methylphthalic acid or the standing time after addition thereof was varied as shown in Table 4. The amount of these compounds to be added to the protective layer was 1.25 times the amount to be added to the photosensitive layer. The photosensitive layer coating composition and the protective layer coating composition described above were simultaneously coated by means of an extrusion coater at a coating speed of 20 m/min so that the silver coverage of the photosensitive layer was 2.0 g/m² and dry thickness of the protective layer was 2.5 μm. Thereafter, drying was conducted using hot-air at a Thus obtained coating Sample Nos. were shown in Table 4.

TABLE 4

| Sensitizing Dye | Phthalazine | | Benzenepoly-carboxylic Acid | | Standing Time (Sample No.) | | |
|---|---|---|---|---|---|---|---|
| | Compd. | Layer | Compd. | Layer | 30 sec | 2 hr. | 24 hr. |
| IR Dye 1 | Ph*1 | Phot*2 | TP*1 + Mp*1 | Phot | 1 | 2 | 3 |
| IR Dye 1 | Ph | Pro*2 | Tp + Mp | Phot | 4 | 5 | 6 |
| No.S-43 | Ph | Phot | Tp + Mp | Phot | 7 | 8 | 9 |
| No.S-43 | Ph | Pro | Tp + Mp | Phot | 10 | 11 | 12 |
| No.S-49 | Ph | Phot | Tp + Mp | Phot | 13 | 14 | 15 |
| No.S-49 | Ph | Pro | Tp + Mp | Phot | 16 | 17 | 18 |
| No.S-6 | Ph | Phot | Tp + Mp | Phot | 19 | 20 | 21 |
| No.S-6 | Ph | Pro | Tp + Mp | Phot | 22 | 23 | 24 |

*1Ph; Phthalazine, Tp; Tetrachlorophthalazine, and Mp; 4-Methylphthalic acid
*2Phot; Photosensitive layer, Pro; Protective layer Measurement of Solvent Content of Film Film samples were each measured with respect to the solvent content. Thus, sample films each were cut to an area of 46.3 cm², further finely cut to about 5 mm, contained into a specified Bayern bottle, which was closely packed with septum and aluminum cap, and set to head space sampler HP769 (available Hewlett Packard Co.), which was connected to gas chromatography (GC) Hewlett Packard type 5971 provided with a hydrogen flame ion detector (FID). Chromatograms were obtained under the measurement conditions including a head space sampler heating temperature of 120° C. for 20 min., a GC-introducing temperature of 150° C., column of DB-624 (available from J & W co.) and temperature-increasing of 45° C. (3 min.) to 100° C. at a rate of 8°/min. Solvents to be measure were methyl ethyl ketone and methanol. A given amount of each solvent, which was further diluted with butanol was contained into a Bayern bottle and subjected to the chromatographic measurement in a manner similar to above. Using a calibration curve prepared from the obtained chromatogram peak area, the solvent content of each film sample was determined. Unless otherwise noted, the solvent content in the film was set to be 50 ppm by adjusting the drying time of coated samples.

Exposure and Development

Samples each were cut to a size of 3.5 cm×15 cm and allowed to stand under the following condition (A) or (B):

(A) at 23° C. and 55% RH, and for 24 hrs. and (B) at 55° C. and 55% RH, and for 72 hrs.

Thereafter, each of aged samples was subjected to laser scanning exposure from the emulsion side using an exposure apparatus having a light source of 800 to 820 nm semiconductor laser of longitudinal multi-mode, which was made by means of high frequency overlapping. In this case, exposure was conducted at an angle between the exposed surface and exposing laser light was 75° and in an atmosphere at a temperature of 23° C. and 50% RH (and as a result, images with superior sharpness were unexpectedly obtained, as compared to exposure at an angle of 90°). Using an automatic processor provided with a heated drum, subsequently, exposed samples were subjected to thermal development at 120° C. for 15 sec., while bringing the protective layer surface of the photosensitive material into contact with the drum surface. The thermal development was conducted in an atmosphere at 23° C. and 50% RH.

Sensitometric Evaluation

Thermally developed samples each were subjected to sensitometry using a densitometer and evaluated with respect to a fog density (i.e., minimum density and denoted as Dmin) and sensitivity. The sensitivity was represented by a relative value of reciprocal of exposure necessary to give a density of Dmin plus 1.0, based on the sensitivity of Sample 1 being 100.

TABLE 5

| Sample | Condition A | | Condition B | |
| --- | --- | --- | --- | --- |
| | Fog | Sensitivity | Fog | Sensitivity |
| 1 | 0.25 | 100 | 0.34 | 70 |
| 2 | 0.26 | 90 | 0.35 | 65 |
| 3 | 0.27 | 70 | 0.37 | 54 |
| 4 | 0.25 | 105 | 0.35 | 72 |
| 5 | 0.26 | 95 | 0.36 | 66 |
| 6 | 0.27 | 80 | 0.38 | 53 |
| 7 | 0.22 | 125 | 0.27 | 107 |
| 8 | 0.22 | 120 | 0.27 | 100 |
| 9 | 0.23 | 100 | 0.28 | 81 |
| 10 | 0.23 | 125 | 0.27 | 105 |
| 11 | 0.23 | 125 | 0.27 | 103 |
| 12 | 0.23 | 123 | 0.28 | 102 |
| 13 | 0.22 | 130 | 0.28 | 106 |
| 14 | 0.22 | 125 | 0.28 | 102 |
| 15 | 0.23 | 100 | 0.29 | 71 |
| 16 | 0.23 | 133 | 0.28 | 105 |
| 17 | 0.23 | 130 | 0.28 | 101 |
| 18 | 0.24 | 125 | 0.29 | 100 |
| 19 | 0.22 | 127 | 0.28 | 105 |
| 20 | 0.22 | 125 | 0.28 | 103 |
| 21 | 0.23 | 100 | 0.30 | 73 |
| 22 | 0.24 | 130 | 0.28 | 106 |
| 23 | 0.24 | 130 | 0.28 | 103 |
| 24 | 0.24 | 125 | 0.28 | 99 |

As apparent from Table 5, it was proved that samples prepared according to the invention by the combined use of inventive sensitizing dyes, and phthalazine/tetrachlorophthalic acid/4-methylphthalic acid led to superiority in sensitivity and fogging, irrespective of aging conditions.

Example 5

Samples 25 to 45 were prepared similarly to example 4, provided that the infrared sensitizing dye used in Samples 7 to 12 was used, and additives and the standing time were varied as shown in Table 6.

TABLE 6

| Phthalazine | | Benzenepoly-carboxylic Acid | | Standing Time (Sample No.) | | |
| --- | --- | --- | --- | --- | --- | --- |
| Compd. | Layer | Compd. | Layer | 30 sec | 2 hr. | 24 hr. |
| Ph*¹ | Phot*² | Tp*¹ + Mp*¹ | Phot | 25 | 26 | 27 |
| Ph | Pro*² | Tp + Mp | Phot | 28 | 29 | 30 |
| Phn*¹ | Phot | Tp + Mp | Phot | 31 | 32 | 33 |
| Ph | Pro | Tp + Mp | Phot | 34 | 35 | 36 |
| Ch*¹ | Pro | Tp + Mp | Phot | 37 | 38 | 39 |
| Ph | Pro | Np*¹ + Mp | Phot | 40 | 41 | 42 |
| Ph | Pro | Tp + Np | Phot | 43 | 44 | 45 |

*¹Ph; Phthalazine, Phn; Phthalazinone, Ch; 6-Chlorophthalazine, Tp; Tetrachlorophthalazine, Mp; 4-Methylphthalic acid and Np; 4-Nitrophthalic acid
*²Phot; Photosensitive layer, Pro; Protective layer Samples were evaluated in the same manner as Example 4. Results thereof are shown in Table 7.

TABLE 7

| Sample | Condition A Fog | Condition A Sensitivity | Condition B Fog | Condition B Sensitivity |
|---|---|---|---|---|
| 25 | 0.22 | 127 | 0.27 | 103 |
| 26 | 0.22 | 125 | 0.28 | 99 |
| 27 | 0.24 | 70 | 0.35 | 50 |
| 28 | 0.22 | 128 | 0.27 | 104 |
| 29 | 0.22 | 126 | 0.28 | 100 |
| 30 | 0.25 | 80 | 0.34 | 53 |
| 31 | 0.22 | 125 | 0.27 | 105 |
| 32 | 0.23 | 120 | 0.27 | 101 |
| 33 | 0.25 | 100 | 0.32 | 71 |
| 34 | 0.22 | 125 | 0.28 | 107 |
| 35 | 0.22 | 125 | 0.28 | 103 |
| 36 | 0.23 | 123 | 0.29 | 101 |
| 37 | 0.22 | 130 | 0.28 | 107 |
| 38 | 0.22 | 125 | 0.28 | 105 |
| 39 | 0.23 | 120 | 0.29 | 102 |
| 40 | 0.22 | 133 | 0.29 | 106 |
| 41 | 0.23 | 130 | 0.29 | 105 |
| 42 | 0.23 | 125 | 0.29 | 100 |
| 43 | 0.22 | 127 | 0.28 | 104 |
| 44 | 0.23 | 125 | 0.28 | 103 |
| 45 | 0.24 | 120 | 0.28 | 102 |

As apparent from Table 7, the use of phthalazines, phthalazinones or benzenepolycarboxylic acids led to enhanced sensitivity and little variation in photographic performance, even when being allowed to stand for a long period of time. Even in cases where the compounds described above are separately incorporated into the photosensitive layer and protective layer, similar effects were displayer.

Example 6

Remaining Solvent Content Dependence

Samples 46 and 49 were prepared in a manner similar to Sample 4 of Example 4, except that the drying time was varied, and Samples 50 to 53 were prepared in a manner similar to Sample 7 of Example 4, except that the drying time was varied, as shown in Table 8.

TABLE 8

| Remained Solvent Content (ppm) | | | | |
|---|---|---|---|---|
| 10 | 50 | 500 | 4000 | 8000 |
| 46 | 4 | 47 | 48 | 49 |
| 50 | 7 | 51 | 52 | 53 |

Samples each were similarly exposed, processed and evaluated. Results thereof are shown in Table 9.

TABLE 9

| Sample | Condition A Fog | Condition A Sensitivity |
|---|---|---|
| 46 | 0.23 | 72 |
| 4 | 0.25 | 105 |
| 47 | 0.29 | 108 |
| 48 | 0.36 | 112 |
| 49 | 0.51 | 110 |
| 50 | 0.22 | 97 |
| 7 | 0.22 | 125 |
| 51 | 0.23 | 132 |
| 52 | 0.26 | 130 |
| 53 | 0.37 | 129 |

As apparent from table 9, the organic solvent-remaining content within the preferred range led to preferable results with respect to relationship between fog and sensitivity. Further, it was shown that the combination of the sensitizing dye according to the invention, and phthalazine, phthalazinone and benzenepolycarboxylic acid tended to reduce variation in photographic performance, caused by the organic solvent remaining content. Thus, it was proved that superior thermally developable photosensitive materials could be stably supplied to the market.

What is claimed is:

1. A silver halide photographic material comprising a support having thereon at least a photosensitive layer containing a silver halide emulsion layer, wherein said photosensitive layer contains at least a compound represented by the following formula (3) or (4)

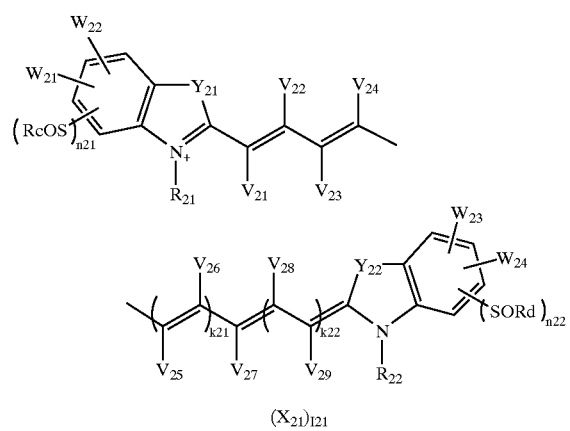

Formula (3)

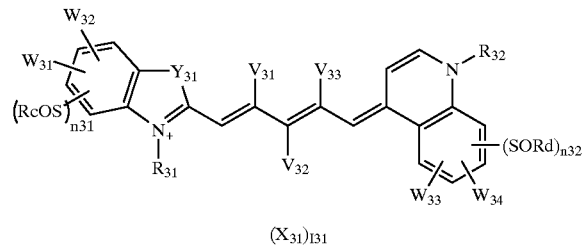

Formula (4)

wherein $Y_{21}$, $Y_{22}$ and $Y_{31}$ each are independently an oxygen atom, a sulfur atom, a selenium atom, —C(Ra)(Rb)— group or —CH=CH— group, in which Ra and Rb each are a hydrogen atom, a lower alkyl group or an atomic group necessary to form an aliphatic spiro ring between Ra and Rb; $R_{21}$, $R_{22}$, $R_{31}$ and $R_{32}$ each are independently an aliphatic group; Rc and Rd each are independently an unsubstituted lower alkyl group, a cycloalkyl group, an aralkyl group, an aryl group or a heterocyclic group; $W_{21}$, $W_{22}$, $W_{23}$, $W_{24}$, $W_{31}$, $W_{32}$, $W_{33}$ and $W_{34}$ each are independently a hydrogen atom, a substituent or a non-metallic atom group necessary to form a condensed ring by bonding between $W_{21}$ and $W_{22}$, $W_{23}$ and $W_{24}$, $W_{31}$ and $W_{32}$, or $W_{33}$ and $W_{34}$; $V_{21}$ to $V_{29}$, and $V_{31}$ to $V_{33}$ each are independently a hydrogen atom, a halogen atom, an amino group, an alkylthio group, an arylthio group, a lower alkyl group, a lower alkoxy group, an aryl group, an aryloxy group, a heterocyclic group or a non-metallic atom group necessary to form a 5- to 7-membered ring by bonding between $V_{21}$ and $V_{23}$, $V_{22}$ and $V_{24}$, $V_{23}$ and $V_{25}$, $V_{24}$ and $V_{26}$, $V_{25}$ and $V_{27}$, $V_{26}$ and $V_{28}$, $V_{27}$ and $V_{29}$, or $V_{31}$ and $V_{33}$; $X_{21}$ and $X_{31}$ each are an ion necessary to compensate for an intramolecular charge; l21 and l31 each an ion necessary to compensate for an intramolecular charge; k21 and k22 each are 0 or 1; n21, n22, n31 and n32 each are 0, 1 or 2, provided that n21 and n22, or n31 and n32 are not 0 at the same time.

2. The photographic material of claim 1, wherein said compound is represented by formula (3).

3. The photographic material of claim 2, wherein said photosensitive layer further contains a compound represented by the following formula (5):

necessary to form an aliphatic spiro ring together with Ra and Rb; $R_{41}$ and $R_{42}$ each are independently an aliphatic group; Re and Rf each are independently an unsubstituted lower alkyl group, cycloalkyl group, aralkyl group, aryl group or heterocyclic group; $W_{41}$, $W_{42}$, $W_{43}$, and $W_{44}$ each are independently a hydrogen atom, a substituent or a non-metallic atom group necessary to form a condensed ring by bonding between $W_{41}$ and $W_{42}$, $W_{43}$ and $W_{44}$; $L_{41}$ to $L_{49}$ are each a methine group; $X_{41}$ is an ion necessary to compensate for an intramolecular charge; l41 is an ion necessary to compensate for an intramolecular charge; m42 and m43 each are 0 or 1; n41 and n42 each are 0, 1 or 2, provided that n41 and n42 are not 0 at the same time.

4. The photographic material of claim 1, wherein said compound is represented by formula (4).

5. The photographic material of claim 4, wherein said photosensitive layer further contains a compound represented by formula (6):

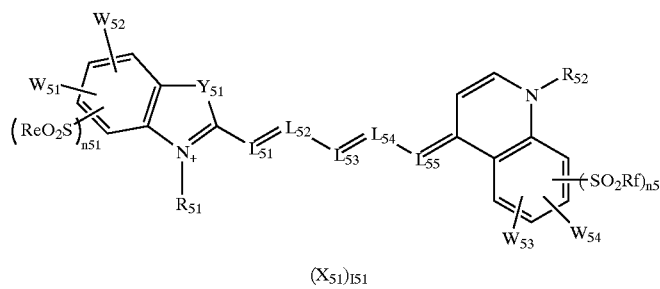

Formula (6)

wherein $Y_{51}$ is independently an oxygen atom, a sulfur atom, a selenium atom, —C(Ra)(Rb)— group or —CH=CH— group, in which Ra and Rb each are a hydrogen atom, a lower alkyl group or an atomic group necessary to form an aliphatic spiro ring together with Ra and Rb; $R_{51}$ and $R_{52}$ each are independently an aliphatic group; Re and Rf each are independently an unsubstituted lower alkyl group, cycloalkyl group, aralkyl group, aryl group or heterocyclic group; $W_{51}$, $W_{52}$, $W_{53}$ and $W_{54}$ each are independently a hydrogen atom, a substituent or a non-metallic atom group necessary to form a condensed ring by bonding between $W_{51}$ and $W_{52}$, or $W_{53}$ and $W_{54}$; $L_{51}$ to $L_{55}$ are each a methine group; $X_{51}$ is an ion necessary to compensate for an intramo-

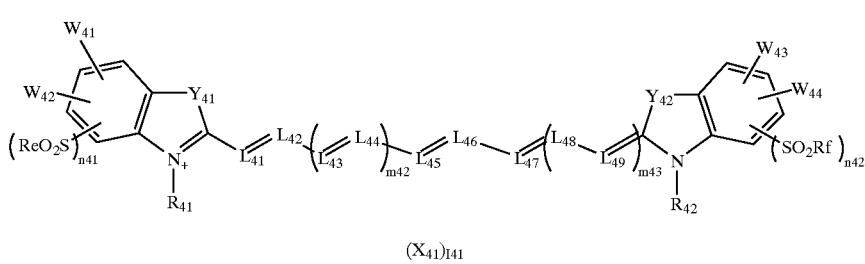

Formula (5)

wherein $Y_4$ and $Y_{42}$ each are independently an oxygen atom, a sulfur atom, a selenium atom, —C(Ra)(Rb)— group or —CH=CH— group, in which Ra and Rb each are a hydrogen atom, a lower alkyl group or an atomic group lecular charge; l51 is an ion necessary to compensate for an intramolecular charge; n51 and n52 each are 0, 1 or 2, provided that n51 and n52 are not 0 at the same time.

6. The silver halide photographic material of claim 1, wherein the photosensitive layer further contains an organic silver salt and a reducing agent.

7. The silver halide photographic material of claim 1, wherein the compound is contained in an amount of $1\times10^{-6}$ to $5\times10^{-3}$ mol per mol of silver halide.

8. The silver halide photographic material of claim 1, wherein the total amount of silver contained in the silver halide photographic material is within the range of 0.5 to 2.2 g per m$^2$.

* * * * *

Disclaimer

6,677,113 — Nobuaki Kagawa, Hino (JP); Noriyasu Kita, Hino (JP); Tatsuo Tanaka, Hini (JP); Hiroshi Kashiwagi, Hino (JP). SENSITIZING DYE AND SILVER HALIDE PHOTOGRAPHIC MATERIAL. Patent dated Jan. 13, 2004. Disclaimer filed Nov. 17, 2004, by the assignee, Konica Corporation.

The term of this patent, subsequent to the term of patent number 6,492,102 has been disclaimed.

*(Official Gazette, October 11, 2005)*